US009225045B2

(12) United States Patent
Houchin-Miller et al.

(10) Patent No.: US 9,225,045 B2
(45) Date of Patent: Dec. 29, 2015

(54) BATTERY SYSTEM WITH HEAT EXCHANGER

(71) Applicant: Johnson Controls—SAFT Advanced Power Solutions LLC, Wilmington, DE (US)

(72) Inventors: Gary P. Houchin-Miller, Fox Point, WI (US); Anthony C. Pacheco, Thiensville, WI (US); Martin Wiegmann, Borstel (DE); Ralf Joswig, Buchholz (DE); Markus Hoh, Rheine (DE); Mikhail Balk, Brown Deer, WI (US); Kem Obasih, Brookfield, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 14/100,901

(22) Filed: Dec. 9, 2013

(65) Prior Publication Data

US 2014/0093755 A1 Apr. 3, 2014

Related U.S. Application Data

(63) Continuation of application No. 13/087,262, filed on Apr. 14, 2011, now Pat. No. 8,603,660, which is a continuation of application No. PCT/US2009/064032, filed on Nov. 11, 2009.

(Continued)

(51) Int. Cl.
*H01M 10/50* (2006.01)
*H01M 10/6557* (2014.01)

(Continued)

(52) U.S. Cl.
CPC ....... *H01M 10/5059* (2013.01); *B60L 11/1874* (2013.01); *B60L 11/1877* (2013.01);

(Continued)

(58) Field of Classification Search
CPC .......... H01M 10/5016; H01M 10/503; H01M 10/5059; H01M 10/5075; H01M 10/0525; H01M 10/345; H01M 10/5067
USPC .......................................................... 429/120
See application file for complete search history.

(56) References Cited

U.S. PATENT DOCUMENTS 2,042,806 A 6/1936 Schulte
2,416,079 A 2/1947 Anthony (Continued)

FOREIGN PATENT DOCUMENTS

DE 10238235 A 3/2004
EP 0607675 B1 7/1994

(Continued)

OTHER PUBLICATIONS

European Search Report for European Application No. 09012377.9, mail date Dec. 22, 2009, 10 pages.

(Continued)

*Primary Examiner* — Nicholas P D'Aniello
(74) *Attorney, Agent, or Firm* — Fletcher Yoder, P.C.

(57) ABSTRACT

A battery module includes a plurality of electrochemical cells arranged in a first row and a second row offset from the first row. The battery module also includes a heat exchanger configured to allow a fluid to flow through the heat exchanger. The heat exchanger is disposed between the first and second rows of cells and has a shape that is complementary to the cells in the first and second rows of cells so that an external surface of the heat exchanger contacts a portion of each of the plurality of electrochemical cells. The heat exchanger is configured to route the fluid between an inlet and an outlet such that a path of the fluid flow includes a plurality of adjacent fluid flow segments.

24 Claims, 45 Drawing Sheets

540
547
543
550
557
542

Related U.S. Application Data

(60) Provisional application No. 61/114,009, filed on Nov. 12, 2008, provisional application No. 61/143,707, filed on Jan. 9, 2009, provisional application No. 61/169,649, filed on Apr. 15, 2009.

(51) Int. Cl.
*B60L 11/18* (2006.01)
*H01M 2/10* (2006.01)
*H01M 2/20* (2006.01)
*H01M 10/625* (2014.01)
*H01M 10/643* (2014.01)
*H01M 10/6567* (2014.01)
*H01M 10/48* (2006.01)
*H01M 10/0525* (2010.01)
*H01M 10/34* (2006.01)
*H01M 10/6563* (2014.01)

(52) U.S. Cl.
CPC ......... *B60L11/1879* (2013.01); *H01M 2/1077* (2013.01); *H01M 2/206* (2013.01); *H01M 10/486* (2013.01); *H01M 10/503* (2013.01); *H01M 10/5016* (2013.01); *H01M 10/5075* (2013.01); *H01M 10/625* (2015.04); *H01M 10/643* (2015.04); *H01M 10/6557* (2015.04); *H01M 10/6567* (2015.04); *H01M 10/0525* (2013.01); *H01M 10/345* (2013.01); *H01M 10/5067* (2013.01); *H01M 10/6563* (2015.04); *Y02T 10/705* (2013.01); *Y02T 10/7005* (2013.01); *Y02T 10/7011* (2013.01)

(56) References Cited

U.S. PATENT DOCUMENTS 4,189,473 A 2/1980 Cole et al.
4,554,221 A 11/1985 Schmid
4,957,829 A 9/1990 Holl
5,336,570 A 8/1994 Dodge, Jr.
5,606,238 A 2/1997 Spellman et al.
5,756,227 A 5/1998 Suzuki et al.
5,866,276 A 2/1999 Ogami et al.
5,879,833 A 3/1999 Yoshii et al.
6,001,501 A 12/1999 Collie
6,106,972 A 8/2000 Kokubo et al.
6,228,524 B1 5/2001 Kohler et al.
6,265,091 B1 7/2001 Pierson et al.
6,379,831 B1 4/2002 Draper et al.
6,379,837 B1 4/2002 Takahashi et al.
6,410,184 B1 6/2002 Horiuchi et al.
6,410,185 B1 6/2002 Takahashi et al.
6,465,123 B1 10/2002 Baumann et al.
6,472,098 B1 10/2002 Sawada et al.
6,541,154 B2 4/2003 Oogami et al.
6,558,835 B1 5/2003 Kurisu et al.
6,656,632 B2 12/2003 Asaka et al.
6,840,050 B2 1/2005 Pode
6,858,345 B2 2/2005 Amine et al.
6,896,995 B2 5/2005 Saito
6,923,837 B2 8/2005 Longhi et al.
6,932,651 B2 8/2005 Mita et al.
6,953,638 B2 10/2005 Inui et al.
7,014,949 B2 3/2006 Kanai et al.
7,094,496 B2 8/2006 Rodriguez et al.
7,129,001 B2 10/2006 Munenaga et al.
7,147,963 B2 12/2006 Kimoto et al.
7,160,643 B2 1/2007 Kunimoto et al.
7,189,474 B2 3/2007 Hamada et al.
7,270,576 B2 9/2007 Kim et al.
7,351,493 B2 4/2008 Uemoto et al.
7,531,270 B2 5/2009 Buck et al.
2001/0046624 A1 11/2001 Goto et al.
2002/0177035 A1 11/2002 Oweis et al.
2004/0038123 A1 2/2004 Hisamitsu et al.
2004/0069620 A1 4/2004 Bitsche et al.
2004/0175612 A1 9/2004 Conti
2005/0048365 A1 3/2005 Miyahisa et al.
2005/0079408 A1 4/2005 Hirano
2005/0100783 A1 5/2005 Ro et al.
2005/0170239 A1 8/2005 Uemoto et al.
2005/0170240 A1 8/2005 German et al.
2005/0174092 A1 8/2005 Dougherty et al.
2005/0287427 A1 12/2005 Kim et al.
2006/0026822 A1 2/2006 Seman, Jr. et al.
2006/0040173 A1 2/2006 Shimamura et al.
2006/0063067 A1 3/2006 Kim
2006/0073378 A1 4/2006 Hamery et al.
2006/0073379 A1 4/2006 Kim et al.
2006/0078789 A1 4/2006 Wegner
2006/0162149 A1 7/2006 Ha et al.
2006/0177734 A1 8/2006 Yao
2006/0204840 A1 9/2006 Jeon et al.
2006/0216582 A1 9/2006 Lee et al.
2006/0216583 A1 9/2006 Lee et al.
2006/0234119 A1 10/2006 Kruger et al.
2006/0246350 A1 11/2006 Takayama et al.
2006/0275656 A1 12/2006 Feddix et al.
2007/0015050 A1 1/2007 Jung et al.
2007/0026303 A1 2/2007 Jeon et al.
2007/0026305 A1 2/2007 Jeon et al.
2007/0026306 A1 2/2007 Lee et al.
2007/0026739 A1 2/2007 Kim et al.
2007/0037050 A1 2/2007 Rigobert et al.
2007/0037051 A1 2/2007 Kim et al.
2007/0087266 A1 4/2007 Bourke et al.
2008/0090137 A1 4/2008 Buck et al.
2008/0160395 A1 7/2008 Okada et al.
2008/0311468 A1* 12/2008 Hermann et al. ............. 429/120
2009/0111015 A1 4/2009 Wood et al.
2009/0258289 A1* 10/2009 Weber et al. ................. 429/120
2010/0092849 A1 4/2010 Wood et al.
2010/0183904 A1 7/2010 Muis
2011/0135975 A1 6/2011 Fuhr et al.

FOREIGN PATENT DOCUMENTS

EP 1109237 A1 6/2001
EP 1213784 A2 6/2002
EP 1503442 A2 2/2005
EP 1250720 B1 5/2006
EP 1786051 A1 5/2007
FR 2058740 A5 5/1971
FR 2585185 A1 1/1987
GB 2136629 A 9/1984
GB 2269476 A 2/1994
JP 2003308823 10/2003
JP 2007012487 A 1/2007
JP 2007280831 A 10/2007
KR 1020070014658 A 2/2007
WO 2007134198 A1 11/2007
WO 2008021230 A2 2/2008
WO 2008027343 A1 3/2008
WO 2008345484 A1 3/2008
WO 2008074034 A1 6/2008
WO 2008086417 A2 7/2008
WO 2008098193 A2 8/2008
WO 2009016476 A2 2/2009
WO 2010019764 A2 2/2010
WO 2010085636 A2 7/2010

OTHER PUBLICATIONS

International Search Report for International Application No. PCT/US2007/068716, dated Oct. 17, 2007, 5 pages.

International Preliminary Report on Patentability, Written Opinion of the International Searching Authority and International Search Report for International Application No. PCT/US2007/017785, mail date Mar. 3, 2008, 15 pages.

International Search Report for International Application No. PCT/182008/001984, mail date Feb. 4, 2009, 2 pages.

(56) References Cited

OTHER PUBLICATIONS

International Preliminary Report on Patentability for International Application No. PCT/182008/001984, mail date Feb. 2, 2010, 6 pages.
International Search Report and Written Opinion for International Application No. PCT/US2009/053697, dated Mar. 23, 2010, 6 pages.
International Search Report for International Application No. PCT/US2010/021791, dated Aug. 13, 2010, 3 pages.
Written Opinion of International Application No. PCT/US2007/068716, dated Oct. 17, 2007, 6 pages.
Communication under Rule 71 (3) EPC for European Application No. 07783619.5, dated Jan. 31, 2011, 61 pages.
Notice of Deficiencies of European Application No. 07836697.8, dated Aug. 31, 2009, 2 pages.
Office Action for Chinese Application No. 200780025271.0 with English translation, dated Sep. 8, 2010, 4 pages.
Office Action for European Application No. 07783619.5, dated Jul. 29, 2009, 4 pages.
Response to Office Action for European Application No. 07783619.5, dated Feb. 5, 2010, 9 pages.
Office Action for European Application No. 07836697.8, dated Feb. 17, 2010, 3 pages.
Response to Office Action for European Application No. 07836697.8, dated Jun. 25, 2010, 9 pages.
Office Action for European Application No. 09012377.9, dated Jun. 1, 2010, 1 page.
Response to Office Action for European Application No. 09012377.9, dated Sep. 28, 2010, 14 pages.
Office Action for European Application No. 09012377.9, dated Oct. 7, 2010, 3 pages.
Response to Office Action for European Application No. 09012377.9, dated Feb. 10, 2011, 5 pages.
Office Action of Chinese Patent Application No. 200780029735.5 with English translation, dated Jun. 25, 2010, 10 pages.
Chinese Office Action dated Jun. 5, 2013, for Chinese Application No. 200980150866.8, 7 pages.
Response to Office Action for European Application No. 07836697.8, dated Jan. 6, 2010, 6 pages.
International Search Report for International Application No. PCT/US2009/064032, dated Jun. 15, 2010, 4 pages.
Supplementary European Search Report for European Application No. 09826673 mailed Mar. 15, 2013. 12 pages.
CN Office Action dated Sep. 6, 2015.

* cited by examiner

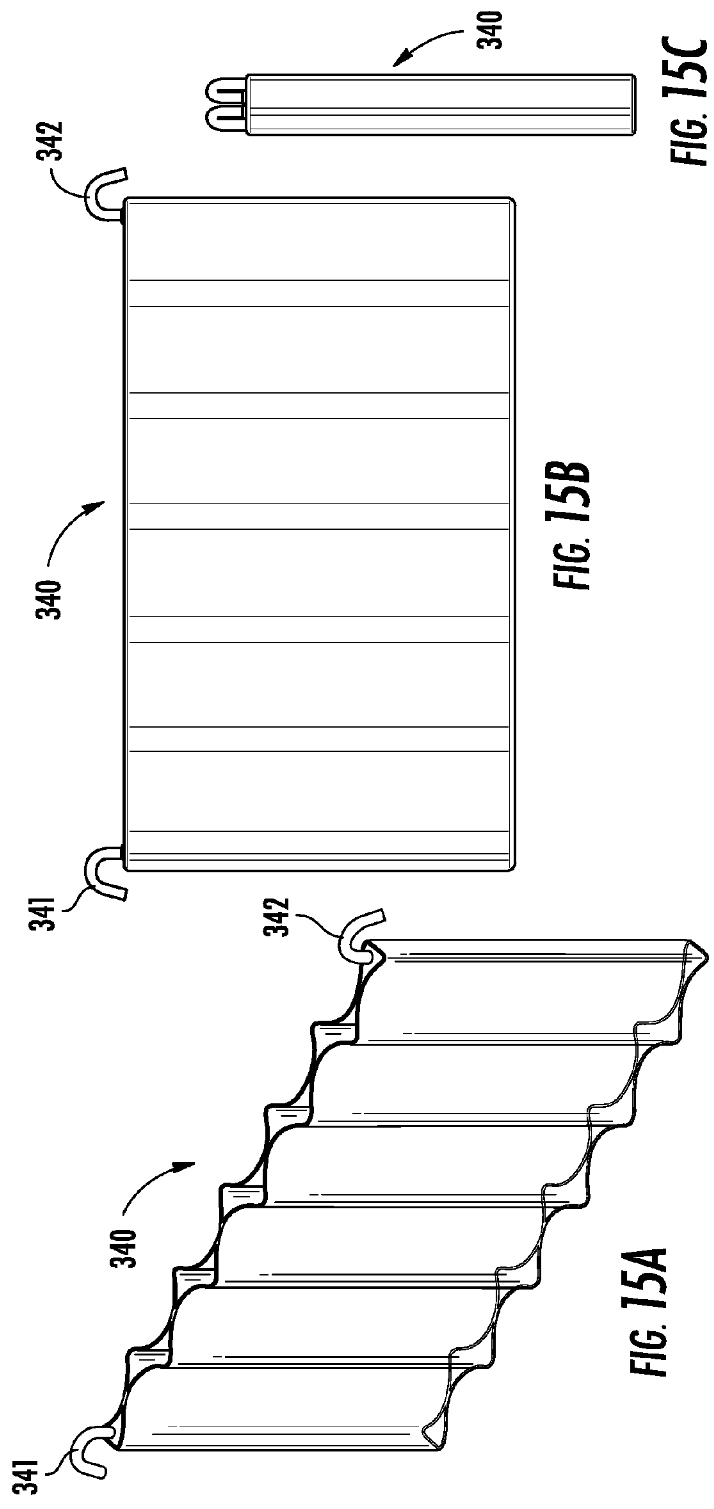
340
342
341
340
342
341
340
FIG. 15A
FIG. 15B
FIG. 15C
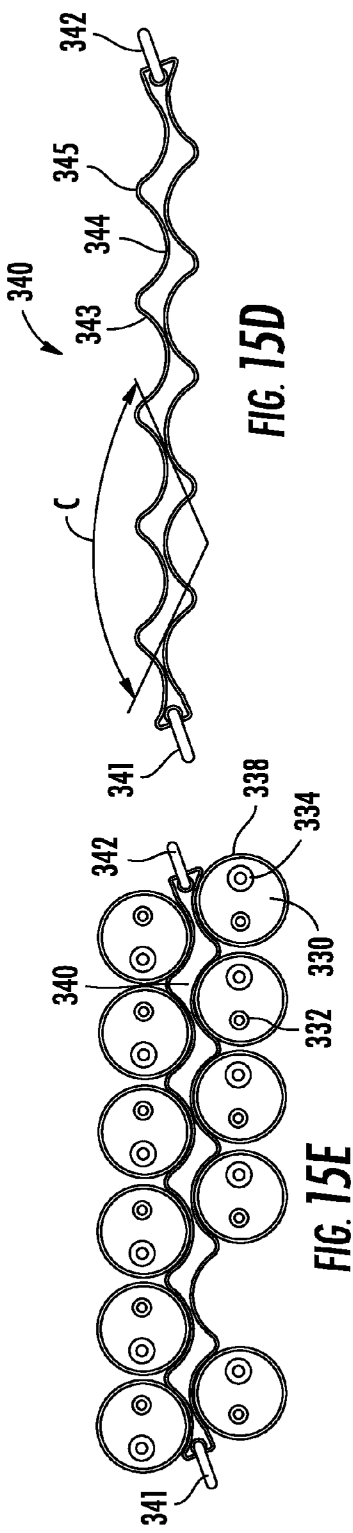
342
345
344
340
343
C
341
FIG. 15D
342
338
334
340
330
332
341
FIG. 15E 362
363
364
365
361
360

540
542
548
549
548
541

540
542
549
547
548
541

540
546
542
544
545
543

541
546

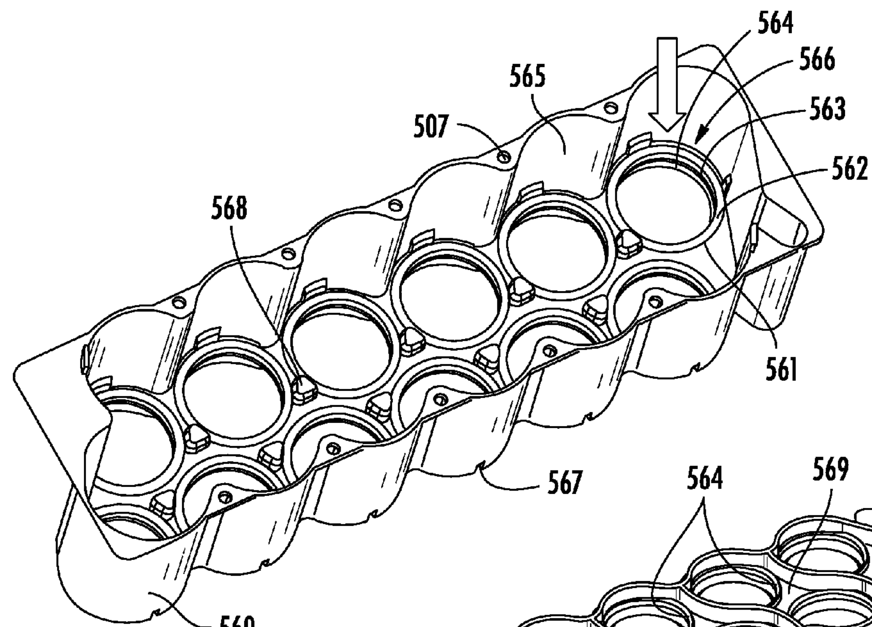
FIG. 28
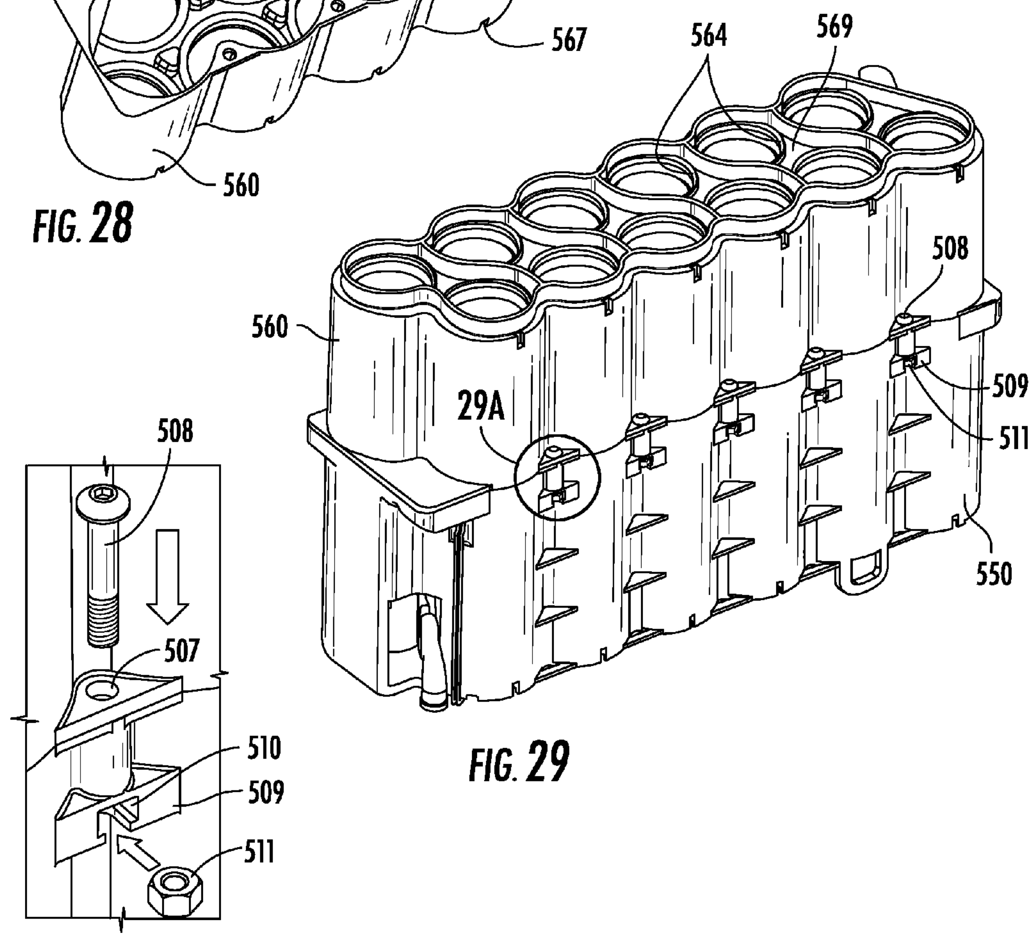
FIG. 29
FIG. 29A 940
941
942
948

940
942
941
949
948
947

944
945
940
943
942
941

BATTERY SYSTEM WITH HEAT EXCHANGER

CROSS-REFERENCE TO RELATED PATENT APPLICATIONS

This application is a continuation of U.S. patent application Ser. No. 13/087,262, filed Apr. 14, 2011, which is a continuation of International Patent Application No. PCT/US2009/064032, filed Nov. 11, 2009, which claims the benefit of and priority to U.S. Provisional Patent Application No. 61/114,009, filed Nov. 12, 2008, U.S. Provisional Patent Application No. 61/143,707, filed Jan. 9, 2009, and U.S. Provisional Patent Application No. 61/169,649, filed Apr. 15, 2009. The entire disclosures of U.S. patent application Ser. No. 13/087,262, International Patent Application No. PCT/US2009/064032, U.S. Provisional Patent Application No. 61/114,009, U.S. Provisional Patent Application No. 61/143,707, and U.S. Provisional Patent Application No. 61/169,649 are incorporated herein by reference in their entireties.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also be desirable to provide a battery module and/or system that includes any one or more of the advantageous features that will be apparent from a review of the present disclosure.

SUMMARY

According to an exemplary embodiment, a battery module includes a plurality of electrochemical cells arranged in a first row and a second row offset from the first row. The battery module also includes a heat exchanger configured to allow a fluid to flow through the heat exchanger. The heat exchanger is disposed between the first and second rows of cells and has a shape that is complementary to the cells in the first and second rows of cells so that an external surface of the heat exchanger contacts a portion of each of the plurality of electrochemical cells. The heat exchanger is configured to route the fluid between an inlet and an outlet such that a path of the fluid flow includes a plurality of adjacent fluid flow segments.

According to another exemplary embodiment, a battery module includes a heat exchanger provided between a first row of electrochemical cells and a second row of electrochemical cells arranged offset from the first row of cells. The heat exchanger includes an external surface in contact with at least a portion of each of the electrochemical cells. The heat exchanger is configured to allow a fluid to flow therethrough between an inlet and an outlet such that a path of the fluid flow includes a plurality of adjacent fluid flow segments.

According to another exemplary embodiment, a battery system includes a plurality of battery modules. Each battery module includes a plurality of electrochemical cells arranged in a first row and a second row offset from the first row. The battery module also includes a heat exchanger configured to allow a fluid to flow through the heat exchanger. The heat exchanger is disposed between the first and second rows of cells and has a shape that is complementary to the cells in the first and second rows of cells so that an external surface of the heat exchanger contacts a portion of each of the plurality of electrochemical cells. The heat exchanger is configured to route the fluid between an inlet and an outlet such that a path of the fluid flow includes a plurality of adjacent fluid flow segments.

BRIEF DESCRIPTION OF THE DRAWINGS

FIG. 15A is a perspective view of a heat exchanger for use in a battery module according an exemplary embodiment.

FIG. 15B is a side view of the heat exchanger shown in FIG. 15A.

FIG. 15C is an end view of the heat exchanger shown in FIG. 15A.

FIG. 15D is a top view of the heat exchanger shown in FIG. 15A.

FIG. 15E is a top view of the heat exchanger shown in FIG. 15A shown provided between two rows of electrochemical cells according to an exemplary embodiment.

FIG. 28 is a perspective view of a tray for a battery module having a plurality of inlays being provided therein according to an exemplary embodiment.

FIG. 29 is a perspective view showing the tray shown in FIG. 28 being assembled to the housing as shown in FIG. 26 according to an exemplary embodiment.

FIG. 29A is a detailed perspective view showing a fastener and a nut being used to couple the tray to the housing as shown in FIG. 29 according to an exemplary embodiment.

DETAILED DESCRIPTION

Figure 1:
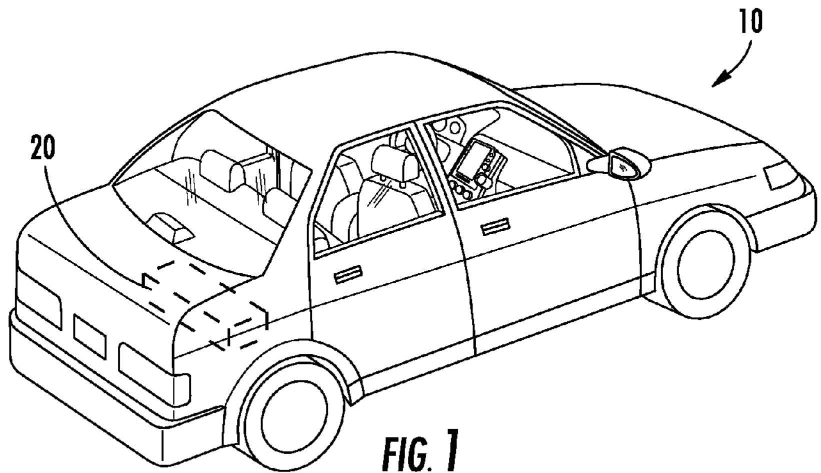
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
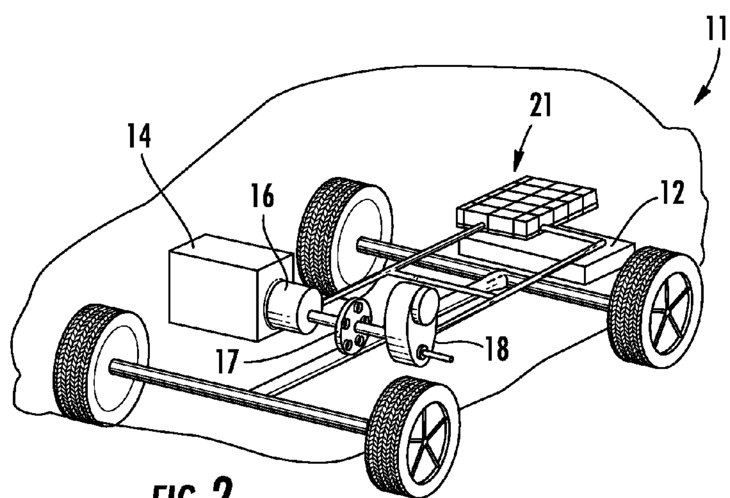
FIG. 2 is a cutaway schematic view of a vehicle including a battery module according to another exemplary embodiment.

FIG. 2 illustrates a cutaway schematic view of a vehicle 11 provided in the form of an HEV according to an exemplary embodiment. A battery system 21 is provided toward the rear of the vehicle 11 proximate a fuel tank 12 (the battery system 21 may be provided immediately adjacent the fuel tank 12 or may be provided in a separate compartment in the rear of the vehicle 11 (e.g., a trunk) or may be provided elsewhere in the vehicle 11). An internal combustion engine 14 is provided for times when the vehicle 11 utilizes gasoline power to propel the vehicle 11. An electric motor 16, a power split device 17, and a generator 18 are also provided as part of the vehicle drive system.

Such a vehicle 11 may be powered or driven by just the battery system 21, by just the engine 14, or by both the battery system 21 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 21, the type of vehicle 11, the type of vehicle technology (e.g., EV, HEV, PHEV, etc.), and the battery chemistry, among other features, may differ from those shown or described.

According to an exemplary embodiment, the battery system 21 includes a plurality of electrochemical batteries or cells. The battery system 21 may also include features or components for connecting the electrochemical cells to each other and/or to other components of the vehicle electrical system, and also for regulating the electrochemical cells and other features of the battery system 21. For example, the battery system 21 may include features that are responsible for monitoring and controlling the electrical performance of the battery system 21, managing the thermal behavior of the battery system 21, containment and/or routing of effluent (e.g., gases that may be vented from an electrochemical cell through a vent), and other aspects of the battery system 21.

Figure 3:
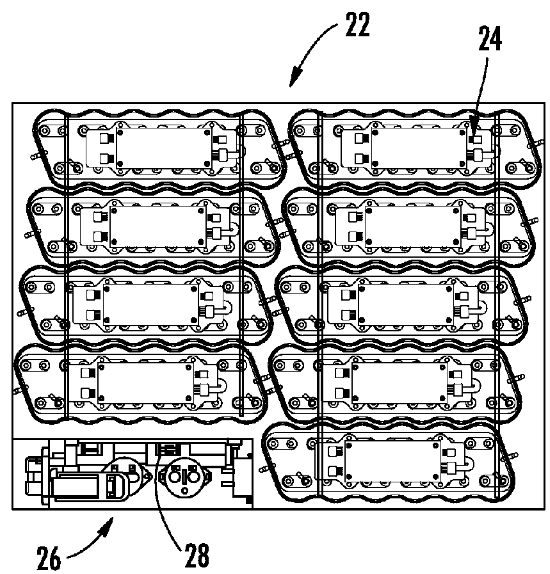
FIG. 3 is a top view of a battery system including a plurality of battery modules according to another exemplary embodiment.
Figures 4A, 4B, 4C, 4D:
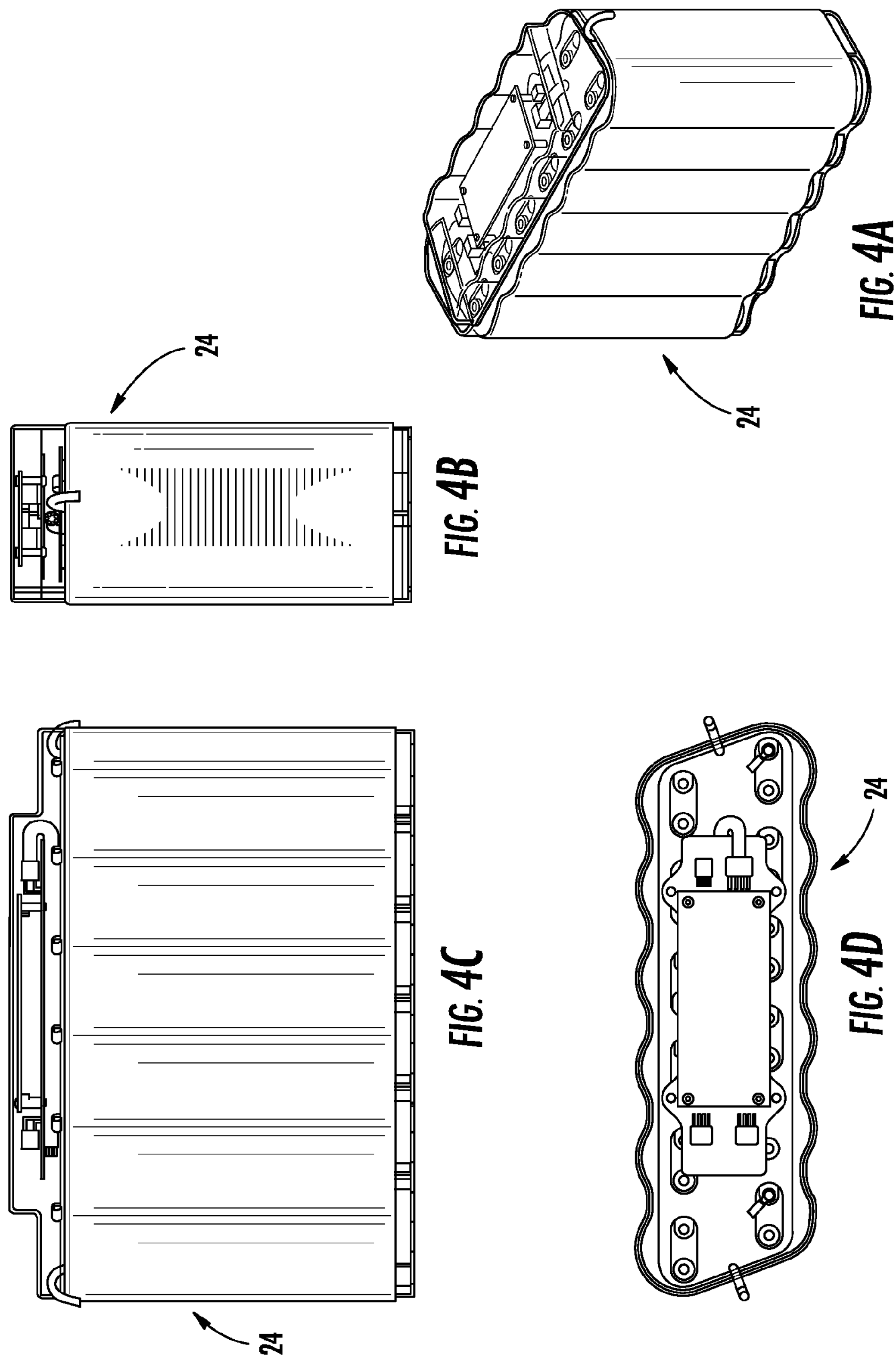
FIG. 4A is a perspective view of a battery module according to an exemplary embodiment.
FIG. 4B is an end view of the battery module shown in FIG. 4A.
FIG. 4C is a side view of the battery module shown in FIG. 4A.
FIG. 4D is a top view of the battery module shown in FIG. 4A.

Referring to FIG. 3, a top view of a battery system 22 is shown according to an exemplary embodiment. The battery system 22 includes a plurality of battery modules 24 and a battery disconnect unit 26 that includes an electronic control unit shown as a battery management system (BMS) 28. The BMS 28 monitors and regulates the current, voltage, and/or temperature of the electrochemical cells (not shown) in the battery modules.

Although illustrated in FIG. 3 as having a particular number of battery modules 24 (i.e., nine battery modules), it should be noted that according to other exemplary embodiments, a different number and/or arrangement of battery modules 24 may be included in the battery system 22 depending on any of a variety of considerations (e.g., the desired power for the battery system 22, the available space within which the battery system 22 must fit, etc.). The design and construction of the battery modules 24 allow for modular assembly (e.g., the modules may be quickly and efficiently mechanically, electrically, and/or thermally coupled to one another or with other components of the battery system 22).

Figure 5A:
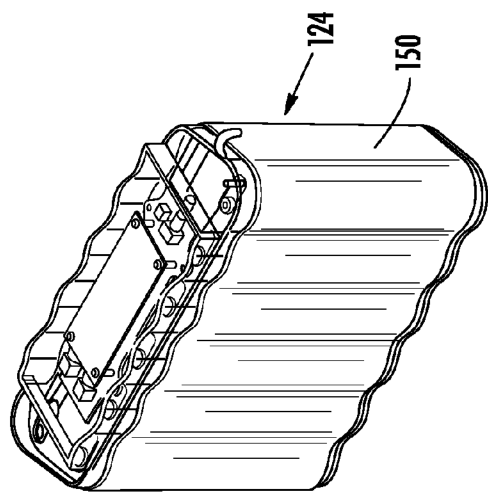
FIG. 5A is a perspective view of a battery module according to another exemplary embodiment.
Figure 5B:
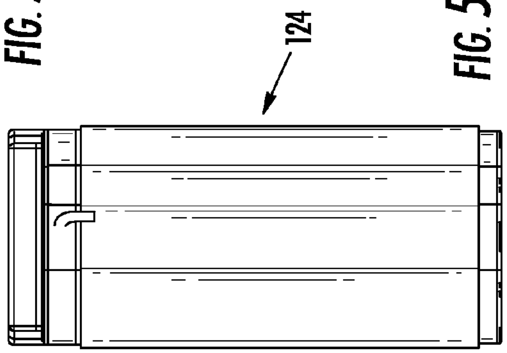
FIG. 5B is an end view of the battery module shown in FIG. 5A.
Figure 5D:
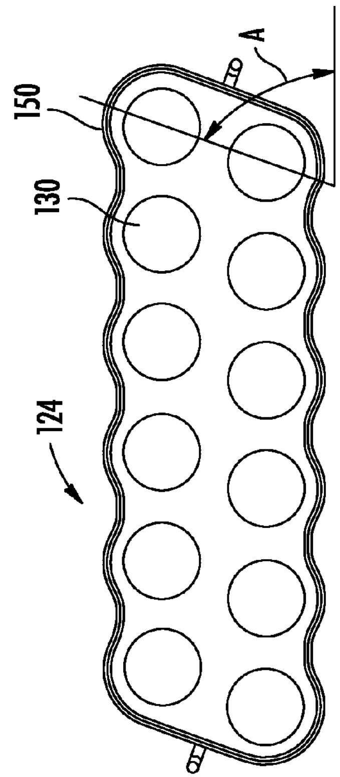
FIG. 5D is a cut-away top view of the battery module shown in FIG. 5A showing a plurality of electrochemical cells according to an exemplary embodiment
Figure 5C:
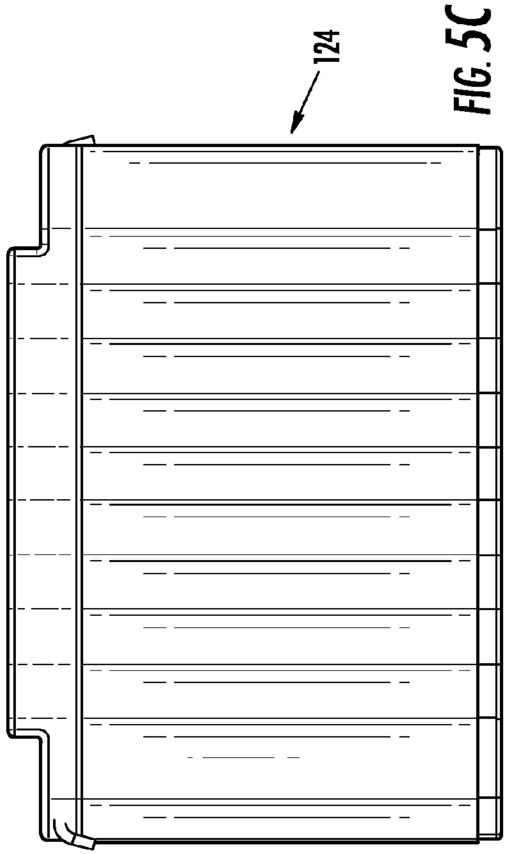
FIG. 5C is a side view of the battery module shown in FIG. 5A.
Figure 6:
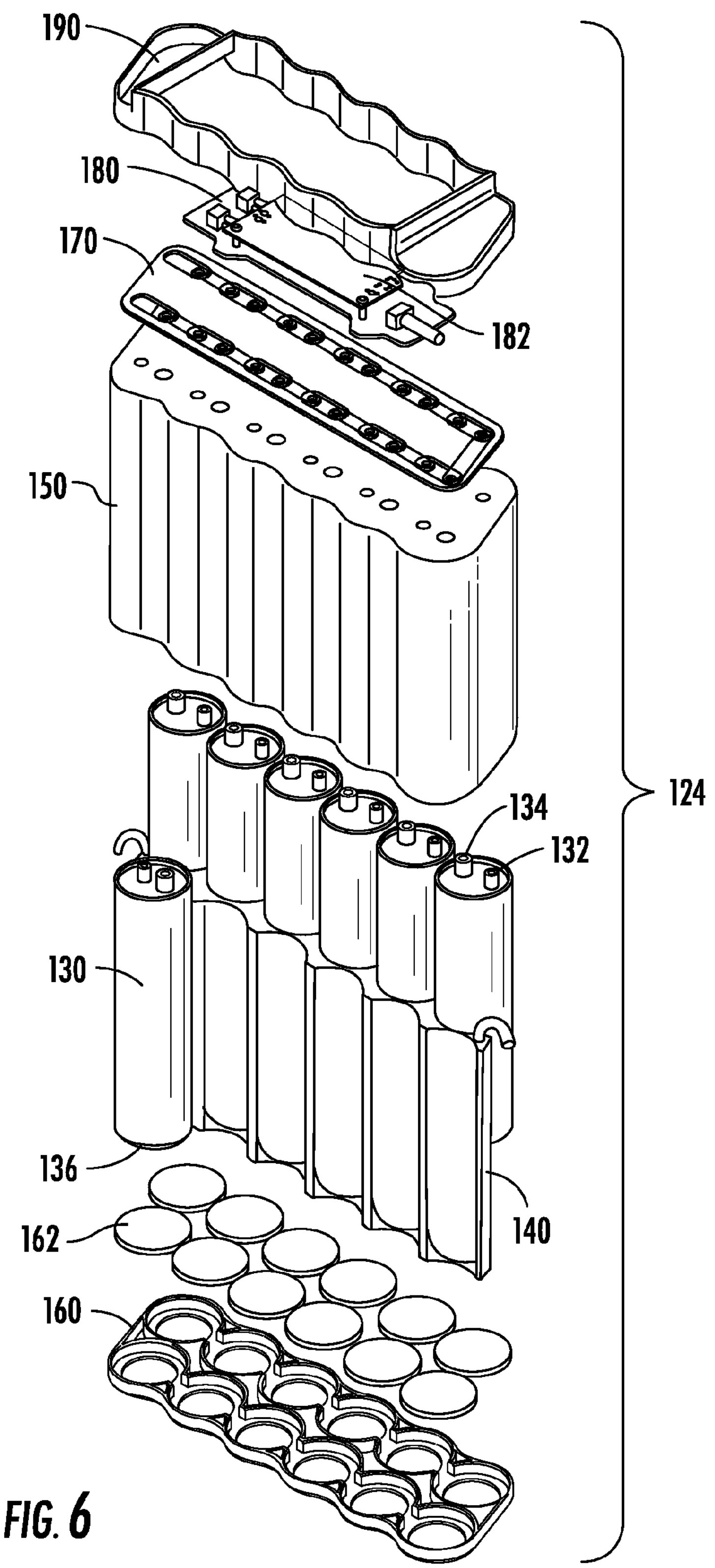
FIG. 6 is a partial exploded view of the battery module shown in FIG. 5A.
Figure 7A:
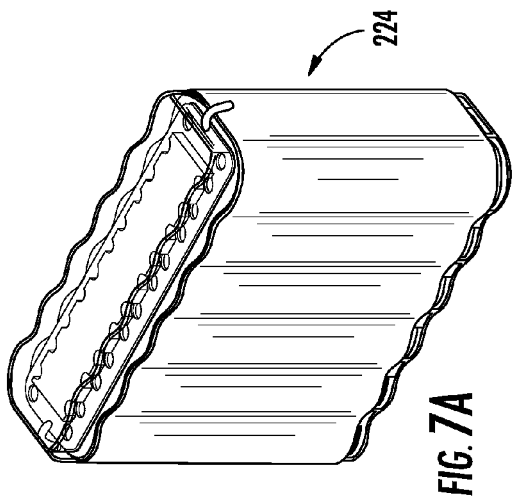
FIG. 7A is a perspective view of a battery module according to another exemplary embodiment.
Figure 7B:
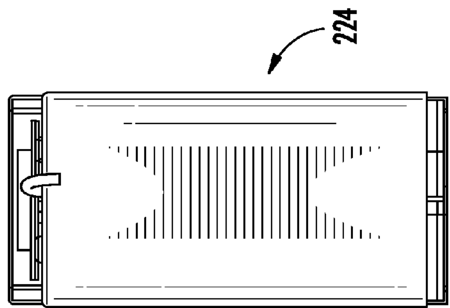
FIG. 7B is an end view of the battery module shown in FIG. 7A.
Figure 7D:
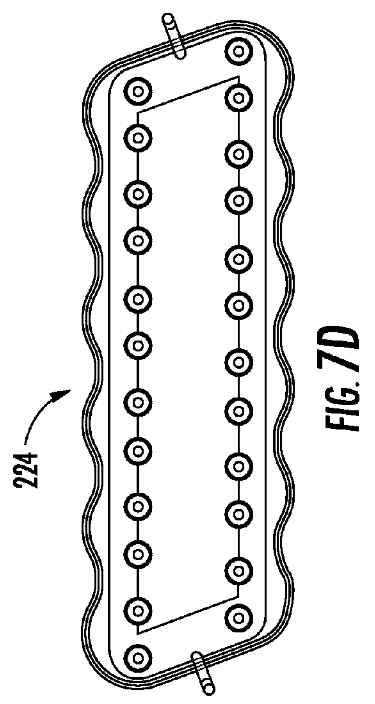
FIG. 7D is a top view of the battery module as shown in FIG. 7A.
Figure 7C:
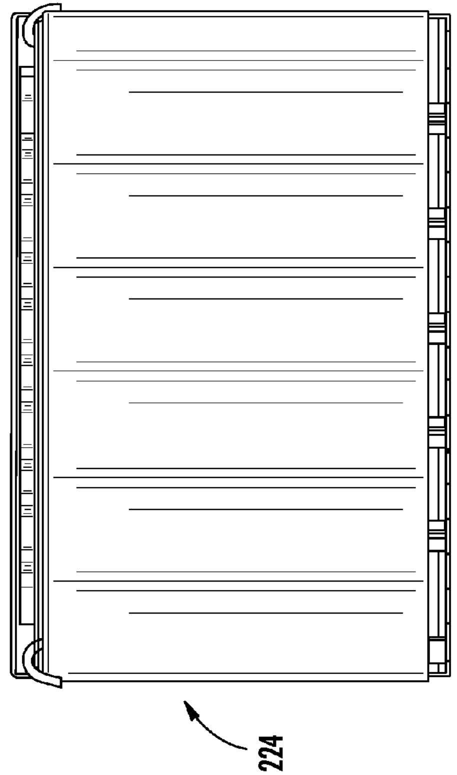
FIG. 7C is a side view of the battery module shown in FIG. 7A.
Figure 8A:
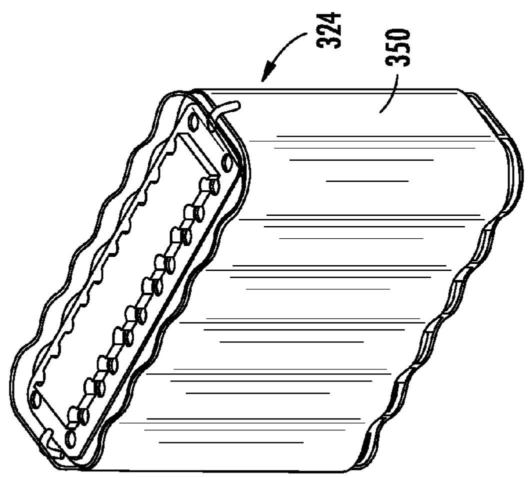
FIG. 8A is a perspective view of a battery module according to another exemplary embodiment.
Figure 8B:
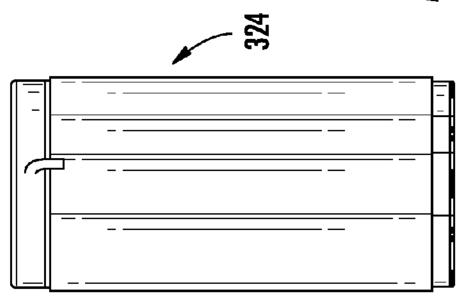
FIG. 8B is an end view of the battery module shown in FIG. 8A.
Figure 8D:
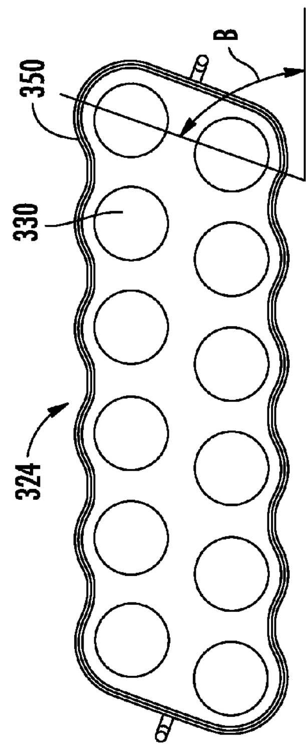
FIG. 8D is a cut-away top view of the battery module shown in FIG. 8A showing a plurality of electrochemical cells according to an exemplary embodiment.
Figure 8C:
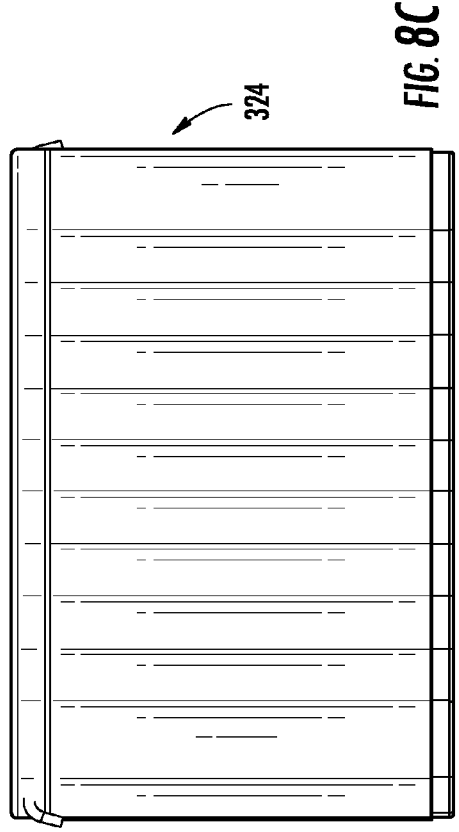
FIG. 8C is a side view of the battery module shown in FIG. 8A.
Figure 9:
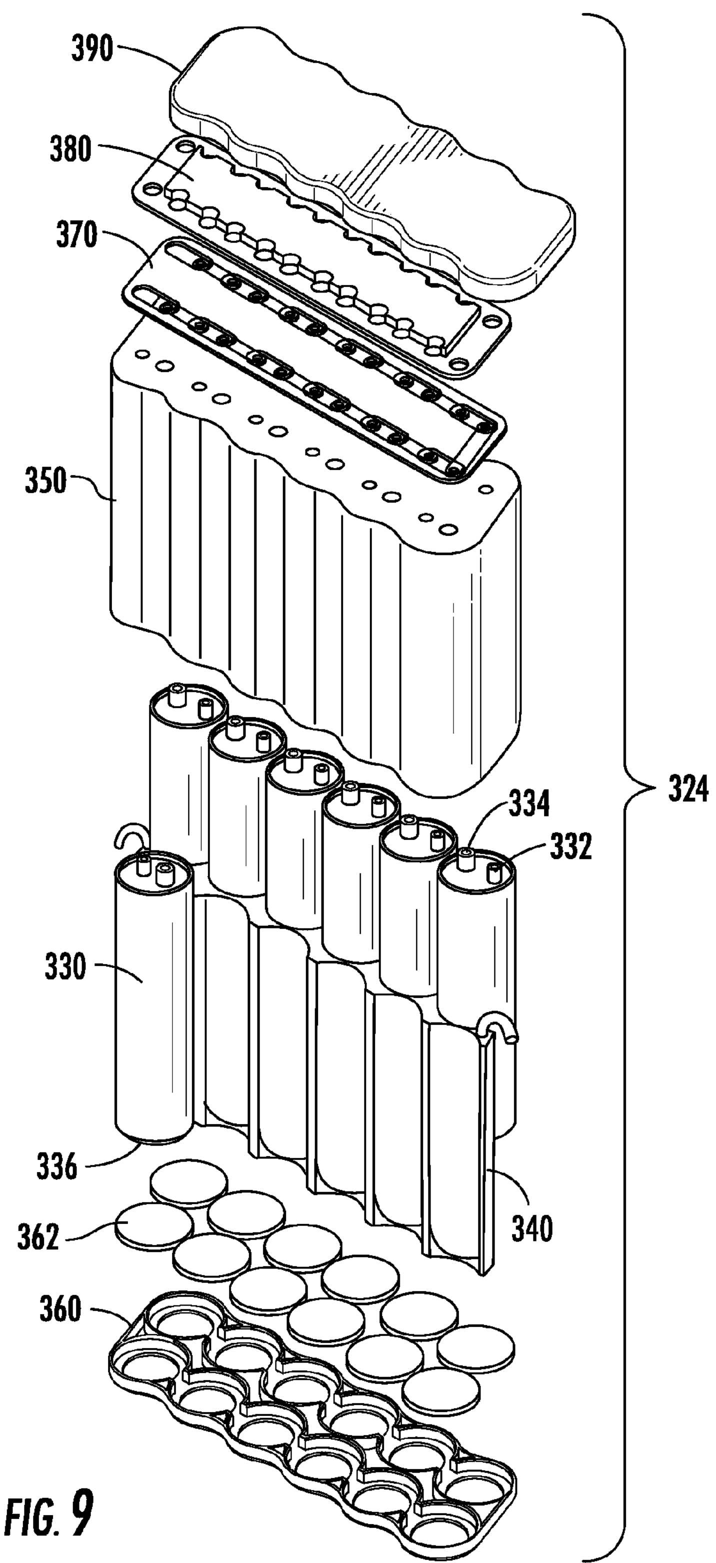
FIG. 9 is a partial exploded view of the battery module shown in FIG. 8A.

Referring now to FIGS. 4A-6, various views of battery packs or battery modules 24, 124 are shown according to various exemplary embodiments. The battery modules 24, 124 include a plurality of electrochemical cells or batteries (e.g., lithium-ion cells, nickel-metal-hydride cells, lithium polymer cells, etc., or other types of electrochemical cells now known or hereafter developed). According to an exemplary embodiment, the electrochemical cells (such as, e.g., electrochemical cells 130 as shown in FIG. 6) are generally cylindrical lithium-ion cells configured to store an electrical charge. According to other exemplary embodiments, the cells could have other physical configurations (e.g., oval, prismatic, polygonal, etc.). The capacity, size, design, and other features of the cells may also differ from those shown according to other exemplary embodiments.

Although illustrated in FIGS. 4A-6 as having a particular number of electrochemical cells (i.e., two rows of six electrochemical cells arranged side-by-side for a total of twelve electrochemical cells), it should be noted that according to other exemplary embodiments, a different number and/or arrangement of electrochemical cells may be used depending on any of a variety of considerations (e.g., the desired power for the battery system, the available space within which the battery module must fit, etc.).

According to an exemplary embodiment, the two rows of cells 130 are offset from one another (e.g., by an angle "A" as shown in FIG. 5D) to allow for an efficient use of space within the battery modules 24, 124. According to one exemplary embodiment, the two rows of cells 130 are offset from one another at an angle A between approximately 60 degrees and 80 degrees, although this angle A may be greater or lesser according to other embodiments (e.g., the cells 130 may be offset from one another at an angle A of 45 degrees). According to a particular exemplary embodiment, the two rows of cells 130 are offset from one another at an angle A of approximately 70 degrees.

Referring to FIG. 6, a partial exploded view of the battery module 124 is shown according to an exemplary embodiment. The battery module 124 includes a plurality of the electrochemical cells 130 provided side-by-side in two rows. A heat exchanger 140 is provided in between the two rows of cells 130 and is configured to provide cooling and/or heating to the cells 130. A body or housing 150 is provided around the cells 130 to at least partially or substantially enclose the cells 130 (as illustrated, the walls of the housing have an undulating or wavy shape that is complementary to the shape of the cylindrical cells so that the housing can be in contact with external surfaces of the cells). A member or bottom shown as a tray 160 is provided below the cells 130 and attaches to the lower portion of the body to form a base. A plurality of members or elements provided in the form of inlays 162 are provided in the tray 160 and are situated below the individual cells 130.

According to an exemplary embodiment, a bus bar assembly 170 is provided on top of the housing 150 and is configured to electrically connect one or more of the cells 130 to one another or to other components of the battery system 22. A cell supervisory controller (CSC) 182 and a traceboard 180 are provided above the bus bar assembly 170. A cover 190 is provided above the CSC 182, traceboard 180, and bus bar assembly 170 and attaches to an upper portion of the housing 150. The cover 190 is configured to substantially enclose the CSC 182, traceboard 180, and bus bar assembly 170.

Each of the electrochemical cells 130 includes a plurality of terminals (e.g., two terminals). According to an exemplary embodiment, the electrochemical cells 130 include one positive terminal 132 and one negative terminal 134 at a first end of the cell 130 (e.g., as shown in FIG. 6). The electrochemical cells 130 also include a vent 136 at a second end of the cell 130 opposite of the first end. The vent 136 is configured to break away (i.e., deploy) from the cell 130 once the internal pressure of the cell 130 reaches a predetermined level. When the vent 136 is deployed (i.e., broken away from the cell), gases and/or effluent may be released from the cell 130. According to an exemplary embodiment, the vent 136 is a circular vent disk located at the bottom of the cell 130. According to other exemplary embodiments, the cells 130 may have different terminal and/or vent configurations (e.g., the positive terminal may be located on one end of the cell 130 and the negative terminal may be located on the opposite end of the cell 130).

Figure 10B:
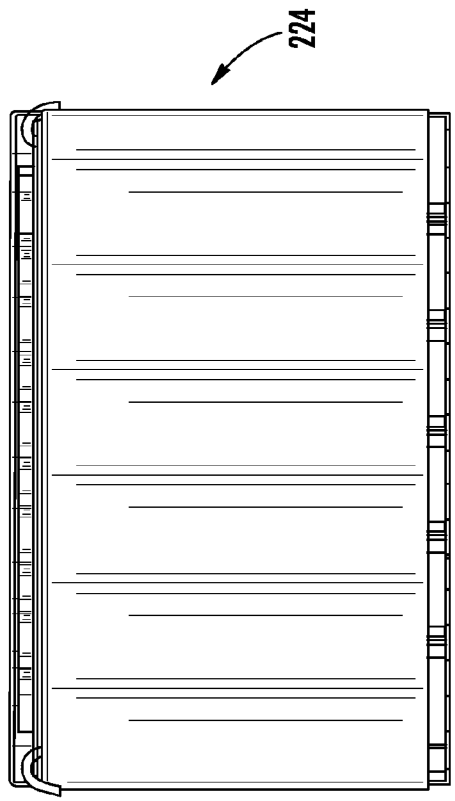
FIGS. 10A and 10B are side-by-side comparisons of the battery module shown in FIGS. 4A and 7A according to an exemplary embodiment.
Figure 10A:
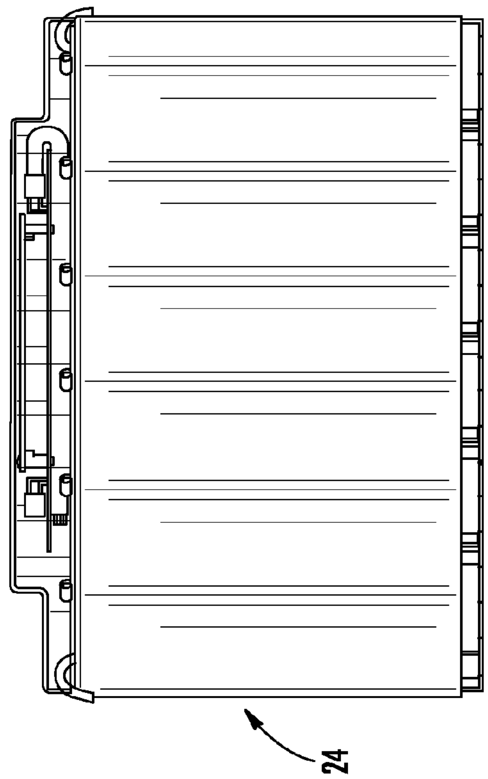

Referring now to FIGS. 7A-9, battery modules 224, 324 are shown according to various exemplary embodiments. The battery modules 224, 324 shown in FIGS. 7A-9 are similar to the battery modules shown in FIGS. 4A-6, with one difference being that the battery modules 224, 324 shown in FIGS. 7A-9 do not include a separate traceboard (i.e., the traceboard is included in the CSC). By including the traceboard in the design of the CSC, the height of the battery modules 224, 324 is less than that of the battery modules shown in FIGS. 4A-6 (as shown, for example, in FIGS. 10A and 10B).

Figure 11B:
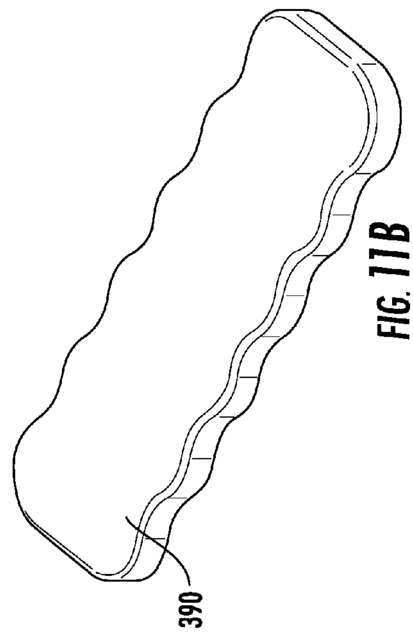
FIG. 11B is a perspective view of a cover for a battery module according to another exemplary embodiment.
Figure 11A:
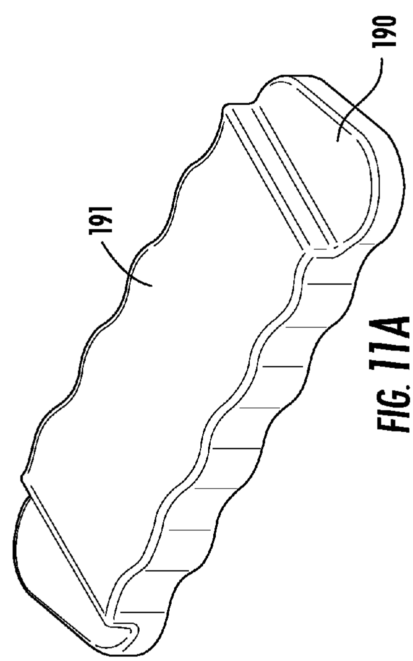
FIG. 11A is a perspective view of a cover for a battery module according to an exemplary embodiment.

Referring to FIGS. 11A and 11B, a cover 190, 390 for the battery module 124, 324 is shown according to a first exemplary embodiment and a second exemplary embodiment. The external shape of the cover 190, 390 is configured to match the external shape of the housing 150, 350. The cover 190, 390 may be provided with features to allow the cover 190, 390 to be coupled to the housing 150, 350 (e.g., snap-fit features). The cover 190, 390 may be made of a polymeric material or other suitable material (e.g., an electrically insulative material).

The main difference between the cover 190 and cover 390 is that the cover 190 includes a raised portion or area 191. The raised portion 191 of the cover 190 is included to provide room for the CSC 182 (as shown in FIG. 6).

Figure 12:
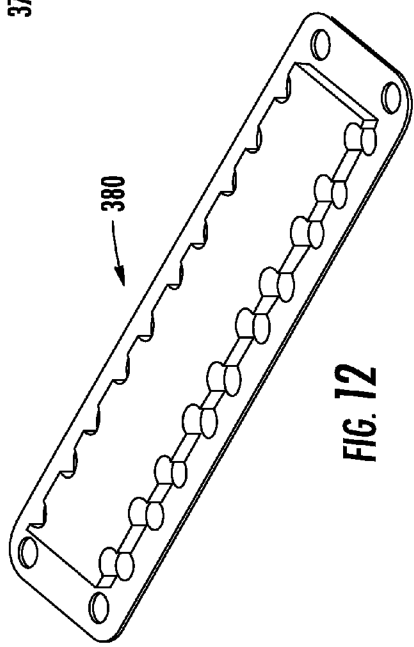
FIG. 12 is a perspective view of a cell supervisory controller (CSC) according to an exemplary embodiment.

Referring now to FIG. 12, a CSC 380 is shown according to an exemplary embodiment. The CSC 380 is configured to monitor and/or regulate the temperature, current, and/or voltage of the cells 130 and includes the necessary sensors and electronics to do so (not shown). The CSC 380 may receive a signal from the BMS (e.g., the CSC may be a slave module to the BMS) to balance or regulate the cells 130.

According to an exemplary embodiment, the CSC 380 includes the components that would otherwise be present in a traceboard (e.g., such as the traceboard 180 as shown in FIG. 6). By including the components of the traceboard (e.g., such as electrical contacts, conductive lines, connectors, sensors such as temperature sensors, voltage sensors, current sensors, etc.) within the CSC 380, the CSC 380 will have a relatively thinner profile than that of the combination of the traceboard 180 and CSC 182 shown in FIG. 6. Therefore, a relatively thinner profile cover 390 may be utilized with the CSC 380. Additionally, the CSC 380 eliminates the need for an additional component (i.e., the traceboard), allowing greater speed and efficiency in the assembly of the battery module and/or lower cost of the battery module.

Figure 13:
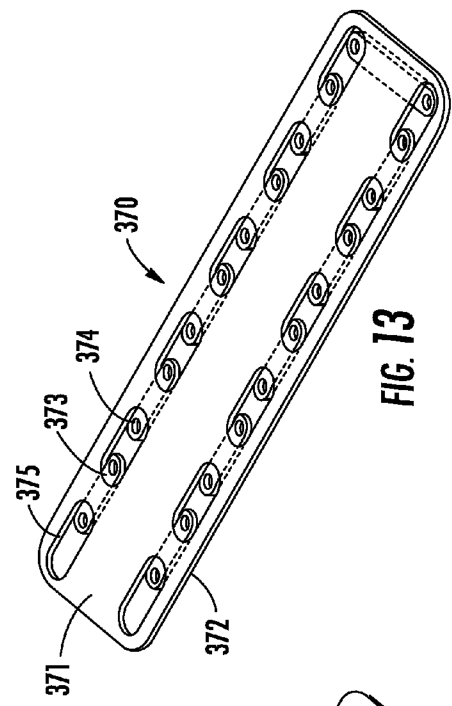
FIG. 13 is a perspective view of a bus bar assembly according to an exemplary embodiment.

Referring now to FIG. 13, a bus bar assembly 370 is shown according to an exemplary embodiment. The bus bar assembly 370 includes a base member or substrate shown as a first layer 371 and a plurality of conductive members or elements shown as bus bars 373 coupled to the first layer 371. Each bus bar 373 has an opening or aperture 374 at either end thereof that is accessible via an opening or aperture 375 in the first layer 371. The apertures 374 are configured to align with the terminals of the electrochemical cells in order to electrically couple the cells together (e.g., by welding, fasteners, etc.). According to an exemplary embodiment, the bus bar assembly 371 may include a second layer 372 that is configured to sandwich the bus bars 373 in between the first layer 371 and the second layer 372. According to an exemplary embodiment, the bus bars 373 are constructed from copper or copper alloy (or other suitable material) and the first layer 371 and second layer 372 are constructed from a polymeric material such as Mylar® (or other suitable material).

Figure 14A:
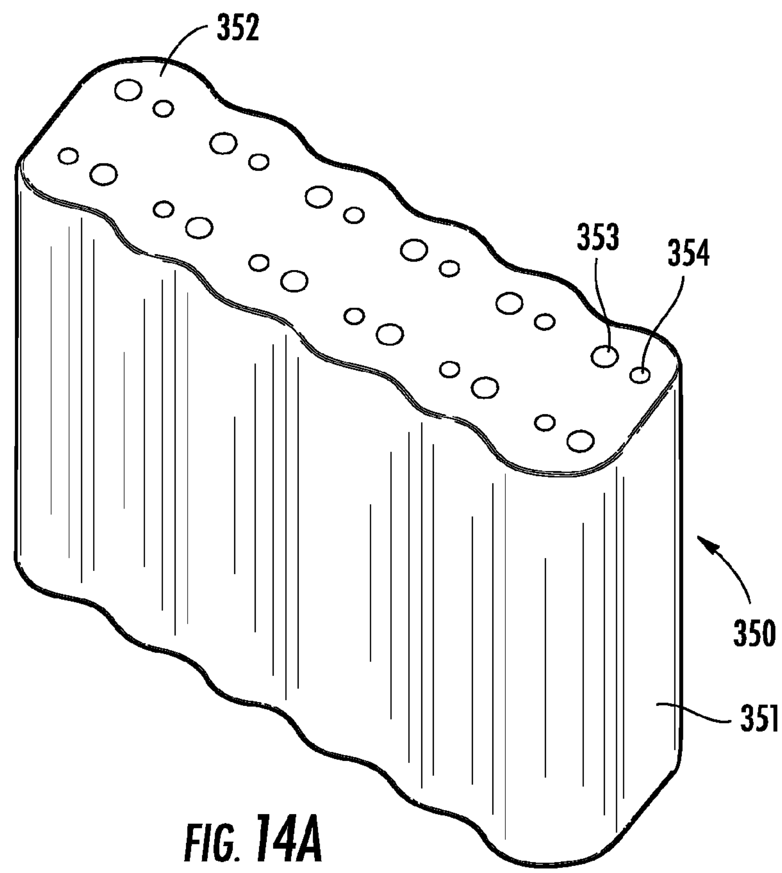
FIGS. 14A and 14B are perspective views of a housing for use with a battery module according to an exemplary embodiment.
Figure 14B:
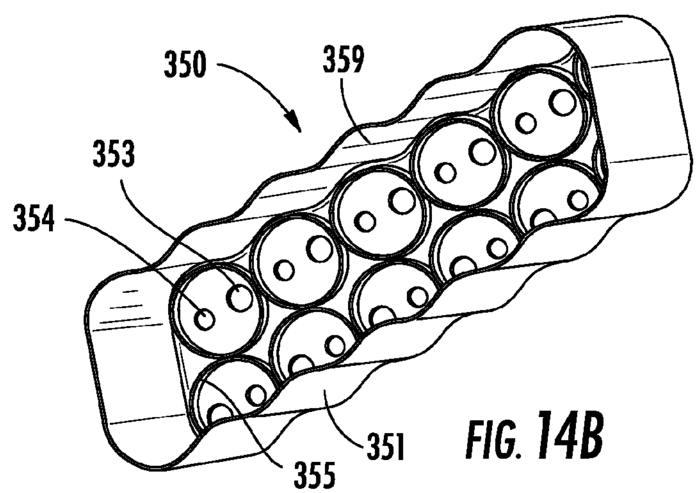

Referring now to FIGS. 14A and 14B, a body or housing 350 is shown according to an exemplary embodiment. An internal surface 359 of the housing 350 is contoured to match the exterior shape of the cells 330. According to an exemplary embodiment, the housing 350 includes an external surface 351 that substantially complements the shape of the internal surface 359 such that the housing 350 substantially matches the offset configuration of the cells 330. Having the housing 350 substantially match the exterior shape of the cells 330 allows portions of the housing 350 to next with complementary features of a housing of an adjacent battery module 324 when provided in a battery system. As illustrated in this embodiment and in other embodiments of housings shown and described in the present application, the undulating or wavy walls of the housing complement the shapes of the cells to allow close contact between the housing and the cells and to allow for nesting of the housing with housings of adjacent battery modules in a battery system.

According to an exemplary embodiment, a top portion 352 of the housing 350 includes a plurality of apertures 353, 354 configured to allow the terminals of the electrochemical cells 330 to pass through. For example, the aperture 353 may have a first diameter and the aperture 354 may have a second diameter that is smaller than the first diameter such that the terminals of the electrochemical cells 330 may only be received in the proper configuration. An interior side of the top portion of the housing 350 includes a plurality of features or flanges 355 to generally fix (e.g., retain, hold, etc.) the upper end of the cells 330 and to hold them in position in relation to the other cells 330. The housing 350 may be made of a polymeric material or other suitable material (e.g., an electrically insulative material).

Referring now to FIGS. 15A-15E, a heat exchanger 340 is shown according to an exemplary embodiment. The heat exchanger 340 is configured to be provided between two rows of the electrochemical cells 330 as shown in FIG. 15E (e.g., the heat exchanger 340, as well as other embodiments of heat exchangers shown and described in this application, have an undulating or wavy structure and/or otherwise has a shape that is intended to allow the heat exchanger to fit between the adjacent offset rows of electrochemical cells such that the heat exchanger makes contact with external surfaces of the cells). The heat exchanger 340 is provided with a first opening or inlet 341 and a second opening or outlet 342. A main body of the heat exchanger 340 has external surfaces 343 that define a space between which fluid (e.g., a heating and/or cooling fluid such as a refrigerant, water, water/glycol mixture, etc.) may flow between opening 341 and opening 342.

The first and second openings 341, 342 act as inlets/outlets for the fluid. The openings 341, 342 may be provided with a quick-connect feature to allow the heat exchanger 340 to be quickly and efficiently connected to a heat exchanger 340 of an adjacent battery module 324 or to a manifold (that provides the fluid for heating and/or cooling).

According to an exemplary embodiment, the fluid is a water/glycol mixture (e.g., a 50/50 water/glycol mixture), although according to other exemplary embodiments, the fluid may be any suitable type of fluid for use in heating/cooling applications.

The external surface 343 of the heat exchanger 340 includes a plurality of vertically-oriented troughs 344 (grooves, depressions, valleys, etc.) and peaks 345 that are configured to receive a portion of an exterior surface 338 of each of the electrochemical cells 330 to provide heat transfer to/from the electrochemical cells 330.

According to an exemplary embodiment, the heat exchanger 340 may be made of a polymeric material (e.g., polypropylene) or other suitable material that allows for heat conduction to/from the cells 330 (e.g., an electrically insulative and thermally conductive material). According to another exemplary embodiment, the heat exchanger 340 may be made of a metallic material (e.g., aluminum or aluminum alloy) or other suitable material (e.g., when the external surface of the cells 330 are not electrically charged (e.g., can neutral) or a separate electrically insulative and thermally conductive material is provided between the cells and the heat exchanger). According to another exemplary embodiment, the heat exchanger 340 may be made of a ceramic material or other suitable material. According to an exemplary embodiment, the heat exchanger 340 may be made from a blow molding process, an injection molding process, or other suitable process.

As best shown in FIGS. 15D and 15E, the shape of the heat exchanger 340 is configured to match the external shape of the electrochemical cells 330 and is provided in physical contact with the cells 330. According to an exemplary embodiment, the portion of the heat exchanger 340 in contact with each cell 330 (i.e., the angle of contact "C") is approximately the same for each cell 330. According to a particular exemplary embodiment, the angle of contact C is approximately 111 degrees. According to another exemplary embodiment, the angle of contact C may be varied for each cell 330 in order to provide even heating and/or cooling to each cell 330 (e.g., to compensate for the drop/rise in temperature of the fluid as it flows through the heat exchanger 340).

According to an exemplary embodiment, the wall thickness of the heat exchanger 340 is between approximately 0.5 millimeters and 1.5 millimeters. According to another exemplary embodiment, the wall thickness of the heat exchanger 340 is approximately 1 millimeter. According to an exemplary embodiment, the overall thickness of the heat exchanger 340 is between approximately 4 millimeters and 36 millimeters. According to another exemplary embodiment, the overall thickness of the heat exchanger 340 is approximately 16 millimeters. According to other exemplary embodiments, the wall thickness and/or overall thickness of the heat exchanger 340 may vary according to other exemplary embodiments.

Figure 16:
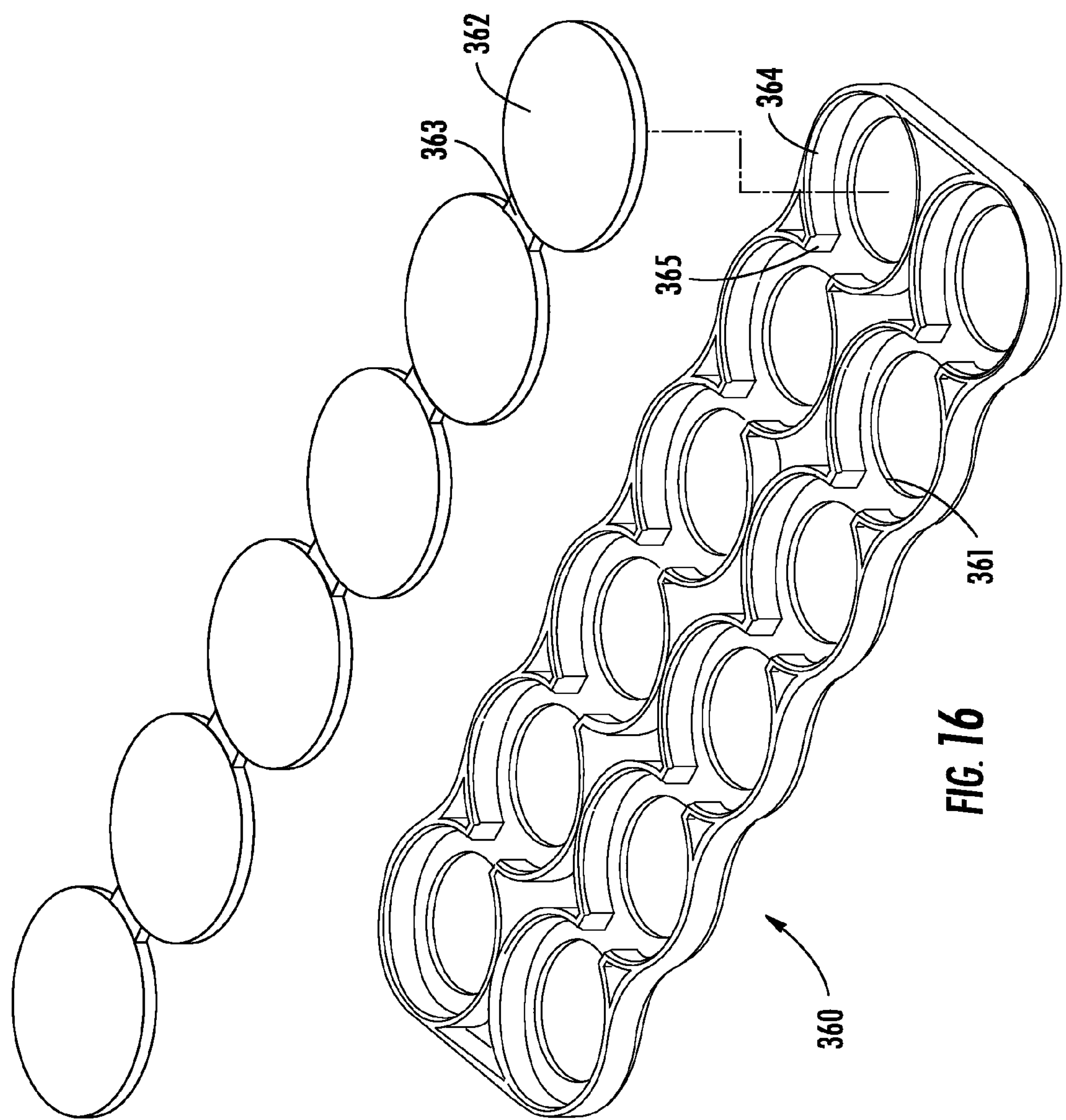
FIG. 16 is a partial exploded view of an inlay being provided in a tray for use with a battery module according to an exemplary embodiment.

Referring now to FIG. 16, an inlay 362 is shown being provided in a tray 360 (e.g., base, bottom, structure, etc.) according to an exemplary embodiment. The inlay 362 may be constructed from EPDM foam (or any other suitable material) and is configured to seal the individual cells from any gases that are vented from other cells 330. The inlay 362 is configured to open (e.g., tear) if the vent device of the electrochemical cell 330 is deployed, allowing the vented gases from the cell to pass through the inlay 362. The inlays 362 also take up any dimensional tolerance variation of the battery module 324 during assembly. Additionally, the inlay 362 may aid in isolating the electrochemical cells 330 from vibrations (e.g., during operation of the vehicle).

As shown in FIG. 16, the inlay 362 includes a plurality of circular-shaped disks that are connected to one another by an element or connecting portion 363. As shown in FIG. 16, a single row of inlays 362 is provided for each row of cells. However, the inlays 362 may be provided as individual inlays 362 (e.g., individual circular disks) for each individual electrochemical cell 330 according to another exemplary embodiment.

According to an exemplary embodiment, the tray 360 is provided with a plurality of features or sockets each having a flange or wall 364. The walls 364 aid in retaining the lower end of the cells 330 in relation to each other. The sockets also include a plurality of apertures 361 that allow gases and/or effluent to pass through if the cell 330 should vent (via the vent 336). According to an exemplary embodiment, the tray 360 is constructed from a polymeric material and is coupled to the body via fasteners. According to another exemplary embodiment, the tray 360 may otherwise be fastened to the body (e.g., with a snap-fit connection, glued, etc.). The tray 360 is configured to receive the inlay 362 therein, and cutouts 365 are provided between adjacent spaces to allow the connecting portions or elements that connect the circular-shaped disks together to pass therethrough.

Figure 17:
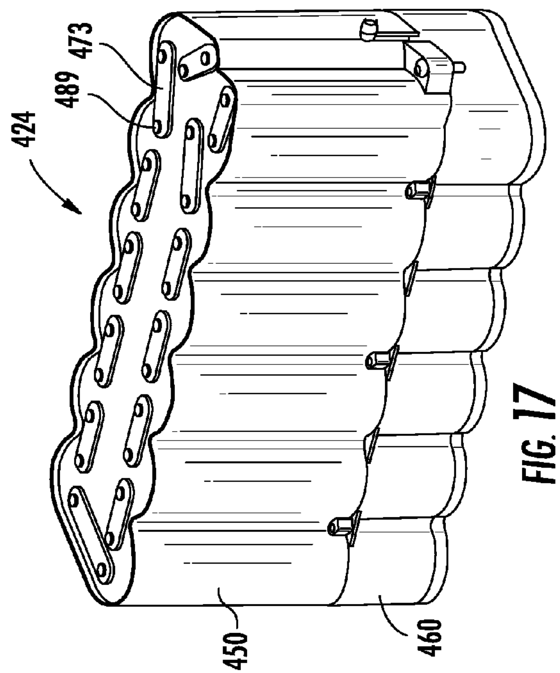
FIG. 17 is a perspective view of a battery module according to another exemplary embodiment.

Referring now to FIG. 17, a perspective view of a battery module 424 is shown according to another exemplary embodiment. The battery module 424 may include many of the same or similar features as previously discussed with respect to FIGS. 1-16. Therefore, only a few of the features of the battery module 424 will be discussed in more detail below.

The battery module 424 includes a plurality of electrochemical cells or batteries (e.g., lithium-ion cells, nickel-metal-hydride cells, lithium polymer cells, etc., or other types of electrochemical cells now known or hereafter developed). According to an exemplary embodiment, the electrochemical cells (not shown) are generally cylindrical lithium-ion cells configured to store an electrical charge. According to other exemplary embodiments, the cells could have other physical configurations (e.g., oval, prismatic, polygonal, etc.). The capacity, size, design, and other features of the cells may also differ from those shown according to other exemplary embodiments.

According to an exemplary embodiment, the electrochemical cells are arranged in two rows of six cells each for a total of twelve cells. However, the battery module 424 may include a greater or lesser number of cells according to other exemplary embodiments. The cells are partially or substantially enclosed by a housing 450 and a lower portion or tray 460. The housing 450 has an interior surface substantially conforming to the exterior of the cells. The housing 450 also has an external surface substantially conforming to the exterior of the cells (e.g., the external surface of the housing is complementary to the internal surface of the housing). As such, the housing 450 is configured to be nested with an adjacent battery module 424 to efficiently use the space within a battery system (not shown).

Figure 18:
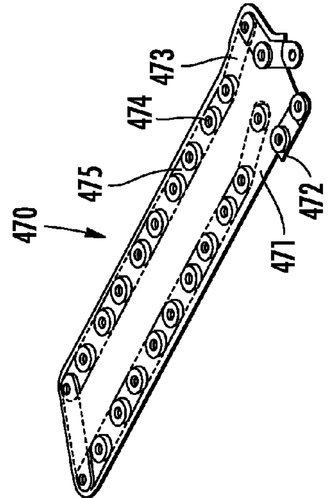
FIG. 18 is a perspective view of a bus bar assembly for use with a battery module according to another exemplary embodiment.

The battery module 424 also includes a bus bar assembly 470 (e.g., such as shown in FIG. 18). The bus bar assembly 470 includes a base member or substrate and a plurality of conductive members or elements that are configured to electrically couple one or more of the electrochemical cells or other components of the battery module 424 together.

According to an exemplary embodiment, the bus bar assembly 470 includes a plurality of bus bars 473 provided on a first layer or substrate 471 (e.g., a plastic or film such as Mylar®). According to another embodiment, a second layer 472 may be provided to sandwich the plurality of bus bars 473 between the first layer 471 and the second layer 472. As shown in FIG. 18, each of the plurality of bus bars 473 includes an aperture or opening 474 provided at each end of each of the bus bars 473. These openings 474 are configured to receive a fastener 489 in order to couple the bus bar 473 to a terminal of an electrochemical cell.

Figure 19:
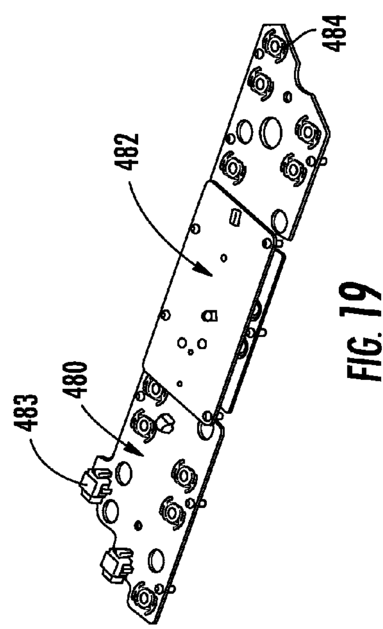
FIG. 19 is a perspective view of a trace board and CSC assembly for use with a battery module according to another exemplary embodiment.

The battery module 424 further includes a traceboard 480 and a CSC 482 (e.g., such as shown in FIG. 19). According to exemplary embodiment, the traceboard 480 includes a plurality of flexible contacts 484. The flexible contacts 484 may be similar to the flexible contacts 584 as shown as described in FIG. 33A. According to an exemplary embodiment, the flexible contacts 484 may be connected to connectors 483 by a plurality of conductive lines or wires (not shown). According to an exemplary embodiment, the traceboard 480 may also include a plurality of various sensors (e.g., voltage sensors, temperature sensors, etc.) and other electrical components.

According to an exemplary embodiment, the CSC 482 may be mechanically coupled (e.g., by fasteners) to the traceboard 480. Additionally, the CSC 482 may be electrically coupled with the traceboard 480 by a cable or connector (not shown). The CSC 482 is configured to monitor and/or regulate the temperature, current, and/or voltage of the electrochemical cells and includes the necessary sensors and electronics to do so (not shown).

Figure 20:
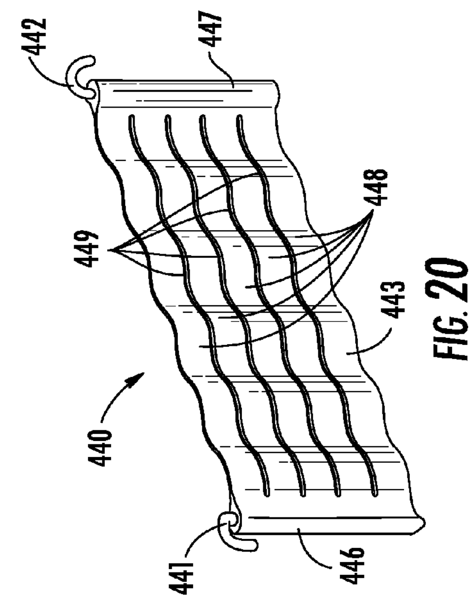
FIG. 20 is a perspective view of a heat exchanger for use with a battery module according to another exemplary embodiment.

The battery module 424 further includes a heat exchanger 440 (e.g., such as shown in FIG. 20) that is provided in between the two rows of electrochemical cells to provide heating and/or cooling to the cells. The heat exchanger 440 includes a plurality of individual cooling bands or portions (e.g., fluid flow segments) shown as discrete paths 448 connected at their ends by connecting portions or manifolds 446, 447 and separated from each other by gaps 449 (although shown as gaps 449, according to other exemplary embodiments, the gaps may be replaced by solid portions within the heat exchanger that divide the paths from each other).

In this manner, the fluid flow through the heat exchanger is divided into multiple segments that extend between the inlet manifold and the outlet manifold (i.e., the fluid flows in one direction through the heat exchanger, from the inlet manifold to the outlet manifold, with the fluid divided into multiple segments or paths as it flows through the manifold). According to an exemplary embodiment, the heat exchanger 440 includes a first opening 441 and a second opening 442 which are configured to act as inlets/outlets for the cooling/heating fluid.

As shown in FIG. 20, the heat exchanger 440 includes five individual paths 448, but may include a greater or lesser number of paths 448 according to other exemplary embodiments. Each of the paths 448 is configured to allow a fluid to flow therethrough (i.e., the outer walls of each of the paths 448 define a space through which the fluid may flow). The heat exchanger 440 is configured to aid in providing even heating and/or cooling to the cells (e.g., by avoiding any "dead spots" or areas of non-moving fluid).

According to an exemplary embodiment, the fluid enters the opening 441 and flows into the manifold 446. From the manifold 446, the fluid flows from the first end of the heat exchanger 440 towards the second end of the heat exchanger 440 through any of the multiple discrete paths 448. The fluid then exits the discrete paths 448 and enters the manifold 447, where the fluid then exits the heat exchanger 440 through the opening 442. According to another exemplary embodiment, the fluid may flow in the opposite direction (i.e., the fluid may enter the opening 442 and exit the opening 441).

According to an exemplary embodiment, the heat exchanger 440 may be made of a polymeric material (e.g., polypropylene) or other suitable material that allows for heat conduction to/from the cells (e.g., an electrically insulative and thermally conductive material). According to another exemplary embodiment, the heat exchanger 440 may be made of a metallic material (e.g., aluminum or aluminum alloy) or other suitable material (e.g., when the external surface of the cells are not electrically charged (e.g., can neutral) or a separate electrically insulative and thermally conductive material is provided between the cells and the heat exchanger). According to another exemplary embodiment, the heat exchanger 440 may be made of a ceramic material or other suitable material. According to an exemplary embodiment, the heat exchanger 440 may be made from a blow molding process, an injection molding process, or other suitable process.

Figures 21, 22, 22A, 22B:
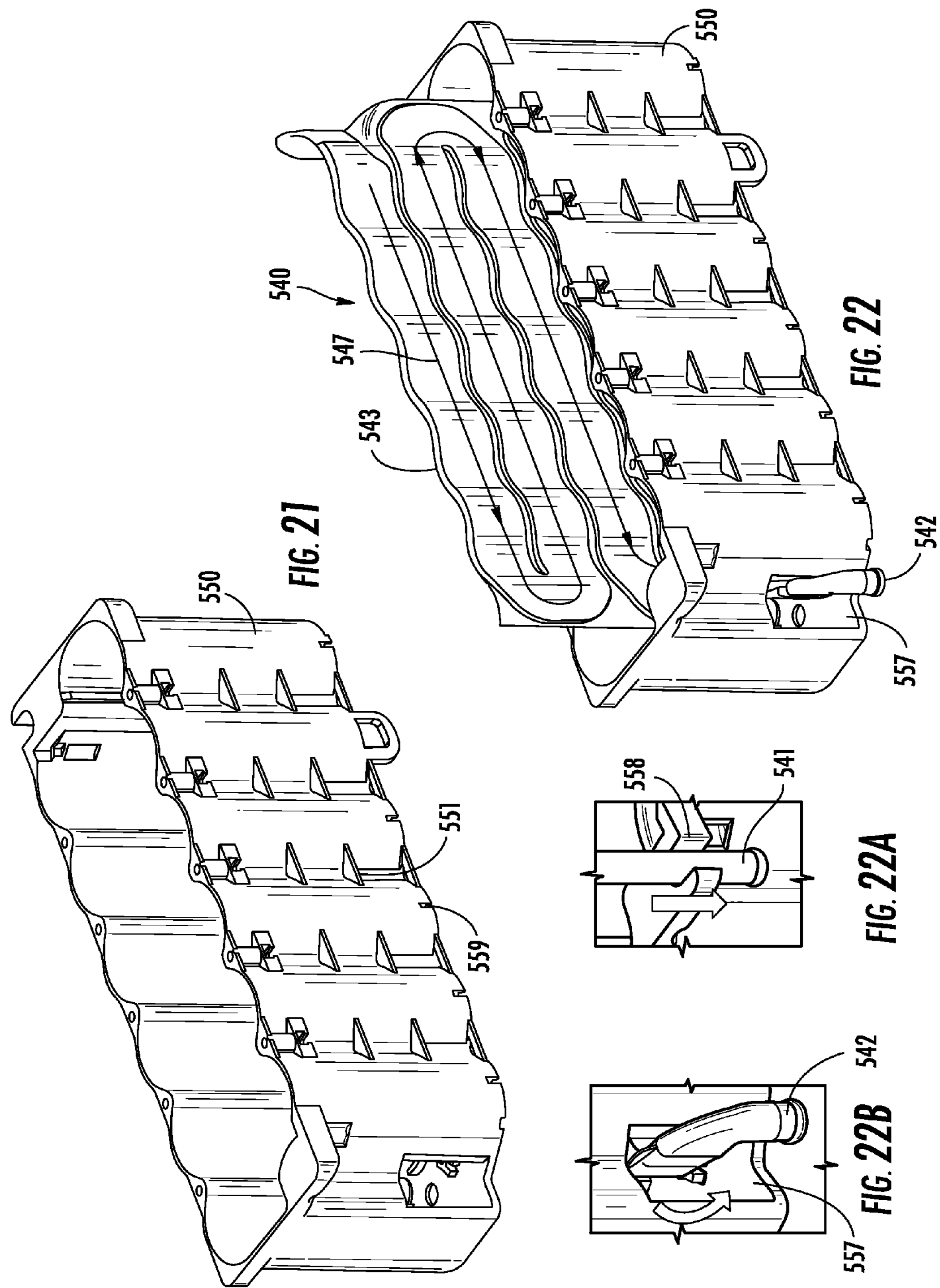
FIG. 21 is a perspective view of a housing for a battery module according to an exemplary embodiment.
FIG. 22 is a perspective view of a heat exchanger inserted into the housing shown in FIG. 21 according to an exemplary embodiment.
FIGS. 22A and 22B are partial perspective views of the placement of the inlet/outlet of the heat exchanger shown in FIG. 22 according to an exemplary embodiment.

Referring now to FIGS. 21-35, a method of assembling a battery module 524 is shown according to an exemplary embodiment. As shown in FIG. 21, the battery module 524 includes a structure shown as a housing 550 (shown upside down). The housing 550 includes a plurality of openings or apertures 559 that are configured to allow a liquid (e.g., condensate, effluent and/or gases vented from electrochemical cells within the housing, etc.) to exit the housing 550. The apertures 559 may be located in various positions throughout the housing 550 depending on the orientation that the module 524 is mounted. The housing 550 also includes a plurality of structures shown as ribs 551 provided on an external surface of the housing 550. According to an exemplary embodiment, the ribs 551 provide additional structural rigidity to the housing 550 and/or may be used in forming the housing 550.

Referring now to FIG. 22, a heat exchanger 540 is provided within the housing 550. The heat exchanger 540 includes a first opening 541 and a second opening 542. As shown in FIGS. 22A-22B, the first opening 541 is provided in a slot or cutout 558 in the housing 550 and the second opening 542 is provided in an opening or aperture 557 in the housing 550. According to an exemplary embodiment, the opening 541 is an inlet configured to receive a fluid (e.g., water, water/glycol mixture, refrigerant, etc.) and the opening 542 is an outlet. According to another exemplary embodiment, the opening 542 may be an inlet and the opening 541 may be an outlet.

Figures 23, 24, 25:
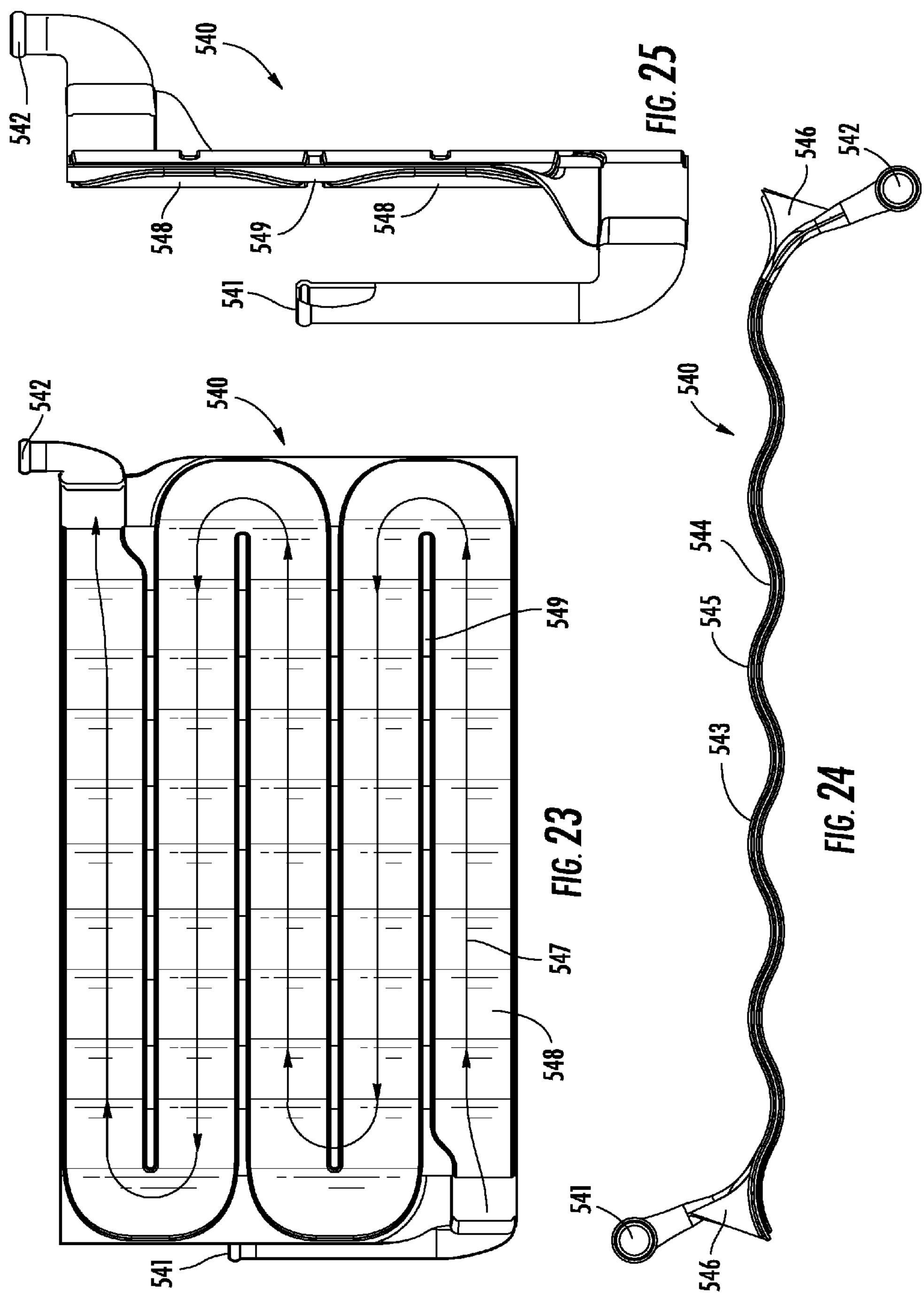
FIG. 23 is a side view of the heat exchanger shown in FIG. 22 according to an exemplary embodiment.
FIG. 24 is a top view of the heat exchanger shown in FIG. 23.
FIG. 25 is an end view of the heat exchanger shown in FIG. 23.
Figure 26:
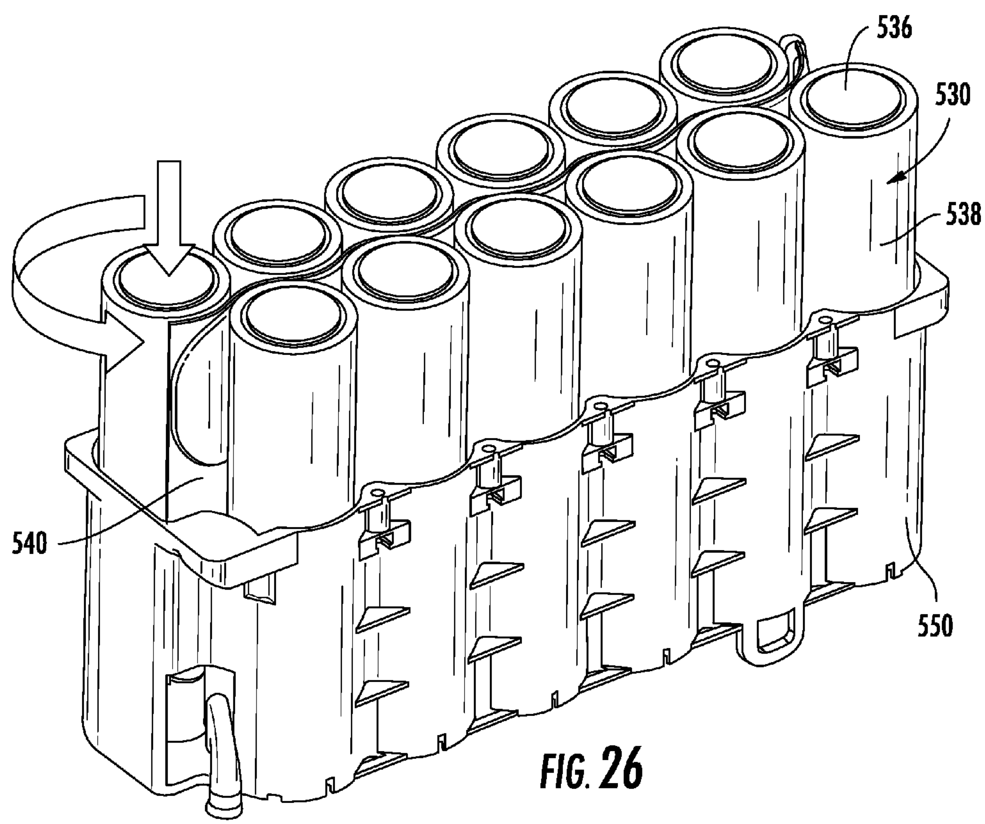
FIG. 26 is a perspective view of a plurality of cells being inserted into the housing shown in FIG. 22 according to an exemplary embodiment.
Figure 26A:
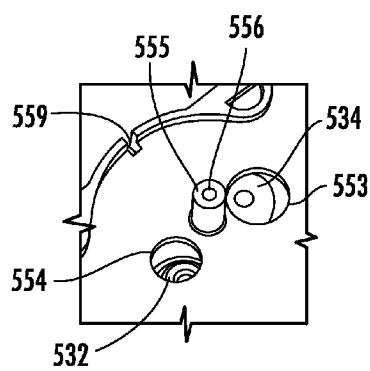
FIGS. 26A and 26B show the proper assembly of the electrochemical cells into the housing shown in FIG. 26.

As shown in FIGS. 23-25, the heat exchanger 540 includes external surfaces 543 that are configured to receive a portion of an external surface 538 of the electrochemical cells 530 (e.g., as shown in FIG. 26). The external surfaces 538 include vertically orientated troughs or grooves 544 and peaks or ridges 545. The heat exchanger 540 may also include a portion 546 at either end of the heat exchanger 540.

According to an exemplary embodiment, the heat exchanger 540 includes a discrete path 548 through which the fluid flows through the heat exchanger 540. According to an exemplary embodiment, the flow of the fluid inside the heat exchanger 540 may be in a zig-zag motion (e.g., as shown by arrow 547 in FIG. 23), but may vary according to other exemplary embodiments. According to one exemplary embodiment, the discrete path 548 may be separated by a gap 549 (or, alternatively, there may be solid material between the paths rather than a gap to separate the various parts of the winding path from each other).

In this manner, the fluid may be routed through the heat exchanger such that it passes past each of the cells multiple times as it zig-zags through the heat exchanger. Similar to the fluid flow within the heat exchanger described with respect to FIG. 20, the fluid flow through the heat exchanger is divided into multiple segments that are separated from each other, although instead of flowing in a single direction between an inlet or an outlet, the fluid in the heat exchanger 540 reverses its flow direction as it transitions between one segment of the fluid flow path and the adjacent segment of the fluid flow path.

For example, as shown in FIG. 23, the fluid may enter the heat exchanger 540 at an opening 541 at a first end of the heat exchanger 540. The fluid then flows lengthwise through the heat exchanger 540 toward a second end along the path 548. At the second end, the path 548 then turns 180° so that the flow of the fluid is back towards the first end (i.e., in the opposite direction). Once the fluid reaches the first end, the path 548 then again turns 180° so that the flow of the fluid is again towards the second end. The fluid then follows the path 548 until the fluid reaches the opening 542 to exit the heat exchanger.

According to another exemplary embodiment, the flow of the fluid may be in the opposite direction (i.e., the fluid may enter the opening 542 and exit the opening 541 after flowing through the path 548). According to various exemplary embodiments, the design of the heat exchanger 540 may vary (e.g., the heat exchanger may include any number of turns or lengths of the path 548 for as many times as needed to properly heat/cool the electrochemical cells 530).

According to other exemplary embodiments, the fluid may flow through the heat exchanger 540 in a variety of ways. For example, the fluid may flow in a generally vertical zig-zag motion (instead of the previously described horizontal zig-zag motion). According to another exemplary embodiment, the heat exchanger 540 may be hollow inside (i.e., contains no internal partitions, walls, or separations) so that the fluid flows directly from the inlet (e.g., opening 541) to the outlet (e.g., opening 542) of the heat exchanger 540.

According to an exemplary embodiment, the heat exchanger 540 may be made of a polymeric material (e.g., polypropylene) or other suitable material that allows for heat conduction to/from the cells 530 (e.g., an electrically insulative and thermally conductive material). According to another exemplary embodiment, the heat exchanger 540 may be made of a metallic material (e.g., aluminum or aluminum alloy) or other suitable material (e.g., when the external surface of the cells 530 are not electrically charged (e.g., can neutral) or a separate electrically insulative and thermally conductive material is provided between the cells and the heat exchanger). According to another exemplary embodiment, the heat exchanger 540 may be made of a ceramic material or other suitable material. According to an exemplary embodiment, the heat exchanger 540 may be made from a blow molding process, an injection molding process, or other suitable process. According to an exemplary embodiment, the internal partitions, walls, or separations are formed by pinching or welding together the external walls of the heat exchanger 540.

According to an exemplary embodiment, the wall thickness of the heat exchanger 540 is between approximately 0.5 millimeters and 1.5 millimeters. According to another exemplary embodiment, the wall thickness of the heat exchanger 540 is approximately 1 millimeter. According to an exemplary embodiment, the overall thickness of the heat exchanger 540 is between approximately 4 millimeters and 6 millimeters. According to another exemplary embodiment, the overall thickness of the heat exchanger 540 is approximately 4.6 millimeters. According to an exemplary embodiment, the wall thickness and/or the overall thickness of the heat exchanger 540 is substantially constant along the length of the heat exchanger 540 (such as, e.g., shown in FIG. 24). According to other exemplary embodiments, the wall thickness and/or overall thickness of the heat exchanger 540 may vary according to other exemplary embodiments.

Figure 26B:
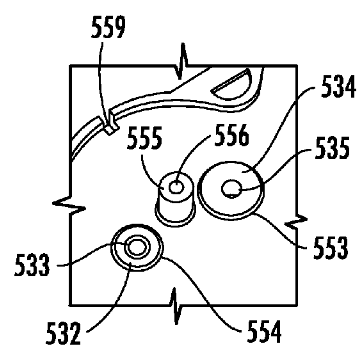

Referring now to FIGS. 26-26B, a plurality of electrochemical cells 530 are provided (upside down) within the housing 550. According to an exemplary embodiment, the electrochemical cells 530 are generally cylindrical lithium-ion cells configured to store an electrical charge. According to other exemplary embodiments, the cells may be nickel-metal-hydride cells, lithium polymer cells, etc., or other types of electrochemical cells now known or hereafter developed. According to other exemplary embodiments, the electrochemical cells 530 could have other physical configurations (e.g., oval, prismatic, polygonal, etc.). The capacity, size, design, and other features of the electrochemical cells 530 may also differ from those shown according to other exemplary embodiments.

According to an exemplary embodiment, the electrochemical cells 530 include a positive terminal 532 and a negative terminal 534 that are configured to be received within apertures 553, 554 located on an upper surface of the housing 550, respectively. According to an exemplary embodiment, the apertures 553, 554 are sized differently relative to one another such that the terminals 532, 534 may only be provided within the housing 550 in the proper orientation. According to an exemplary embodiment, the electrochemical cells 530 are rotated until the terminals 532, 534 properly align with the apertures 553, 554.

Figure 31:
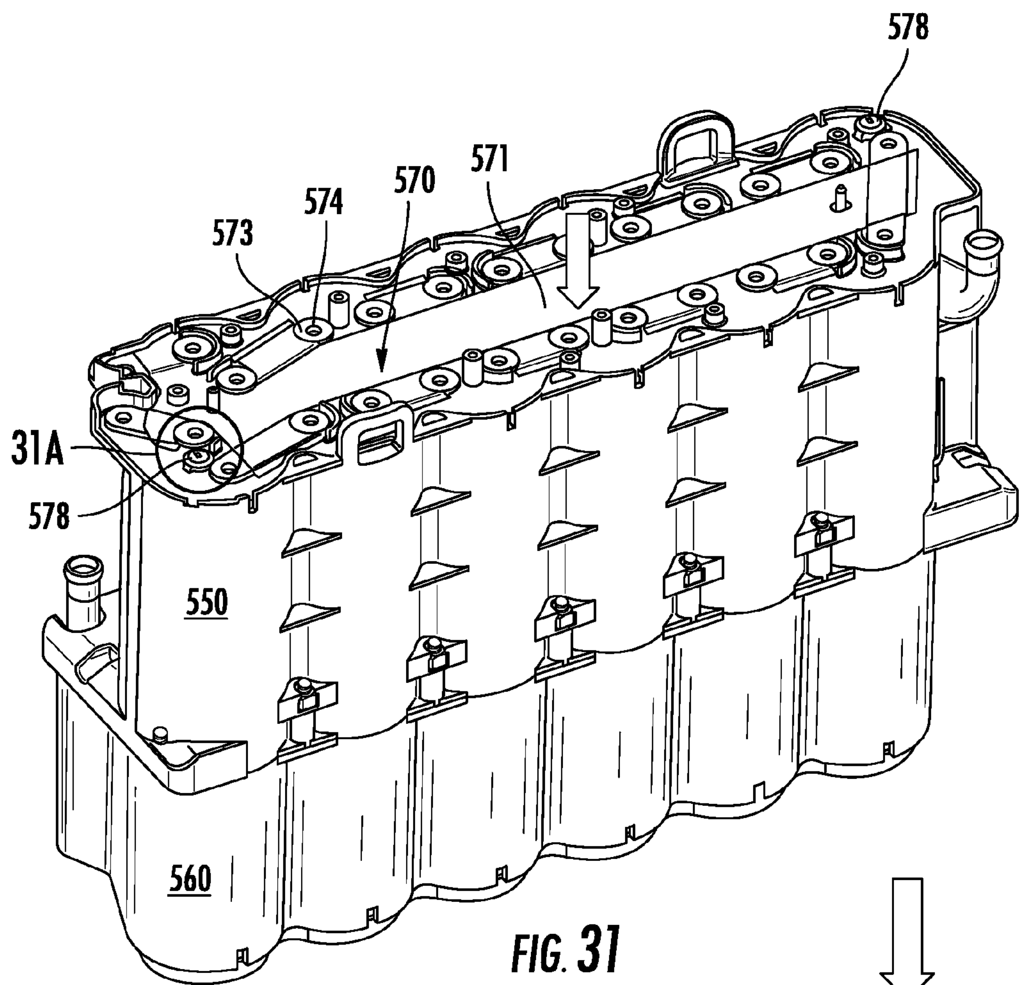
FIG. 31 is a perspective view of a bus bar assembly being provided to the housing shown in FIG. 30 according to an exemplary embodiment.
Figure 34:
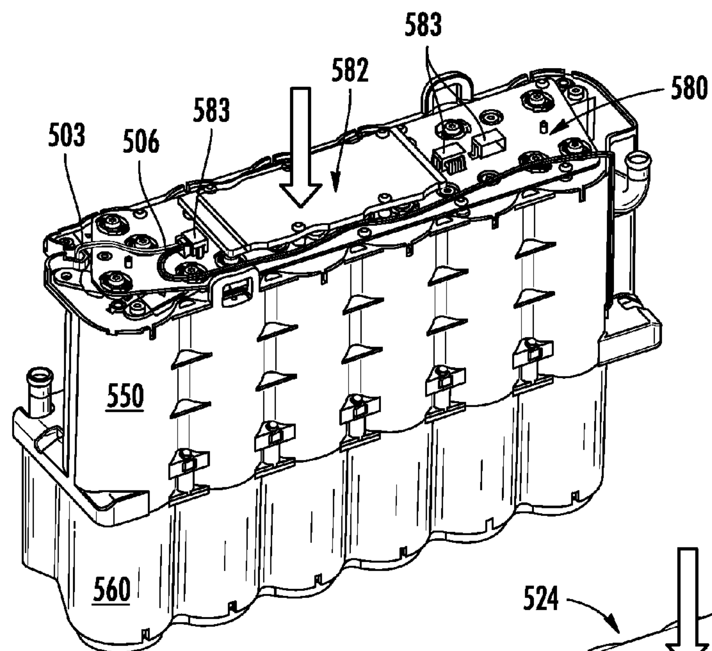
FIG. 34 is a perspective view showing a CSC being provided to the traceboard as shown in FIG. 33 according to an exemplary embodiment.

According to an exemplary embodiment, the terminals 532, 534 include a threaded opening 533, 535 configured to receive a fastener in order to couple a conductive member of the bus bar 573 (e.g., as shown in FIG. 31). The upper surface of the housing 550 may also include a projection 555 having a threaded opening 556 configured to receive a fastener in order to couple a CSC 582 to the battery module 524 (e.g., as shown in FIG. 34).

Figure 27A:
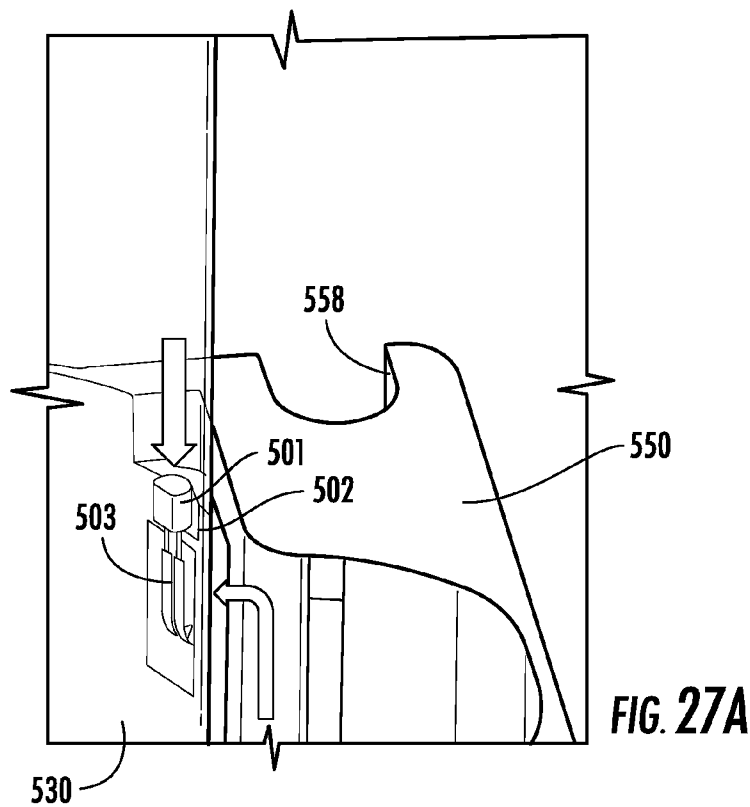
FIGS. 27A and 27B are perspective views showing the placement of temperature sensors in the housing shown in FIG. 26 according to various exemplary embodiments.
Figure 27B:
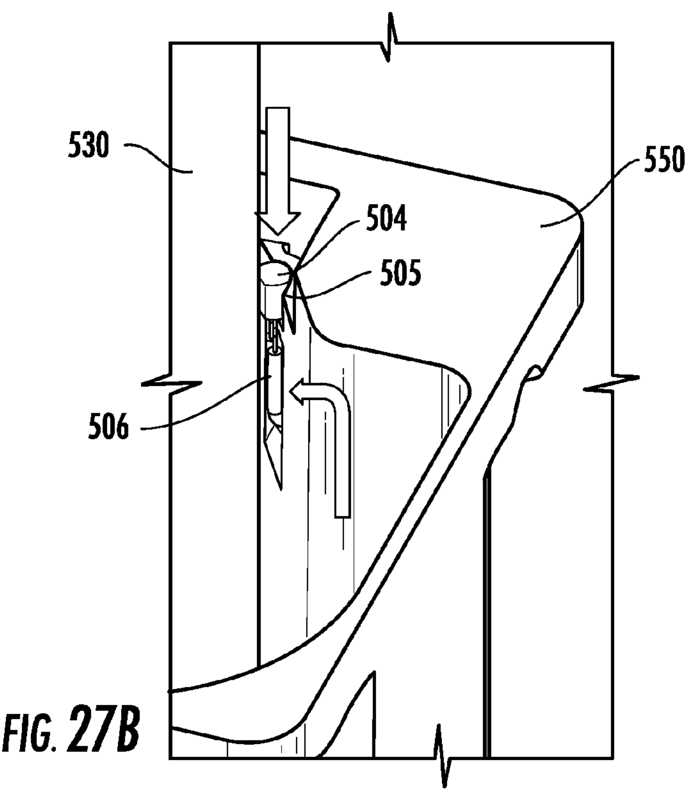

Referring now to FIGS. 27A and 27B, at least one temperature sensor may be provided within the housing 550 to measure the temperature of one of the cells 530. For example, as shown in FIG. 27A, a temperature sensor 501 is provided in a cutout or slot 502 provided in the housing 550. The temperature sensor 501 is connected (e.g., via connecting wires 503) to a traceboard (e.g., such as traceboard 580 shown in FIG. 32) and from there to a CSC (e.g., such as CSC 582 shown in FIG. 34) or a battery management system.

According to another exemplary embodiment, a temperature sensor 504 may be provided in a cutout or slot 505 provided in the housing 550 and connected (e.g., by a connecting wire 506) to a traceboard (e.g., such as traceboard 580 shown in FIG. 32) and from there to a CSC (e.g., such as CSC 582 shown in FIG. 34) or a battery management system. In either case, an electrochemical cell 530 is then provided within the housing 550 and makes contact with the sensor 501, 504. According to an exemplary embodiment, the sensor 501, 504 is located approximately at a mid-section of the electrochemical cell 530, but according to other exemplary embodiments, the sensor 501, 504 may be located elsewhere.

Referring now to FIG. 28, a structure or a base shown as a tray 560 is shown according to an exemplary embodiment. The tray 560 includes an internal wall or surface 565 configured to substantially match a portion of the exterior 538 of the electrochemical cells 530. According to another exemplary embodiment, an external surface of the tray 560 is essentially complementary to the internal surface 565. According to another exemplary embodiment, the tray 560 includes a plurality of features or sockets 566 configured to receive a lower end of each of the electrochemical cells 530. The sockets may include a first diameter 561 configured to receive an inlay 562. According to an exemplary embodiment, each inlay 562 has an internal diameter that is generally aligned with the internal diameter 563 of the sockets.

The inlays 562 may be constructed of a flexible material such as EPDM foam (or any other suitable material). The inlays 562 are configured to take up any dimensional tolerance variation of the battery module 524 during assembly. Additionally, the inlay 562 may aid in isolating the electrochemical cells 530 from vibrations (e.g., during operation of the vehicle).

According to an exemplary embodiment, the tray 560 also includes a feature shown as a projection or protrusion 568 that is configured to at least partially retain or aid in the positioning of the lower ends of the cells 530. According to another exemplary embodiment, the protrusions 568 may also aid in the positioning of the heat exchanger 540. The tray 560 also includes a plurality of openings or cut-outs 567 that are in fluid communication with the internal diameter 563 of the sockets 566 of the tray 560 such that gas and/or effluent that may be vented from the electrochemical cell 530 may then exit through the opening 567.

The tray 560 also includes a feature or wall 564 that extends from the internal diameter 563 of the sockets 566 above a bottom surface 569 of the tray 560. These walls 564 may act as a vent opening feature for the vent 536 of the electrochemical cells 530. An example and description of a vent opening feature may be found in International Application No. PCT/US2009/053697, filed Aug. 13, 2009, the entire disclosure of which is incorporated herein by reference.

According to the exemplary embodiment shown in FIGS. 29 and 29A, the tray 560 is coupled to the housing 550 with a plurality of fasteners. According to other exemplary embodiments, the tray 560 may be coupled to the housing 550 by other means (e.g., a snap-fit connection, welding, etc.). According to an exemplary embodiment, as shown in FIG. 29A, the housing 550 may include a slot 510 provided in a feature or rib 509 and configured to receive a nut 511. The slot 510 is shaped to restrict movement of the nut 511 while a fastener 508 is being threaded into the nut 511. As shown, the tray 560 includes an aperture or opening 507 configured to receive the fastener 508 therethrough. According to another exemplary embodiment, the tray 560 may include the slot 510 instead of the housing 550.

According to an exemplary embodiment, the battery module 524 may be varied in order to accommodate smaller or larger electrochemical cells 530. For example, the housing 550 may be varied in height in order to accommodate shorter or longer electrochemical cells. According to another exemplary embodiment, the tray 560 may be varied in height in order to accept shorter or longer electrochemical cells. In yet another exemplary embodiment, both the housing 550 and the tray 560 may be varied in height in order to accommodate shorter or longer electrochemical cells. According to another exemplary embodiment, the heat exchanger 540 may be varied in height in order to accommodate shorter or longer electrochemical cells.

Figure 30:
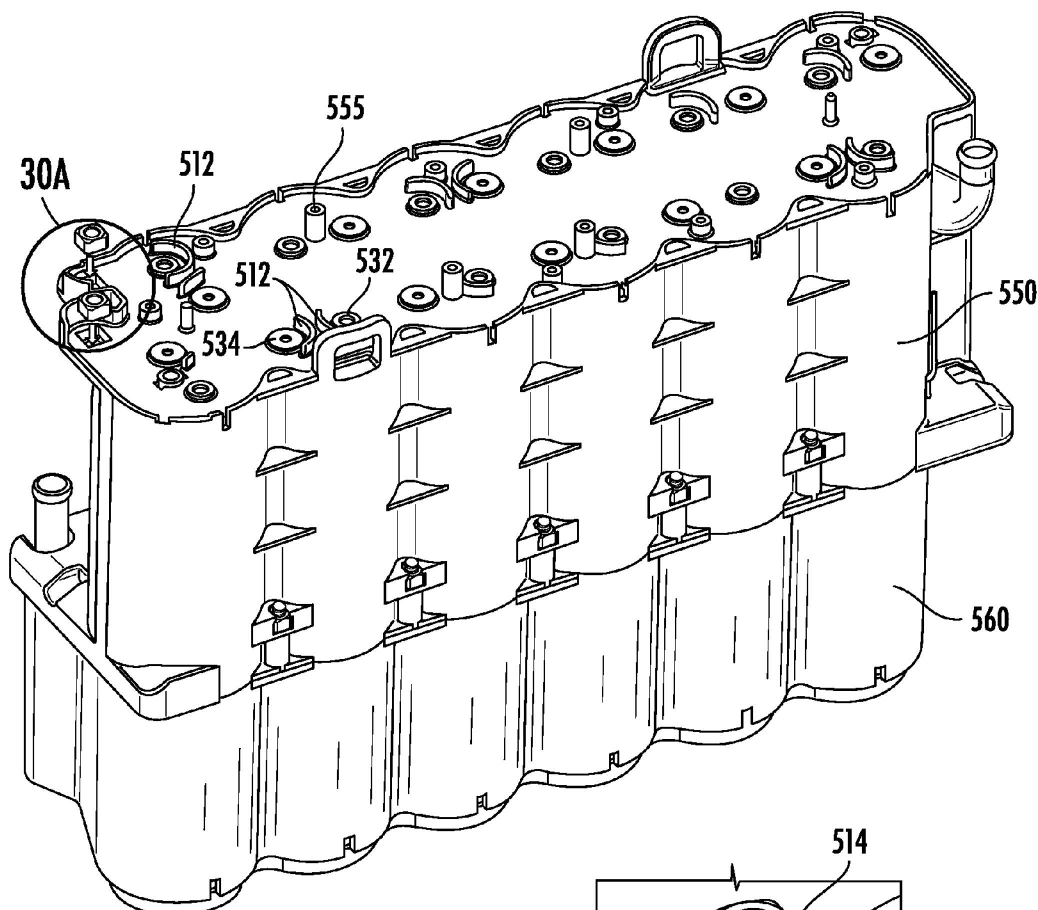
FIGS. 30 and 30A are perspective views showing a pair of connective elements being provided into the housing according to an exemplary embodiment.
Figure 30A:
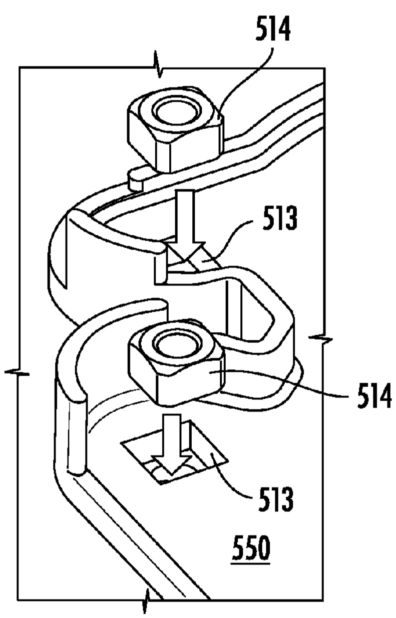

Referring now to FIGS. 30 and 30A, nuts 514 are provided within openings 513 located in a top surface of the housing 550. Nuts 514 are configured to be used in connecting the module 524 with an adjacent module or to other components within a battery system (not shown). Also shown in FIG. 30 are projections 512 provided throughout the upper surface of the housing 550. According to an exemplary embodiment, the projections 512 surround at least a portion of a terminal 532, 534 of the electrochemical cells 530. As can be seen in FIG. 31, the projections 512 aid in isolating the bus bars 573 from one another. According to an exemplary embodiment, the projections 512 may be arcuate in nature or may otherwise be configured (e.g., rectilinear).

Referring now to FIG. 31, a bus bar assembly 570 is shown coupled to the battery module 524 according to an exemplary embodiment. The bus bar assembly 570 includes conductive members or bus bars 573 used to connect the electrochemical cells 530 to one another or to other components of the battery module or battery system. Having the bus bars 573 as part of the bus bar assembly 570 saves time and assembly costs when assembling the battery module 524.

According to an exemplary embodiment, the bus bar assembly 570 includes a plurality of bus bars 573 provided on a first layer or substrate 571 (e.g., a plastic or film such as Mylar®). According to another embodiment, a second layer (not shown) may be provided to sandwich the plurality of bus bars 573 between the first layer 571 and the second layer. As shown in FIG. 31, each of the plurality of bus bars 573 includes an aperture or opening 574 provided at each end of each of the bus bars 573. These openings 574 are configured to receive a fastener in order to couple the bus bar 573 to a terminal (e.g., such as a positive terminal 532 or a negative terminal 534 as shown in FIG. 30).

Figure 31A:
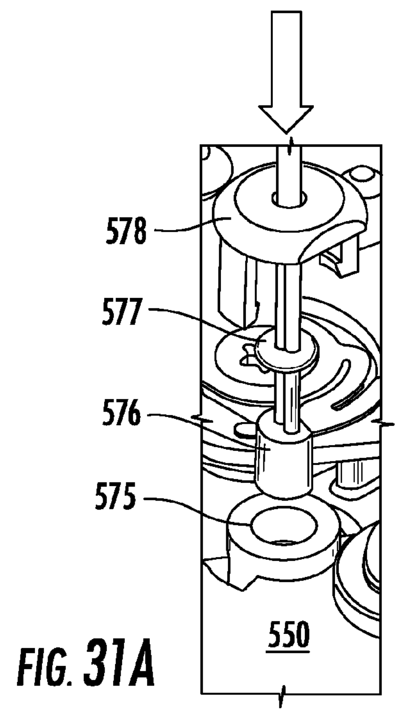
FIG. 31A is a partial exploded view of a temperature sensor being assembled into the housing shown in FIG. 31 according to an exemplary embodiment.

Referring now to FIG. 31A, a temperature sensor 576 is shown being provided to the housing 550 according to an exemplary embodiment. The temperature sensor 576 is inserted into a hole or opening 575 located on a top portion of the housing 550. The temperature sensor 576 may be connected (e.g., by a connecting wire) to a traceboard (e.g., such as traceboard 580 shown in FIG. 32) and from there to a CSC (e.g., such as CSC 582 shown in FIG. 34) or a battery management system. A seal or O-ring 577 surrounds the connecting wire to seal the opening 575. A retaining member shown as a clip 578 is provided to retain the temperature sensor 576 in place. The clip 578 has an opening or aperture for the connecting wire to fit through. The clip 578 also has a pair of arms to aid in retaining the clip 578 to the housing 550.

Figures 32, 33, 33A:
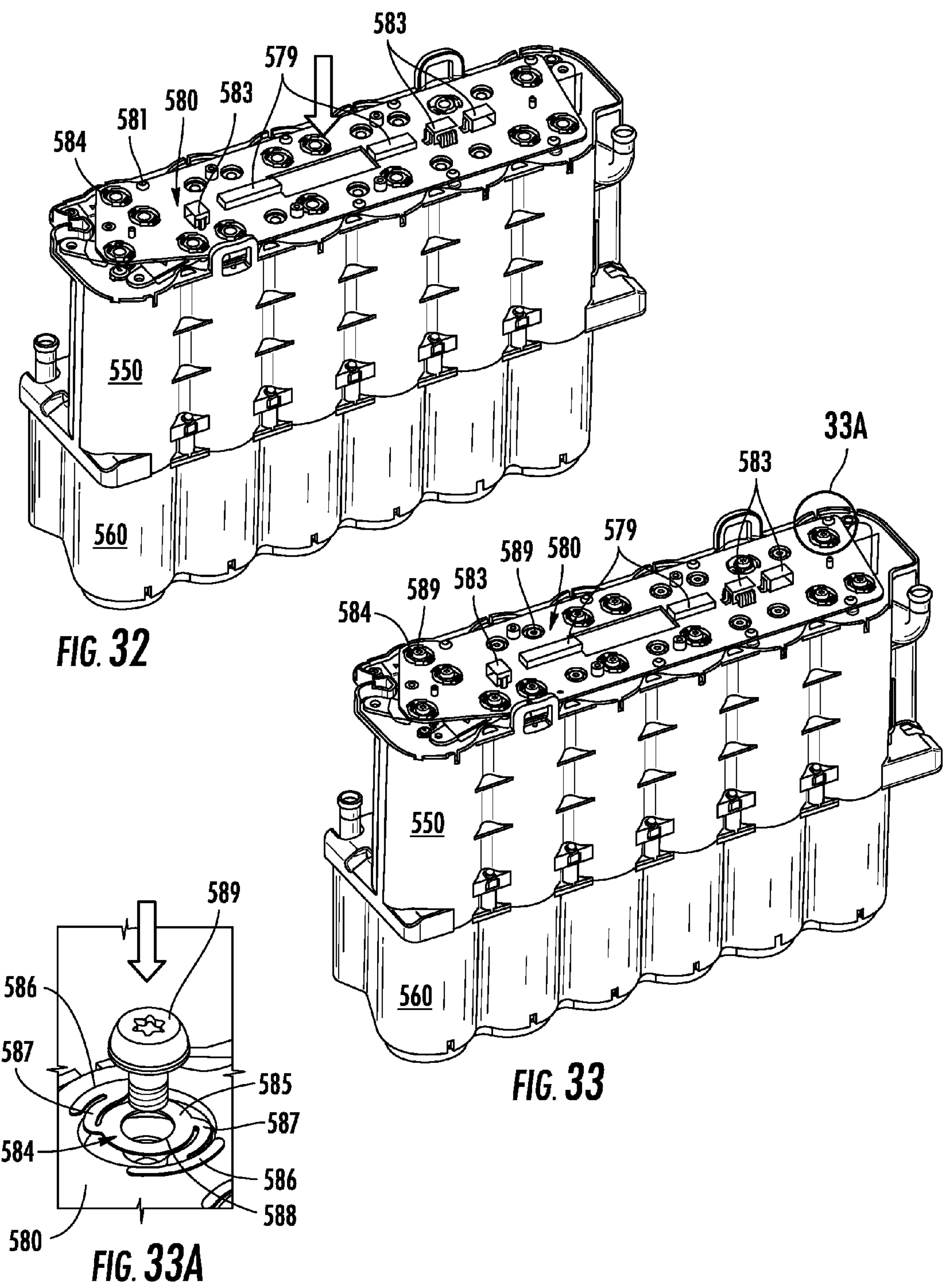
FIG. 32 is a perspective view of a traceboard being provided to the bus bar assembly shown in FIG. 31 according to an exemplary embodiment.
FIGS. 33 and 33A are perspective views showing a plurality of flexible contacts being coupled to bus bars of the bus bar assembly shown in FIG. 31 according to an exemplary embodiment.

Referring now to FIGS. 32-33A, a traceboard 580 is shown according to an exemplary embodiment. The traceboard 580 includes various electronic and electrical components (e.g., electrical contacts, sense lines, sensors, connectors 583, etc.) in order to monitor, control, and/or regulate the cells 530. For example, the traceboard 580 includes a plurality of flexible spring leads or flexible contacts 584. The flexible contacts 584 are used to connect the sensors 579 on the traceboard 580 to the terminals 532, 534 of the cells 530 in order to measure the voltage of the various cells 530. Having a flexible contact 584 allows for misalignment and/or dimensional variation of the components during the assembly process. The flexible contact 584 also isolates the traceboard 580 from vibration (e.g., from the vehicle).

As shown in FIG. 33A, the flexible contact 584 includes a main body portion 585 generally in the shape of a circular ring or washer. The main body 585 is connected to outer members 586 by a plurality of members or arms 587. As show in FIG. 33A, the flexible contact 584 has two arms 587; however, according to other exemplary embodiments, the flexible contact 584 may have a greater or lesser number of arms 587. The main body 585 has an aperture or opening 588 that is configured to allow a fastener 589 therethrough in order to couple the flexible contact 584 with a terminal of the electrochemical cell 530. The outer members 586 are configured to be coupled (e.g., soldered, welded, etc.) to the traceboard 580.

According to an exemplary embodiment, the flexible contacts 584 are formed from a stamping process or other suitable process. According to an exemplary embodiment, the flexible contacts 584 are formed from a conductive material such as copper (or copper alloy), aluminum (or aluminum alloy), or other suitable material. According to an exemplary embodiment, the flexible contacts 584 have a constant resistance across the voltage lead of the electrochemical cell 530.

Referring now to FIG. 34, a CSC 582 is shown being assembled to the traceboard 580 of the battery module 524 according to an exemplary embodiment. The CSC 582 is configured to monitor and/or regulate the temperature, current, and/or voltage of the electrochemical cells 530. Also shown in FIG. 34 are connector wires 503, 506 that connect temperature sensors 501, 504 (e.g., as shown in FIGS. 27A and 27B) to the connector 583. The connector 583 is conductively connected to the CSC 582 (e.g., by electrical or conductive lines (not shown)). Additionally, the traceboard 580 (e.g., via a main connector (not shown)) may be conductively coupled to the CSC 582.

Figure 35:
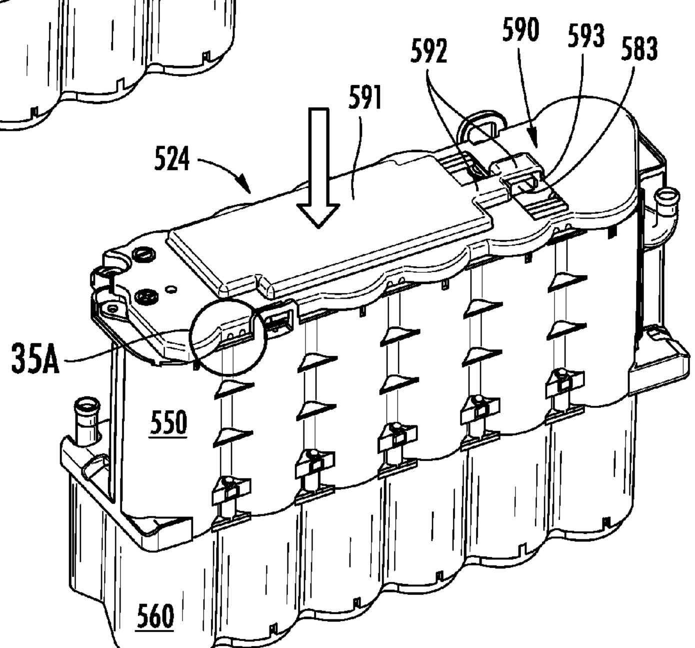
FIGS. 35 and 35A are perspective views of a cover being assembled to the housing as shown in FIG. 34 according to an exemplary embodiment.
Figure 35A:
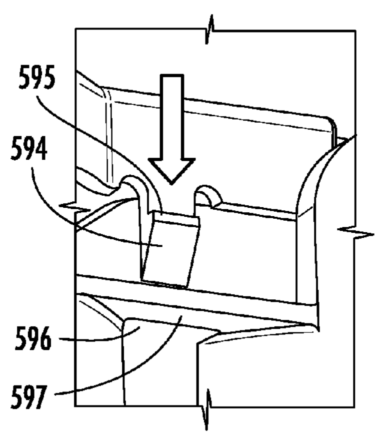

Referring now to FIGS. 35 and 35A, a cover 590 is shown according to an exemplary embodiment being coupled to the housing 550 of the battery module 524. According to an exemplary embodiment, the cover 590 includes a raised portion 591 configured to correspond with the CSC 582. Additionally, raised portions 592 are provided on the cover 590 that correspond with the connectors 583. According to an exemplary embodiment, raised portions 592 include an opening 593 to allow access to the connectors 583.

According to an exemplary embodiment, the cover 590 is coupled to the housing 550 (e.g., with a snap-fit connection). As shown in FIG. 35A, the cover 590 includes a snap-hook 594 having a protrusion 595 that engages an opening or aperture 596 in the housing 550. The protrusion 595 of the snap-hook 594 engages a surface or ledge 597 that surrounds the opening 596 to couple the cover 590 to the housing 550. According to another exemplary embodiment, the housing 550 may include the snap-hook 594 feature and the cover 590 may include the opening 596. According to other exemplary embodiments, the cover 590 may be otherwise coupled to the housing 550 (e.g., by fasteners, adhesives, welding, etc.).

Figure 36:
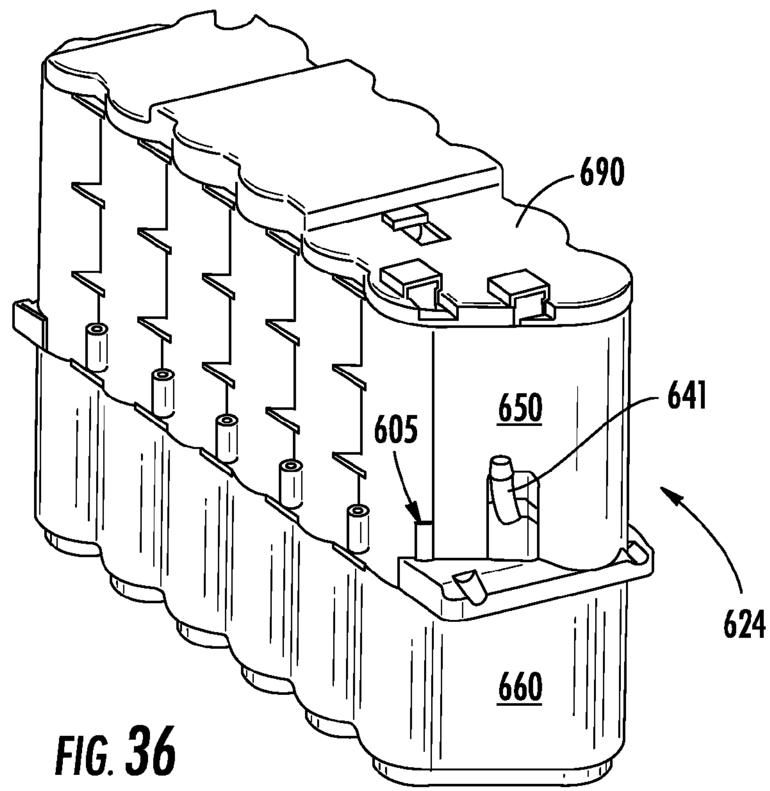
FIGS. 36 and 37 show an alternative location or placement of a temperature sensor in a battery module according to another exemplary embodiment.
Figure 37:
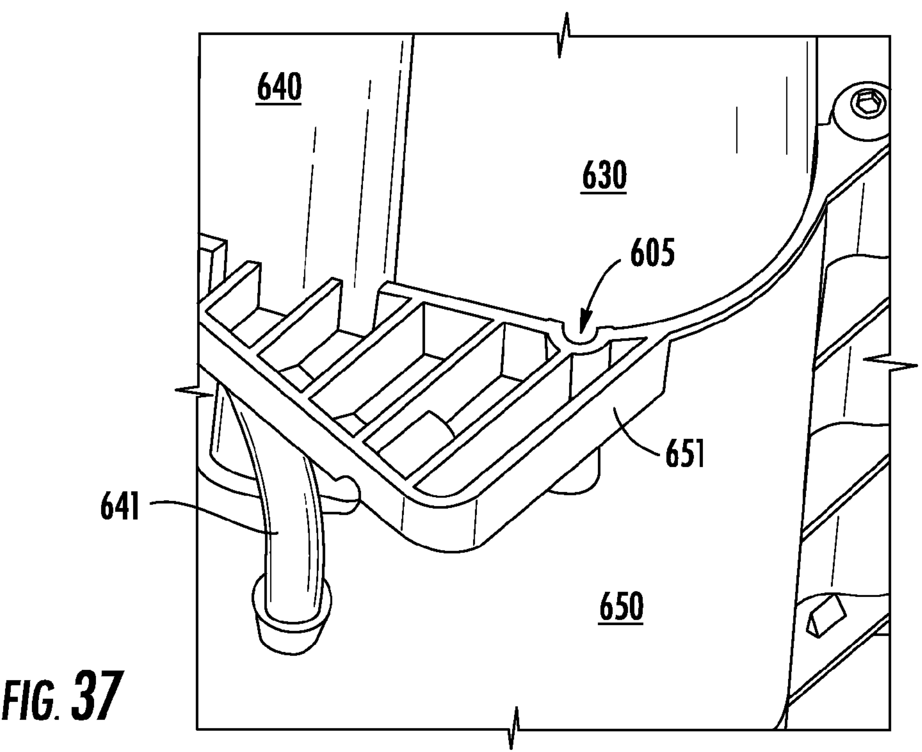

Referring now to FIGS. 36 and 37, a battery module 624 is shown according to another exemplary embodiment. The battery module 624 includes a housing 650 configured to receive a plurality of electrochemical cells 630 in a housing 650. A lower housing or tray 660 is provided coupled to a bottom portion of the housing 650. A cover 690 is coupled (e.g., with a snap-fit connection, fasteners, adhesive, welding, etc.) to the housing 650. According to FIG. 37, the battery module 624 includes a heat exchanger 640 provided within the housing 650 in order to provide heating and/or cooling to the electrochemical cells 630. The heat exchanger 640 includes fluid connections (e.g., such as connection 641) in order to connect the heat exchanger 640 to a fluid (e.g., water, water/glycol mixture, refrigerant, etc.).

According to an exemplary embodiment, the housing 650 includes a member or flange 651 having a cut-out or recess 605. Recess 605 is configured to receive a temperature sensor (not shown) to measure the temperature of an electrochemical cell 630. According to an exemplary embodiment, the temperature sensor is provided at a midway point along the height of the cell 630. According to other exemplary embodiments, the temperature sensor may be provided at other locations in the battery module 624 and/or at different heights along the electrochemical cell 630.

Figure 38A:
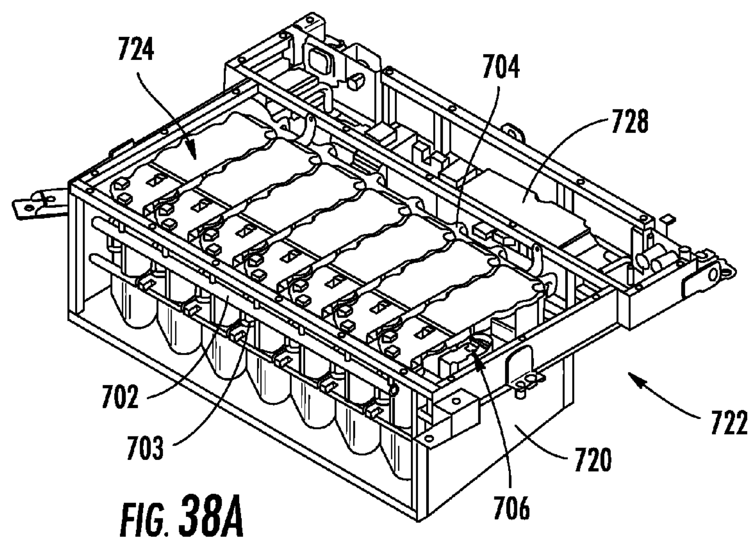
FIGS. 38A and 38B are perspective views of a battery system including a plurality of battery modules according to another exemplary embodiment.

Referring now to FIGS. 38A-41C, a battery system 722 is shown according to another exemplary embodiment. The battery system 722 includes a plurality of battery modules 724 located adjacent one another (e.g., side-by-side). As shown in FIG. 38A, the battery system 722 includes seven battery modules 724. According to other exemplary embodiments, the battery system 722 may include a greater or lesser number of battery modules 724. The battery system also includes a battery management system (BMS) 728 configured to monitor, regulate, and/or control the battery system 722 and/or battery modules 724.

Although illustrated in FIGS. 38A-41C as having a particular number of battery modules 724 (i.e., seven battery modules), it should be noted that according to other exemplary embodiments, a different number and/or arrangement of battery modules 724 may be included in the battery system 722 depending on any of a variety of considerations (e.g., the desired power for the battery system, the available space within which the battery system must fit, etc.). The design and construction of the battery modules 724 allow for modular assembly (e.g., the modules may be quickly and efficiently mechanically, electrically, and/or thermally coupled to one another or with other components of the battery system 722).

Figure 39:
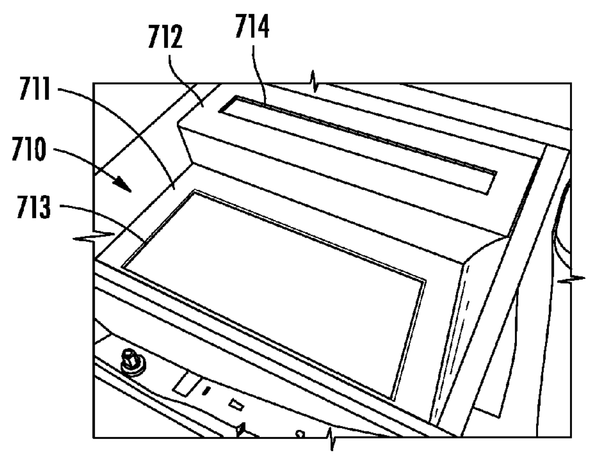
FIG. 39 is a perspective view of a portion of a vehicle configured to receive a battery system according to an exemplary embodiment.

As shown in FIG. 39, a vehicle chamber 710 is shown configured to receive the battery system 722. The vehicle chamber 710 includes a first level 711 and a second level 712 configured to correspond with a housing 720 of the battery system 722. According to an exemplary embodiment, the first level 711 includes an opening 713 (e.g., to allow vented gases from the individual cells (not shown) of the battery modules 724 to pass therethrough). According to another exemplary embodiment, the second level 712 includes an opening 714 (e.g., to allow electrical connections or wires to pass through in order to be connected to the battery system 722, such as, e.g., the BMS 728).

Figure 38B:
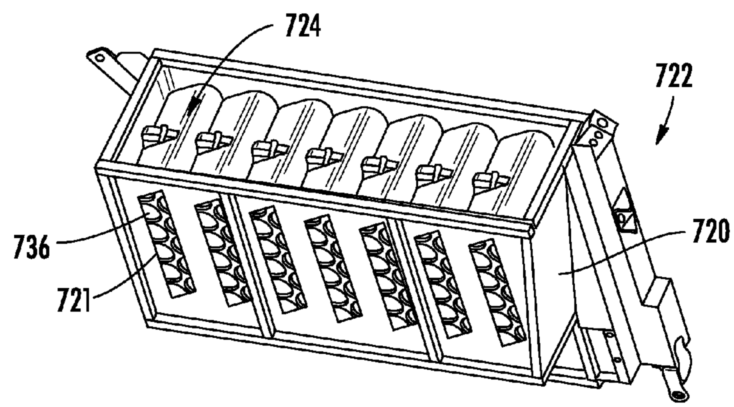

As shown in FIG. 38B, the battery system 722 includes a plurality of openings or slots 721 located at the bottom of the battery system housing 720 through the slot 721 of the battery system housing 720 and into a chamber. The chamber is defined by the bottom of the battery system housing 720 and the structure of the vehicle chamber 710 (e.g., as shown in FIG. 31). According to an exemplary embodiment, the chamber may include at least one hole or opening (e.g., opening 713) through the bottom of the vehicle chamber 710 that allows the vented gases from the chamber to exit the vehicle.

According to an exemplary embodiment, the slot or opening 721 at the bottom of the battery system housing 720 runs substantially along the entire length of each individual battery module 724. According to another exemplary embodiment, the slot or opening 721 overlaps two rows of electrochemical cells of the individual battery module 724. According to another exemplary embodiment, the slots or openings 721 only partially uncover the vents of the cells of the battery module 724, but still allow the vents to be in fluid communication with the chamber via the slot or opening 721.

Figure 40A:
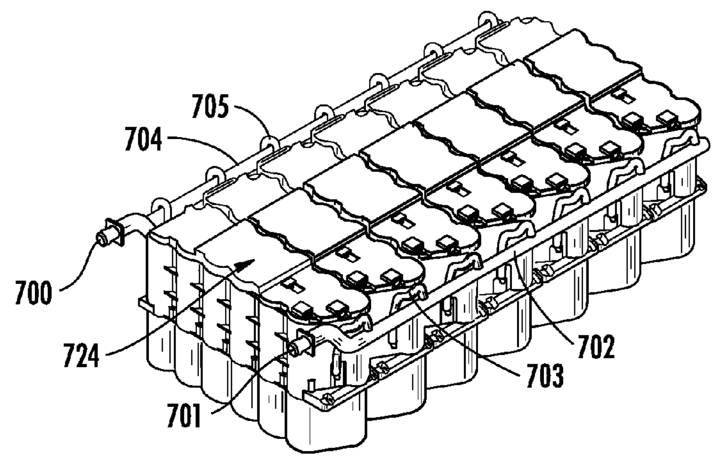
FIGS. 40A-40C are partial perspective views of a battery system having an inlet manifold and an outlet manifold according to an exemplary embodiment.
Figure 40B:
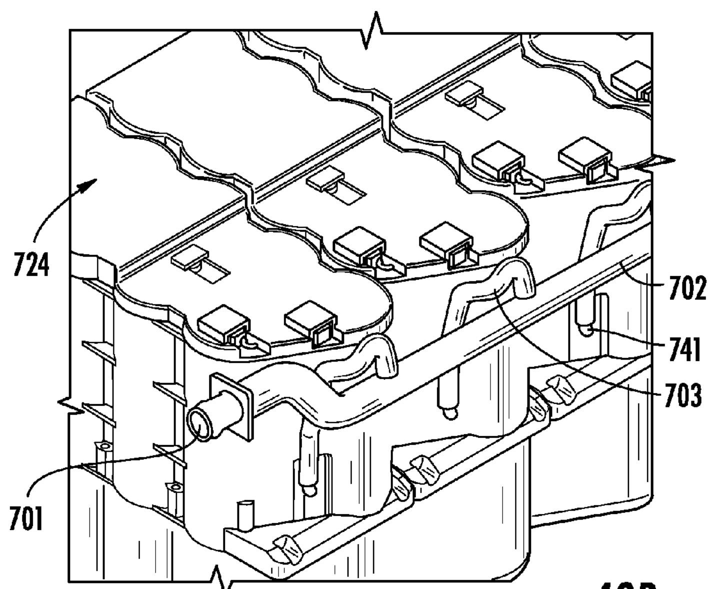

Referring to FIGS. 38A and 40A-40C, the battery system 722 is also shown to include a first manifold 702 connected to an opening or inlet 741 (e.g., as shown in FIG. 40B) of the heat exchangers (not shown) of the battery module 724. The battery system 722 also includes a second manifold 704 coupled to the heat exchanger (not shown) of the battery modules 724. The manifolds 702, 704 are configured to provide a fluid to heat and/or cool the electrochemical cells of the battery modules 724.

According to an exemplary embodiment, the manifolds 702, 704 may be coupled (e.g., via connections 700, 701) to a heat exchanger (not shown) of the vehicle in order to heat and/or cool the fluid used to manage the temperature of the electrochemical cells in the battery system 722. According to an exemplary embodiment, the manifolds 702, 704 extend transversely across the individual battery modules 724 (e.g., either side of the battery system 722). According to other exemplary embodiments, the manifolds 702, 704 may be located elsewhere in the battery system 722 or in a different configuration.

According to an exemplary embodiment, the manifold 702 is configured to be an inlet or supply manifold to the battery module 724 and the manifold 704 is configured to be an outlet or return manifold for the battery module 724. According to another exemplary embodiment, the manifold 724 may be the inlet manifold and the manifold 702 may be the outlet manifold.

Figure 40C:
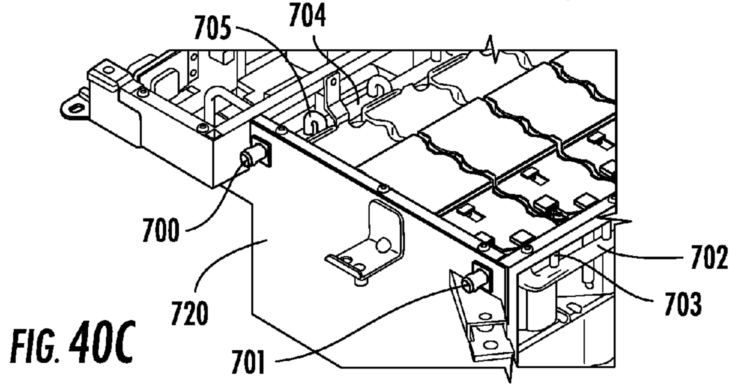

As shown in FIGS. 38A and 40A-40C, the manifolds 702, 704 are connected to the connections of the heat exchangers by a member or connection 703, 705. According to an exemplary embodiment, (e.g., as shown in FIG. 40B) the connections 703, 705 exit the manifold 702, 704 at the top of the manifolds 702, 704 and then connect with the inlets/outlets (e.g., openings 741) of the heat exchangers. According to other exemplary embodiments, the connections 703, 705 may be otherwise connected from the manifolds to the heat exchangers. According to an exemplary embodiment, each manifold 702, 704 may include an inlet/outlet connection 701, 700 (e.g., as shown in FIG. 40C) for receiving the heating/cooling fluid.

Figure 41A:
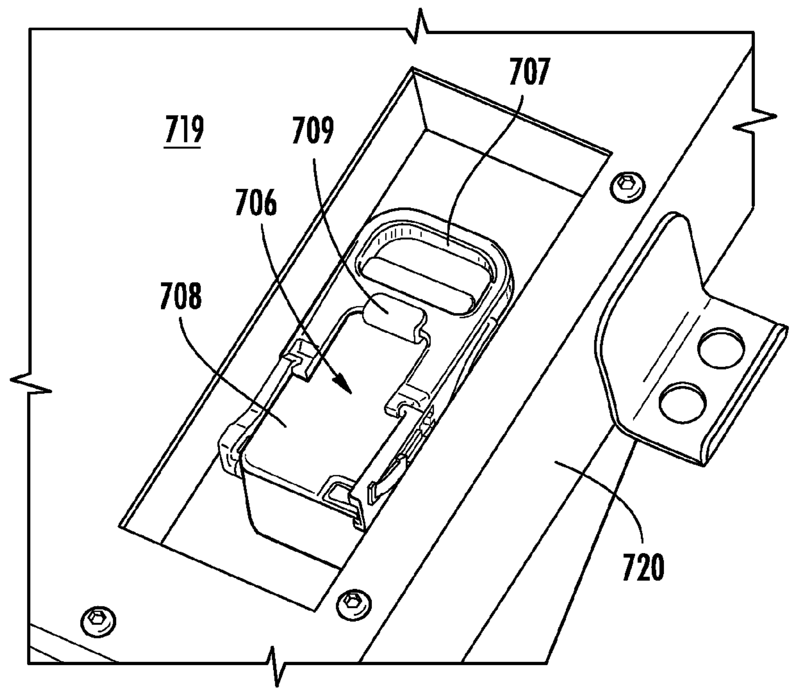
FIG. 41A is a perspective view of a service disconnect shown in a connected state according to an exemplary embodiment.
Figure 41B:
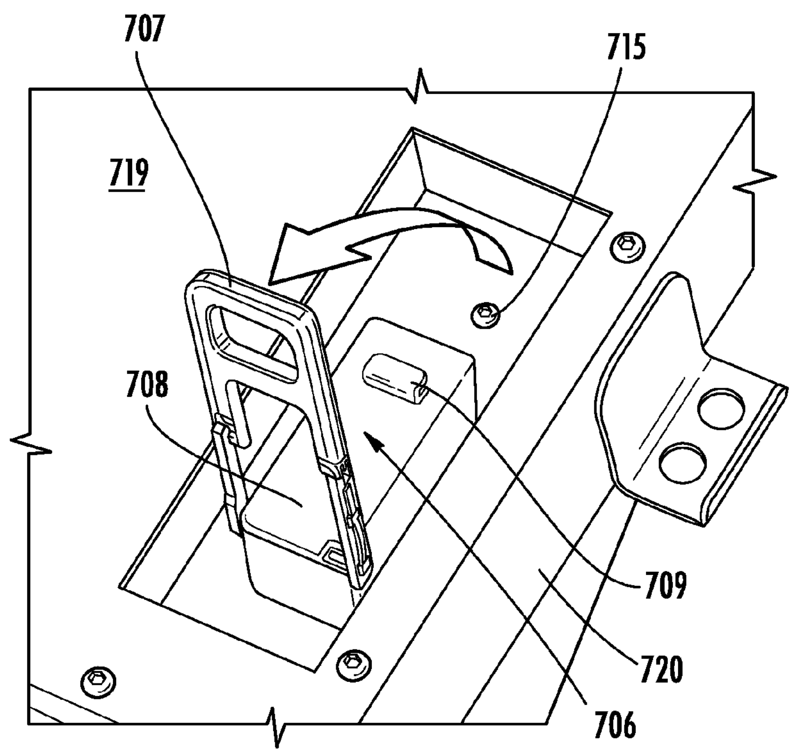
FIG. 41B is a perspective view of the service disconnect shown in FIG. 40A shown in a disconnected state according to an exemplary embodiment.

Referring now to FIGS. 41A and 41B, a service disconnect 706 for the battery system 722 is shown according to an exemplary embodiment. The service disconnect 706 is configured to disconnect the high voltage connections of the battery system 722 before the battery system 722 may be serviced. As shown in FIG. 41A, the service disconnect 706 is in an ON or connected position. As shown in FIG. 41B, the service disconnect 706 is in an OFF or disconnected position.

According to an exemplary embodiment, the service disconnect 706 includes a main body portion 708 and a handle portion 707. According to an exemplary embodiment, the handle 707 may include an opening or aperture therein configured to allow a user to more easily operate the service disconnect 706. According to another exemplary embodiment, the service disconnect 706 may include a feature or device shown as a catch or hook 709 configured to releasably engage with a portion of the handle 707 when the service disconnect 706 is in the ON or connected position (e.g., as shown in FIG. 41A). According to other exemplary embodiments, any components of the service disconnect 706 may be provided in an alternative configuration.

One advantageous feature of the service disconnect 706 is that a fastener 715 that is used to couple a cover 719 to the battery system housing 720 is hidden (i.e., not accessible) when the service disconnect is in the ON position, as shown in FIG. 41A. In order to access the fastener 715, the handle 707 of the service disconnect 706 must be rotated to the OFF position as shown in FIG. 41B. Thus, a user may not have access to the battery system 722 when the service disconnect is in the ON position (i.e., the user may only remove the cover 719 when the service disconnect is in the OFF position).

Figures 42, 43:
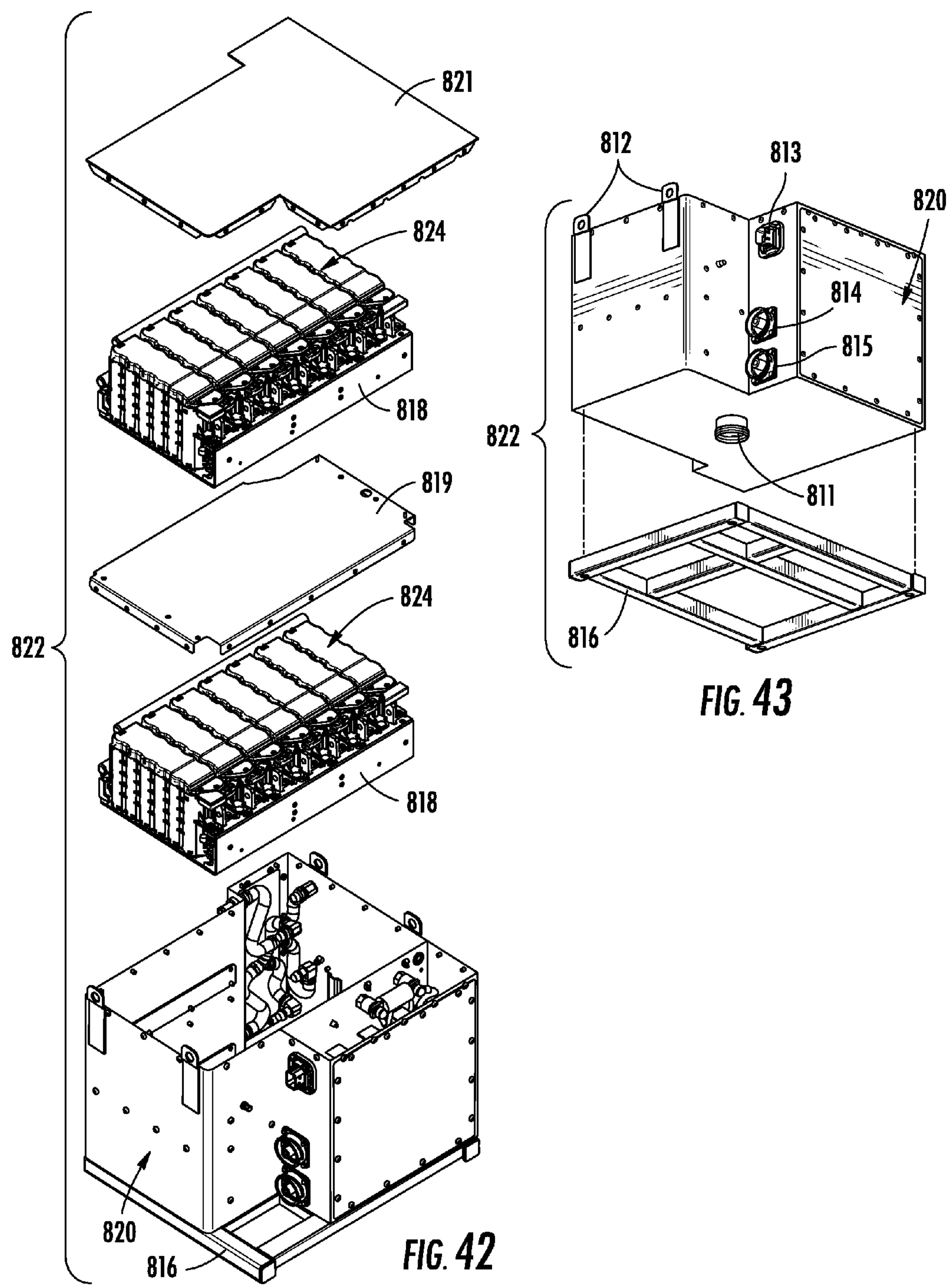
FIG. 42 is a partial exploded view of a battery system having a plurality of battery modules according to another exemplary embodiment.
FIG. 43 is a bottom perspective view of the battery system shown in FIG. 42 according to an exemplary embodiment.

Referring now to FIGS. 42-45, a battery system 822 is shown according to another exemplary embodiment. As best seen in FIG. 42, the battery system 822 includes a housing 820 configured to receive a plurality of battery modules 824. According to various exemplary embodiments, the battery modules 824 may be the same or similar to the various modules discussed in this application or are otherwise known or hereinafter developed.

According to an exemplary embodiment, the battery modules 824 are arranged in multiple layers (e.g., two layers), with each layer having seven battery modules 824 arranged side-by-side. According to other exemplary embodiments, a greater or lesser number of battery modules 824 may be included in each layer. According to another exemplary embodiment, a greater or lesser number of layers of the battery modules 824 may be included in the battery system 822.

Although illustrated in FIGS. 42-45 as having a particular number of battery modules 824, it should be noted that according to other exemplary embodiments, a different number and/or arrangement of battery modules 824 may be included in the battery system 822 depending on any of a variety of considerations (e.g., the desired power for the battery system, the available space within which the battery system must fit, etc.). The design and construction of the battery modules 824 allow for modular assembly (e.g., the modules may be quickly and efficiently mechanically, electrically, and/or thermally coupled to one another or with other components of the battery system 822).

As shown in FIG. 42, each layer of the battery modules 824 is arranged within a frame or member 818 (e.g., constructed from a metal or other suitable material) that is configured to be provided within the housing 820 and coupled thereto. Separating the layers of the battery modules 824 is a structure or member shown as a plate or shelf 819. Additionally, a structure or member shown as a cover 821 is provided to substantially cover the battery modules 824 within the housing 820. According to an exemplary embodiment, the shelf 819 and the cover 821 are constructed from sheet metal or other suitable material.

Referring now to FIG. 43, the battery system 822 is shown to include a base frame member or structure 816 (e.g., constructed from metal tubing or other suitable material). According to an exemplary embodiment, member 816 is configured to be coupled (e.g., with fasteners, welding, etc.) to a bottom of the housing 820 to aid in coupling the battery system 822 to a vehicle. According to another exemplary embodiment, the battery system 822 may be provided as a stationary system (e.g., within a building) to provide stand-alone power. The battery system 822 also includes a plurality of members 812 to aid in lifting the battery system 822.

As shown in FIG. 43, the housing 820 may include a hole or opening 811 configured to aid in the drainage of fluids and/or gases that may be vented from the individual cells within the battery modules 824 and/or condensation or other liquids that may accumulate within the housing 820. The battery system 822 also includes high voltage connections 814, 815 configured to electrically connect the battery system 822 to the vehicle or other source requiring battery power. The battery system 822 also includes a low voltage connector 813.

Figure 44:
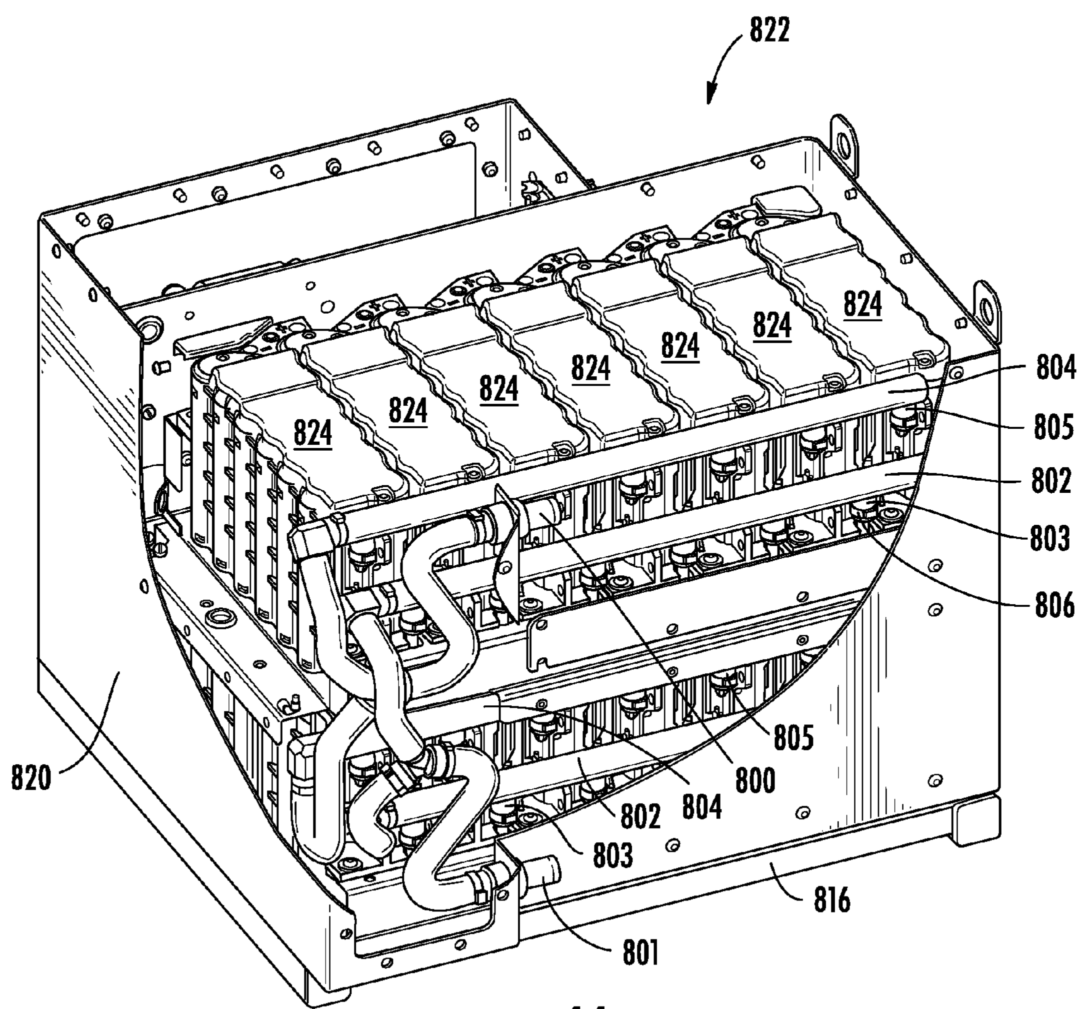
FIG. 44 is a partial cut-away perspective view of the battery system shown in FIG. 42 according to an exemplary embodiment.
Figure 45:
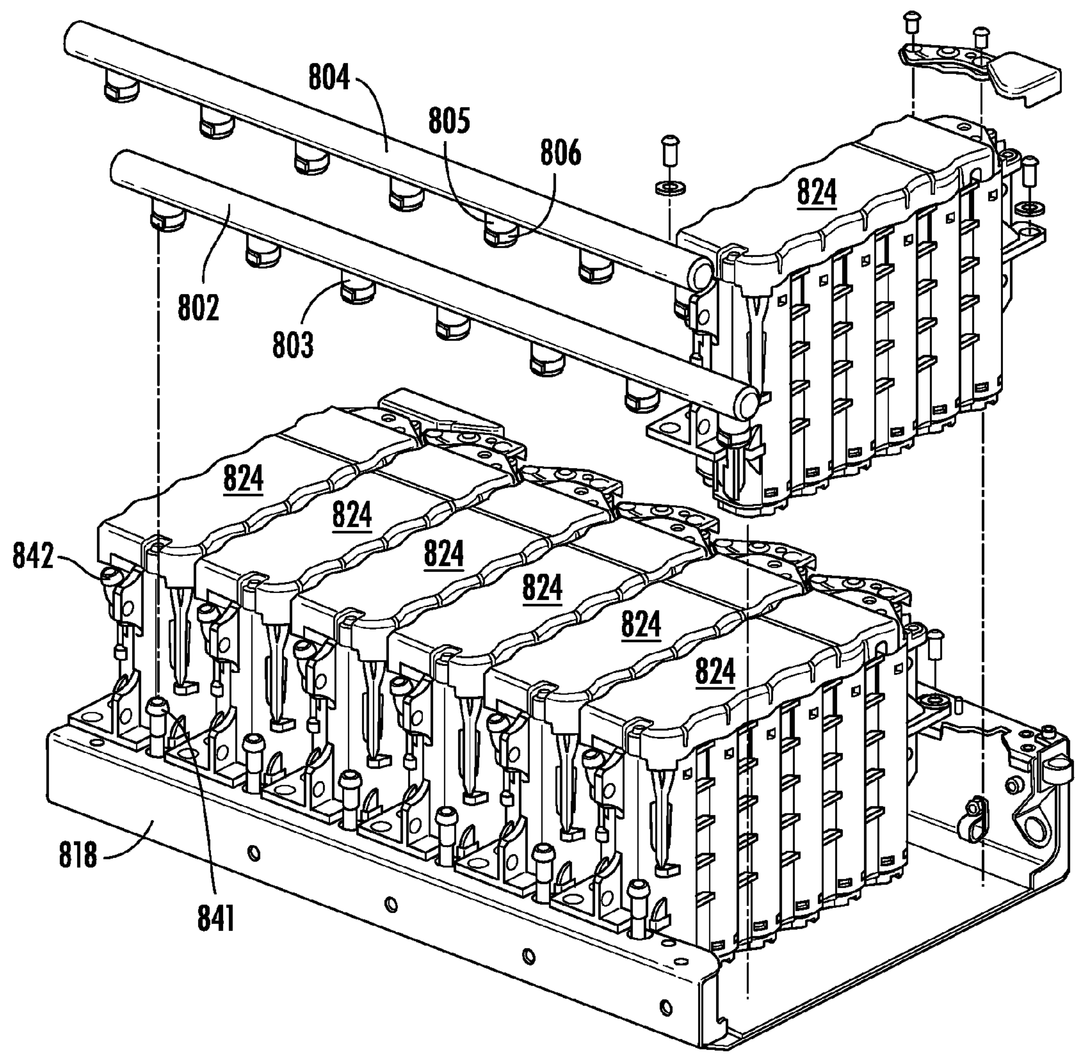
FIG. 45 is a partial exploded view of the battery system shown in FIG. 42 according to an exemplary embodiment.

Referring now to FIGS. 44-45, the individual electrochemical cells (not shown) of the battery modules 824 of the battery system 822 may have their temperature regulated by a thermal management system utilizing liquid cooling and/or heating. For clarity, the thermal management of the electrochemical cells will be described below in regard to cooling. A liquid coolant (e.g., a fluid such as water, water/glycol mix, refrigerant, etc.) is provided to the battery modules 824 through a manifold 802. The manifold 802 is connected to the individual battery modules 824 by a connecting member 803. The connecting member 803 fluidly connects (e.g., provided in fluid communication) the manifold 802 to the opening 841 of the heat exchanger (not shown) of the individual battery modules 824. According to an exemplary embodiment, a clamping member shown as a hose clamp 806 may be included at the end of each connecting member 803 to aid in sealing the manifold 802 to the heat exchanger of the battery module 824.

According to another exemplary embodiment, a second manifold 804 is provided with the battery system 822. The manifold 804 is fluidly connected (e.g., provided in fluid communication) to each of the battery modules 824 by a connecting member 805. The connecting members 805 connect the manifold 804 to the openings 842 of the heat exchangers of the individual battery modules 824.

According to one exemplary embodiment, the manifold 802 is a supply (inlet) manifold and the manifold 804 is a return (outlet) manifold. However, according to another exemplary embodiment, the manifold 804 may be a supply manifold and the manifold 802 may be a return manifold. The battery system 822 includes fluid connections 800, 801 that are individually connected with the manifolds 802, 804. According to one exemplary embodiment, fluid connection 800 is an outlet connection while the fluid connection 801 is a supply or inlet connection. However, according to another exemplary embodiment, the fluid connection 800 is an inlet connection while the fluid connection 801 is an outlet connection.

According to an exemplary embodiment, the manifolds 802, 804 (and corresponding fluid connections with the battery modules 824) are all located substantially on one side of the battery system 822. This allows easy and efficient assembly and maintenance of the battery system 822. Likewise, while the fluid connections are all on one side of the battery module 824, substantially all of the electrical connections of the battery modules 824 occur on one side of the battery system 822 (e.g., the side opposite of the fluid connections).

Figure 46:
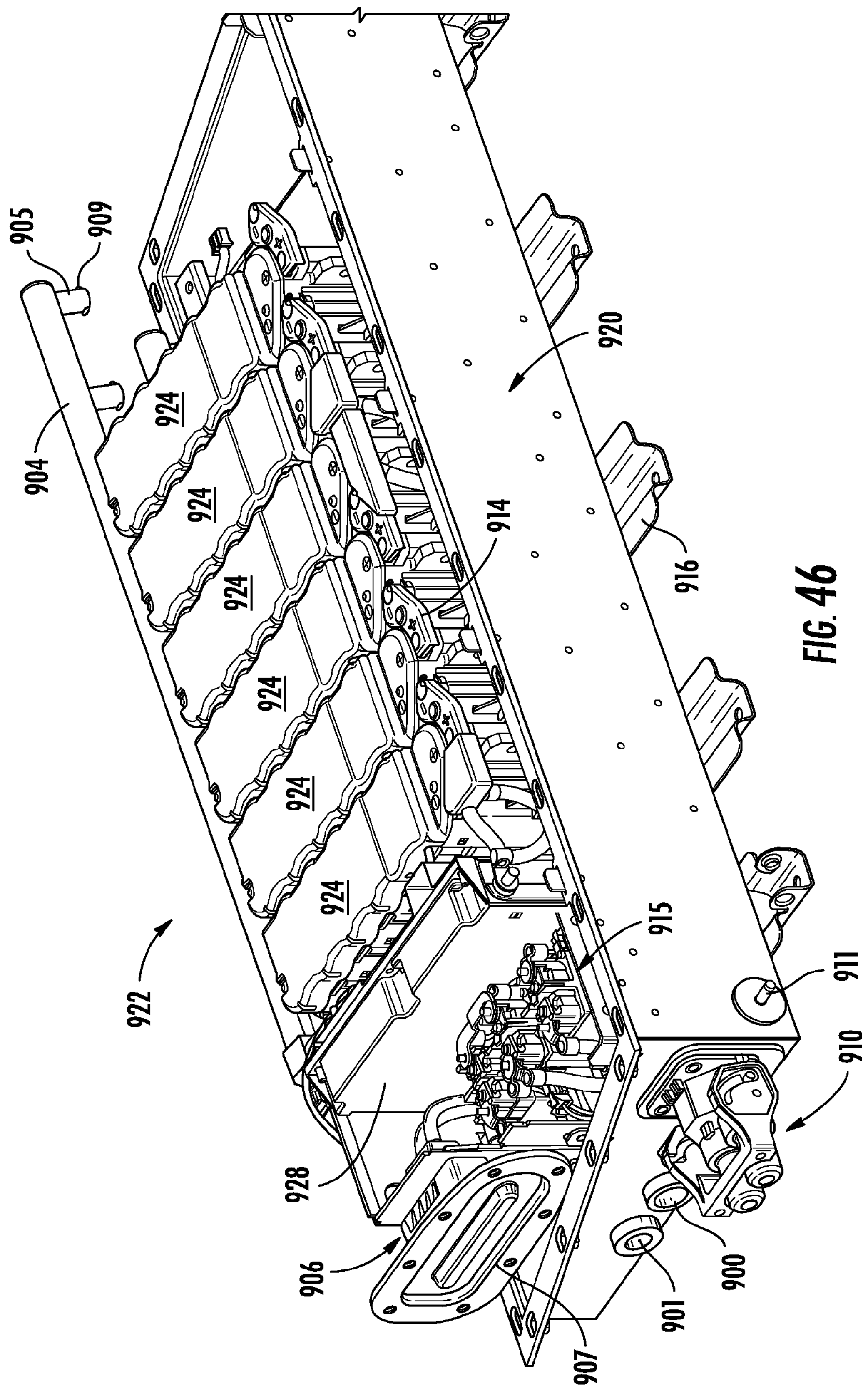
FIG. 46 is a partial perspective view of a battery system according to another exemplary embodiment.
Figure 47:
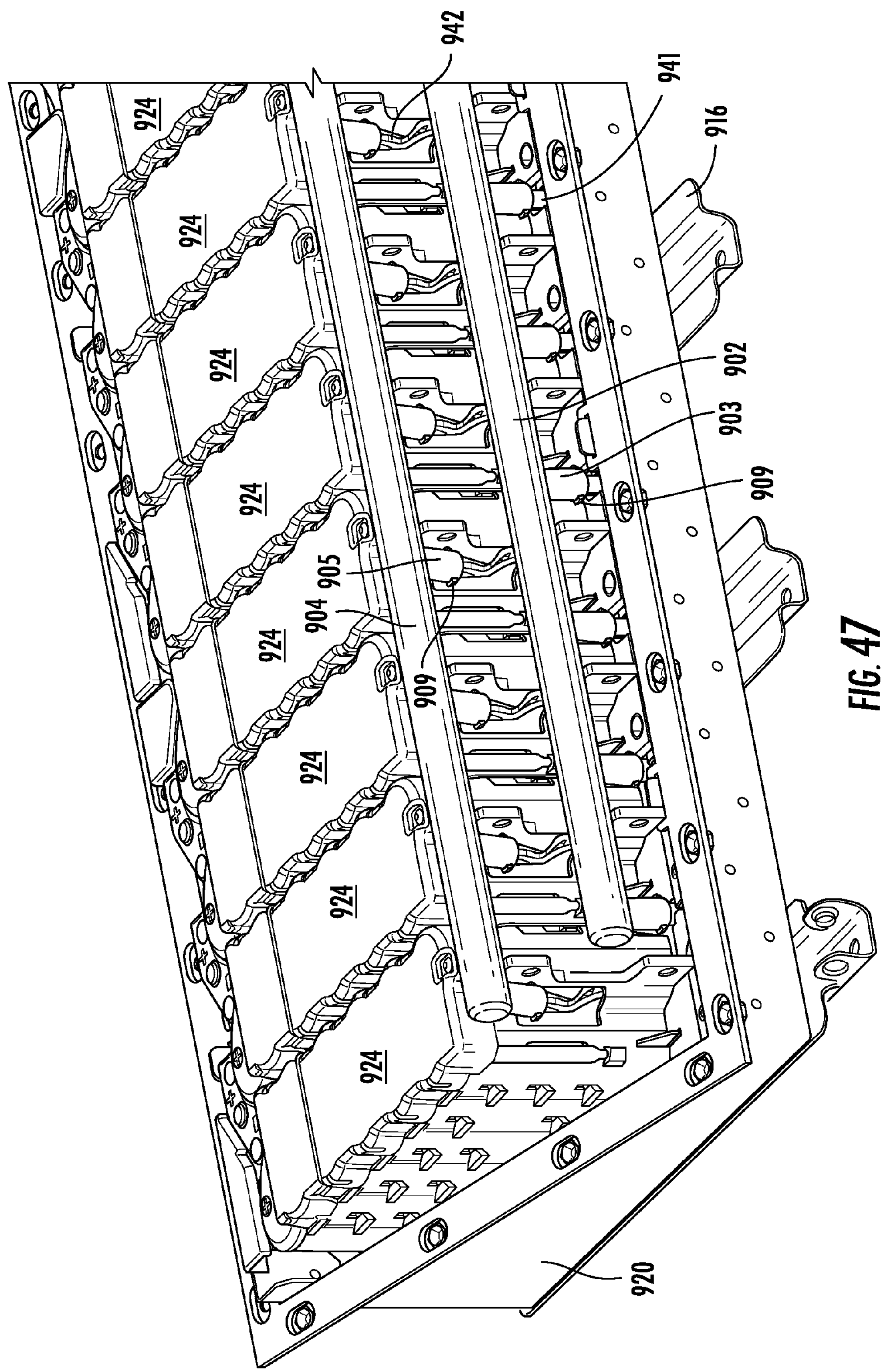
FIG. 47 is a partial perspective view of the battery system shown in FIG. 46 having an inlet manifold and an outlet manifold according to an exemplary embodiment.

Referring now to FIGS. 46 and 47, a battery system 922 is shown according to another exemplary embodiment. The battery system 922 includes a plurality of battery modules 924 arranged side-by-side next to one another to form a row. According to other exemplary embodiments, the battery modules 924 may be otherwise arranged (e.g., end-to-end, stacked, etc.). According to other exemplary embodiments, the battery modules 924 may be the same or similar to the various modules discussed in this application or otherwise known or are hereafter developed.

According to an exemplary embodiment, the battery system 922 also includes a battery management system (BMS) 928, a service disconnect 906, and a plurality of contactors and pre-charge resistors shown generally as electrical components 915. According to an exemplary embodiment, the BMS 928 regulates the current, voltage, and/or temperature of the electrochemical cells (not shown) in the battery modules 924. Included with the service disconnect 906 is a service disconnect cover 907. According to an exemplary embodiment, the service disconnect 906 functions similarly to that of the service disconnect shown and described in FIGS. 41A and 41B (e.g., the service disconnect disconnects the high voltage connections of the battery system in order that the battery system may be serviced).

The battery system 922 further includes high voltage connectors 910 that are configured to connect the battery system 922 to an electrical system of a vehicle. According to an exemplary embodiment, the high voltage connectors include one negative polarity connector and one positive polarity connector. The housing 920 also includes a grounding stud 911.

Although illustrated in FIGS. 46 and 47 as having a particular number of battery modules 924, it should be noted that according to other exemplary embodiments, a different number and/or arrangement of battery modules may be included in the battery system 922 depending on any of a variety of considerations (e.g., the desired power for the battery system, the available space within which the battery system must fit, etc.). The design and construction of the battery modules 924 allow for modular assembly (e.g., the modules may be quickly and efficiently mechanically, electrically, and/or thermally coupled to one another or with other components of the battery system 922).

According to an exemplary embodiment, the battery modules 924 are provided within a structure or housing 920. The housing 920, along with a cover (not shown) are configured to substantially surround the individual battery modules 924 and other various components of the battery system 922. According to an exemplary embodiment, a plurality of support or frame members 916 are provided with the housing 920 (e.g., on a bottom portion of the housing) in order to couple the battery system 922 to a vehicle (e.g., to a frame of a vehicle). According to other exemplary embodiments, the frame members 916 may be otherwise provided and/or coupled to the housing 920 (e.g., such as on a top of the housing or side of the housing).

According to an exemplary embodiment, the battery system 922 includes conductive members (not shown) configured to conductively connect the individual battery modules 924 to one another or to other components of the battery system 922 (such as, e.g., to the BMS 928 or electrical components 915). As shown in FIG. 46, the conductive members may be partially covered by a member shown as cover 914. The cover 914 is provided to substantially insulate the conductive members.

Figures 50, 51:
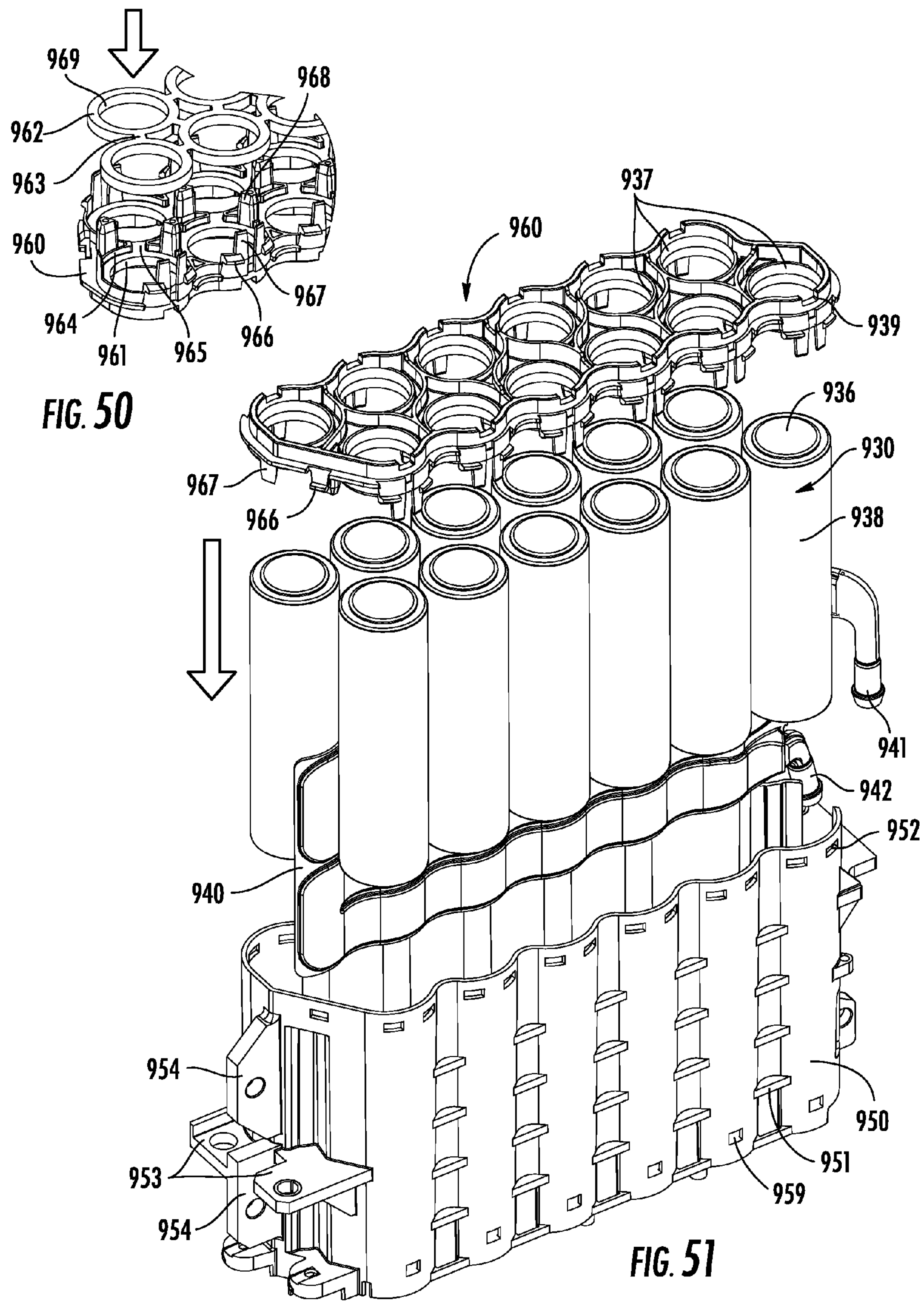
FIG. 50 is a partial perspective view of a plurality of inlays being provided in a tray for the battery module shown in FIG. 48 according to an exemplary embodiment.
FIG. 51 is a partial exploded view of the battery module shown in FIG. 48 according to an exemplary embodiment.

The battery system 922 may also include a thermal management system to regulate the temperature of the individual cells (e.g., such as shown in FIG. 51) of the battery modules 924. To accomplish this, the battery system 922 includes a first manifold 902 and a second manifold 904 configured to provide a heating and/or cooling fluid to the battery modules 924. According to an exemplary embodiment, the manifold 902 (inlet) is a supply manifold and the manifold 904 is return (outlet) manifold. According to another exemplary embodiment, the manifold 902 is a return manifold and the manifold 904 is a supply manifold. According to an exemplary embodiment, an end of each of the manifolds 902, 904 is connected to a fluid connection 900, 901 as shown in FIG. 46. Fluid connections 900, 901 are configured to connect the manifolds 902, 904 to other components of the thermal management system (e.g., heat exchanger of the vehicle, etc.).

As shown in FIGS. 46 and 47, the manifolds 902, 904 include connecting members 903, 905 that are configured to connect the manifolds 902, 904 to the heat exchangers (e.g., such as shown in FIG. 51) of the individual battery modules 924. As seen in FIG. 47, each of the connecting members 903 connects the manifold 902 to an opening 941 of the heat exchanger and each of the connecting members 905 connects the manifold 904 to the opening 942 of the heat exchanger. According to an exemplary embodiment, the connecting members 903, 905 each include a projection (e.g., barb, protrusion, ridge, extension, etc.) configured to aid in the retention of a hose clamp (not shown) on the connecting members 903, 905. The retention of the hose clamps on connecting members 903, 905 aids in the ease and efficiency of assembling the manifolds 902, 904 to the battery module 924.

As best seen in FIG. 47, the housing 920 is configured to allow easy access to the manifolds 902, 904 and the openings 941, 942 of the heat exchangers of the battery modules 924. For example, the housing 920 includes a shallow side wall on the side of the openings 941, 942 of the battery modules 924. Additionally, all of the fluid connections from the manifolds 902, 904 to the battery modules 924 are located along one side of the battery system 922. This allows for ease and increased efficiency of assembling the battery system 922. Likewise, substantially all of the electric connections of the battery modules 924 are located along one side of the battery system 922 (e.g., the side opposite of the manifold connections).

Referring now to FIGS. 48-59, the battery module 924 is discussed in more detail according to an exemplary embodiment. The battery module 924 includes an upper structure or housing 950 and a lower structure or tray 960 that are configured to substantially cover and contain a plurality of electrochemical cells 930 (e.g., as shown in FIG. 51). The housing 950 includes a plurality of supports or ribs 951 provided on an external surface of the housing 950. The ribs 951 are configured to aid in enhancing the structural rigidity of the housing 950.

Figure 53:
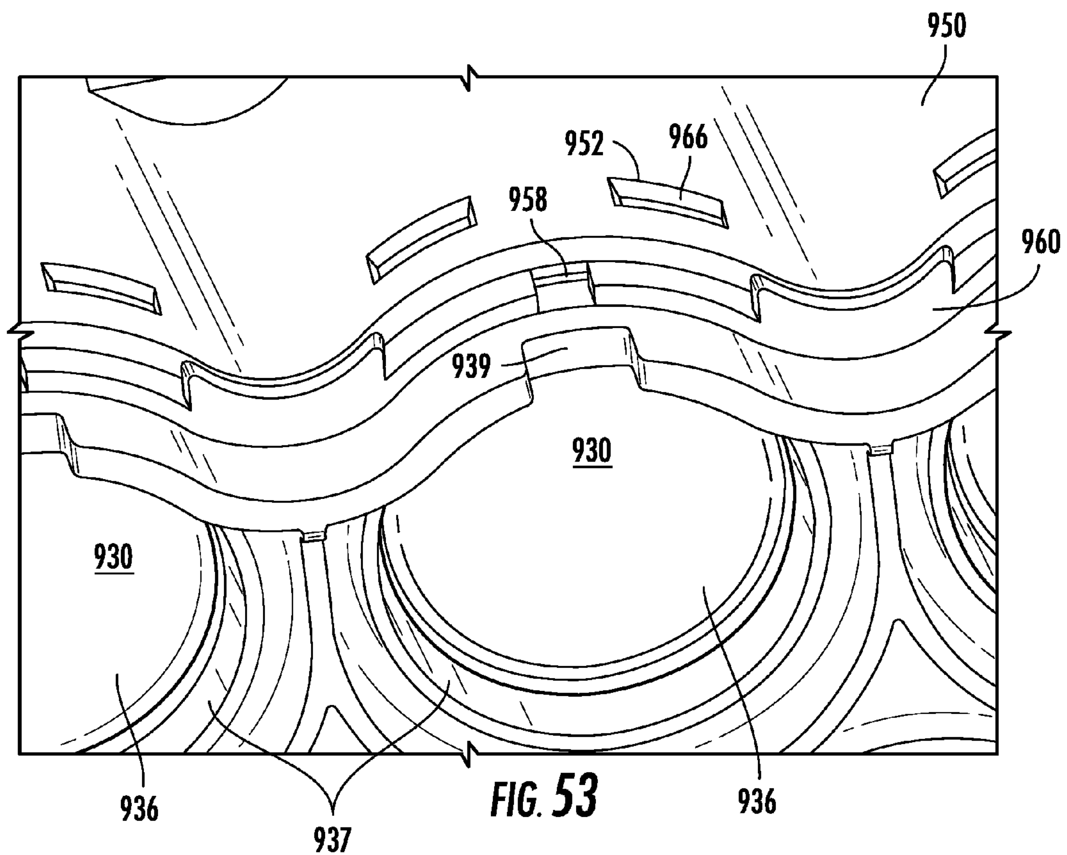

According to another exemplary embodiment, the housing 950 includes a plurality of apertures or openings 959 provided along an upper surface of the housing 950. The openings 959 are configured to allow fluids such as condensation and/or gases and/or effluent (e.g., that may be vented from the electrochemical cells 930) to exit the housing 950. The housing 950 further includes apertures or openings 958 (e.g., as shown in FIG. 53) to allow fluids to exit the housing 950. According to an exemplary embodiment, the holes 958, 959 are provided throughout the housing 950 at various locations to allow the fluid to exit the battery module regardless of the orientation the battery module 924 may be provided in (e.g., a vertical orientation, a horizontal orientation, etc.).

According to an exemplary embodiment, the housing 950 includes a plurality of members or elements shown as mounting members 953, 954. As shown in FIGS. 48-51 and 59, the mounting members 953, 954 include at least one opening or aperture configured to receive a fastener in order to mount the battery module within a battery system (e.g., such as the battery system 922 shown in FIGS. 46-47). According to an exemplary embodiment, the battery module 924 includes a first set of mounting members 953, 954 at a first end of the battery module 924 and a second set of mounting members 953, 954 at a second end of the battery module 924.

According to an exemplary embodiment, a portion of the mounting members 953, 954 may be configured in a generally horizontal orientation (e.g., such as the mounting members 953) and another portion of the mounting members 953, 954 may be provided in a substantial vertical orientation (e.g., such as mounting members 954). According to other exemplary embodiments, the mounting members 953, 954 may be provided in other orientations or configurations.

Figure 48:
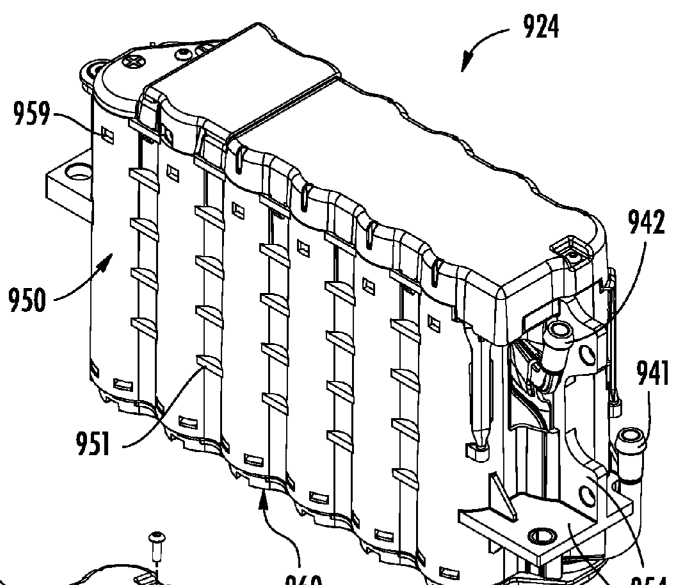
FIG. 48 is a perspective view of a battery module according to another exemplary embodiment.

According to an exemplary embodiment, a portion of the mounting members 953, 954 may be provided as a single component (e.g., a single unitary member). For example, as shown in FIG. 48, one of the mounting members 954 is provided as a single member with one of the mounting members 953. According to other exemplary embodiments, the mounting members 953, 954 may be provided as separate components and later coupled (e.g., welded) together. Having the various configurations and orientations of the mounting members 953, 954 allows the battery module 924 to be mounted within a battery system in various configurations. As one of ordinary skill in the art would readily understand, not all of the mounting members 953, 954 need to be used in every mounting configuration of the battery module 924 (e.g., some of the apertures or holes included within the mounting members 953, 954 may not be utilized in every mounting configuration).

Figure 49:
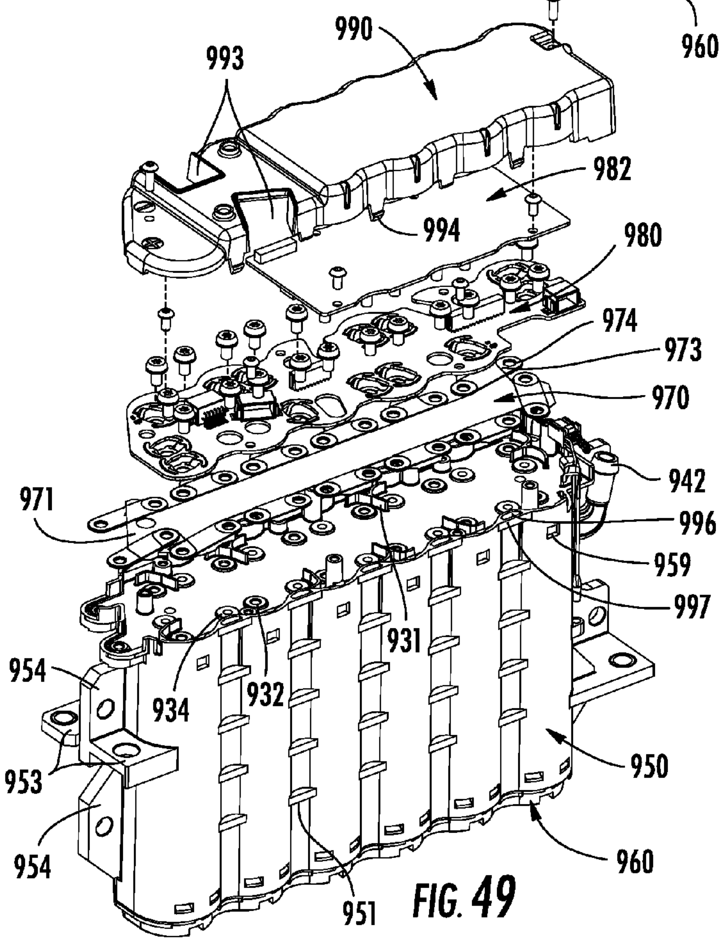
FIG. 49 is a partial exploded view of the battery module shown in FIG. 48 according to an exemplary embodiment.
Figure 59:
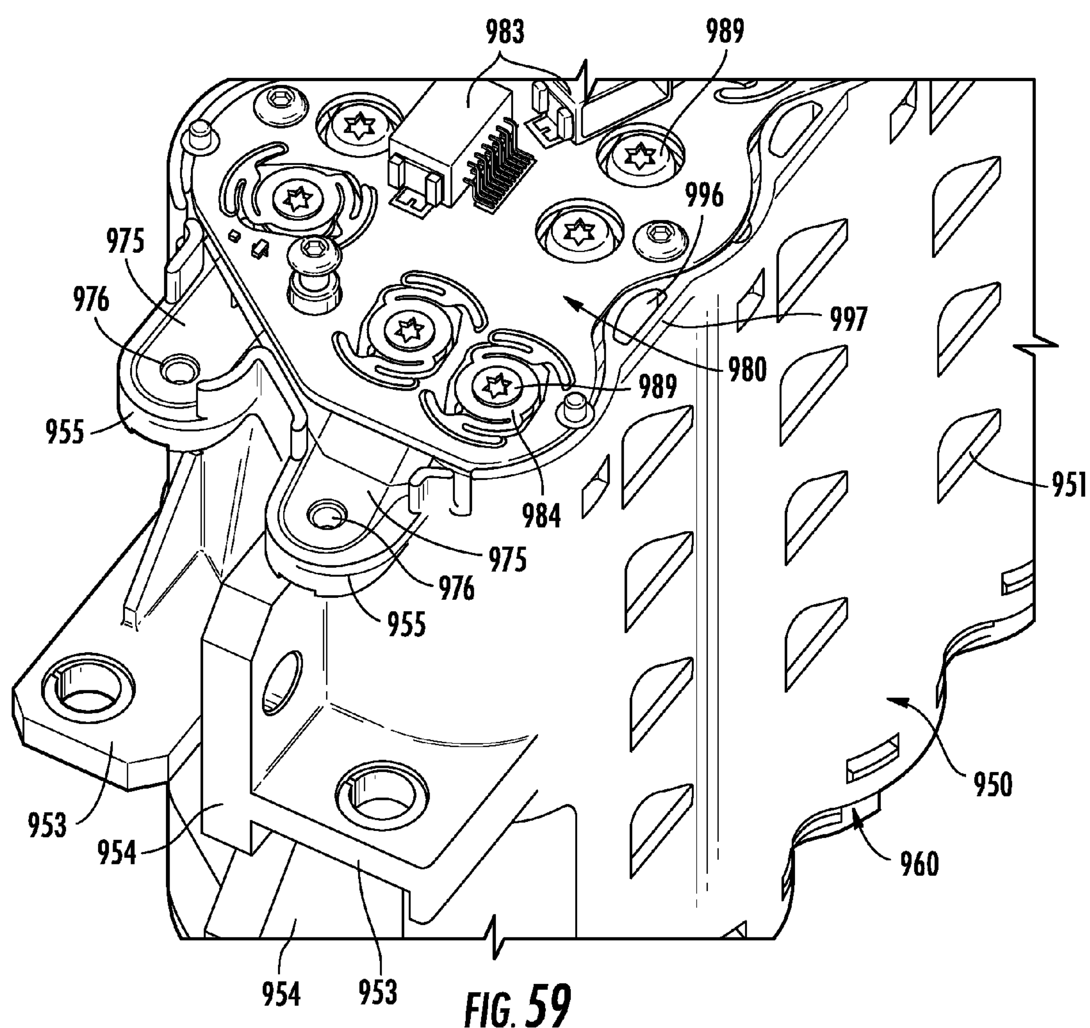
FIG. 59 is a partial perspective view of the battery module shown in FIG. 48 according to an exemplary embodiment.
Figure 60:
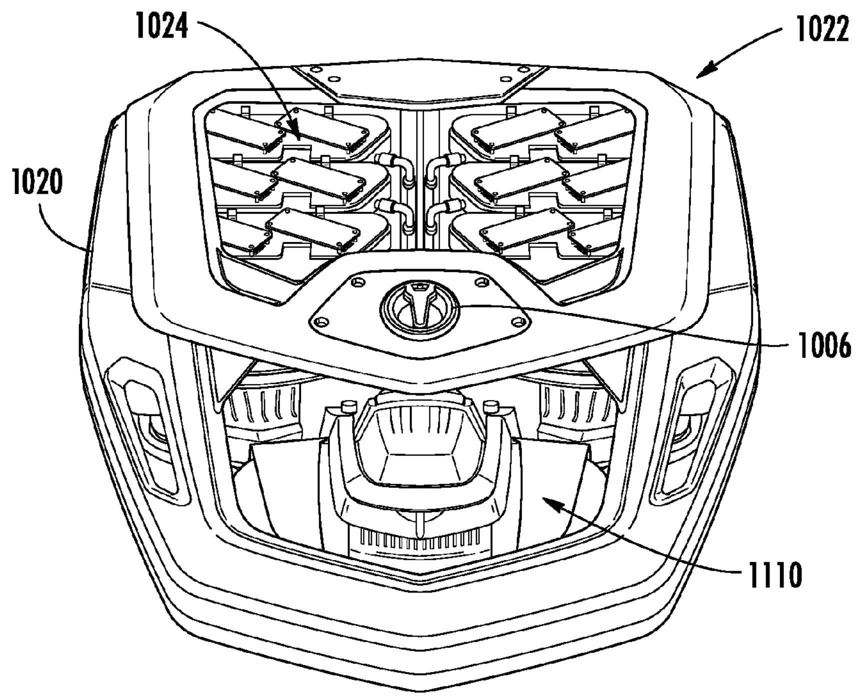
FIGS. 60-62 are perspective views of a battery system according to another exemplary embodiment.

Referring now to FIG. 49, the battery module 924 is shown to include a cover 990 that is configured to substantially cover a top portion of the battery module 924. Included at the top portion of the battery module 924 is a bus bar assembly 970, a traceboard 980, and a cell supervisory controller (CSC) 982. According to an exemplary embodiment, the cover 990 may be fastened to the housing 950 by a plurality of snap-fit features. For example, the cover 990 may include a plurality of projections shown as snap-hooks 994 that are configured to be received in a slot or opening 996 (e.g., as shown in FIG. 59). A ridge or lip of the snap-hooks 994 engages a ledge 997 once the snap-hooks 994 pass through the openings 996. According to an exemplary embodiment, the cover 990 may include the openings 996 and the housing 950 may include the snap-hooks 994. According to other exemplary embodiments, the cover 990 may be otherwise coupled to the housing 950 (e.g., with fasteners, glue, etc.).

According to an exemplary embodiment, the bus bar assembly 970 includes a plurality of bus bars 973 provided on a first layer or substrate 971 (e.g., a plastic or film such as Mylar®). According to another embodiment, a second layer (not shown) may be provided to sandwich the plurality of bus bars 973 between the first layer 971 and the second layer. As shown in FIG. 49, each of the plurality of bus bars 973 includes an aperture or opening 974 provided at each end of each of the bus bars 973. These openings 974 are configured to receive a fastener in order to couple the bus bar 973 to a terminal (e.g., such as a positive terminal 932 or a negative terminal 934 as shown in FIG. 49).

Figure 55:
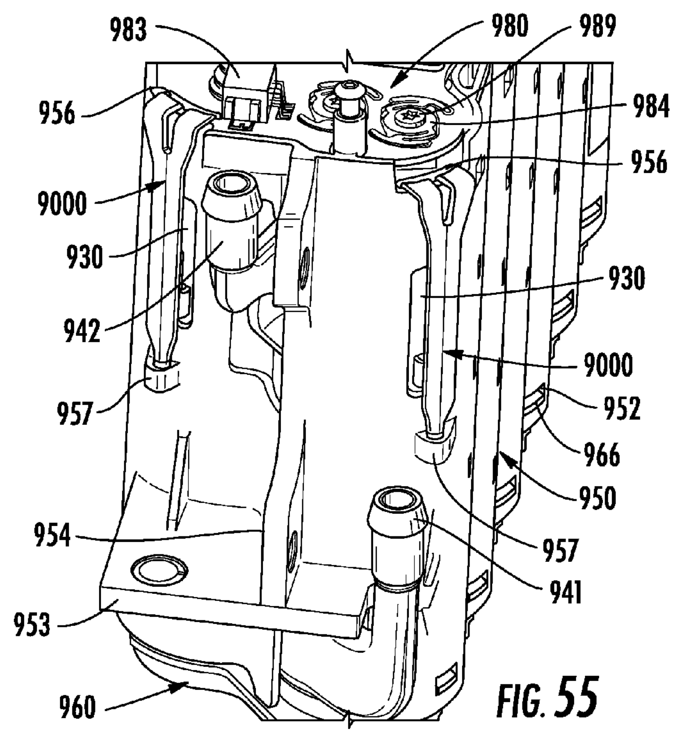
FIGS. 55-57 are partial perspective views of the battery module shown in FIG. 48 including a bracket configured to hold a temperature sensor according to an exemplary embodiment.
Figure 56:
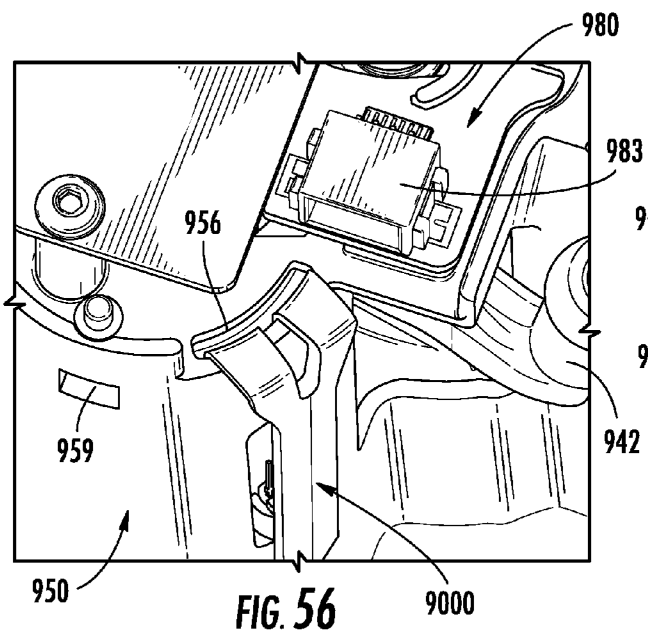

According to an exemplary embodiment, the traceboard 980 includes a plurality of flexible contacts 984 (e.g., as shown in FIGS. 55 and 59). The flexible contacts 984 may be similar to the flexible contacts 584 as shown and described in FIG. 33A. According to an exemplary embodiment, the flexible contacts 984 may be connected to connectors 983 (e.g., as shown in FIGS. 55 and 59) by a plurality of conductive lines or wires (not shown). According to an exemplary embodiment, the traceboard 980 may also include a plurality of various sensors (e.g., voltage sensors, temperature sensors, etc.) and other electrical components.

According to an exemplary embodiment, the CSC 982 may be mechanically coupled (e.g., by fasteners) to the traceboard 980. Additionally, the CSC 982 may be electrically coupled with the traceboard 980 by a cable or connector (not shown). According to an exemplary embodiment, the CSC 982 is configured to monitor and/or regulate the temperature, current, and/or voltage of electrochemical cells 930 (e.g., as shown in FIG. 51).

Referring now to FIG. 51, a plurality of electrochemical cells 930 are provided within the housing 950. According to an exemplary embodiment, the electrochemical cells 930 are generally cylindrical lithium-ion cells configured to store an electrical charge. According to other exemplary embodiments, the cells may be nickel-metal-hydride cells, lithium polymer cells, etc., or other types of electrochemical cells now known or hereafter developed. According to other exemplary embodiments, the electrochemical cells 930 could have other physical configurations (e.g., oval, prismatic, polygonal, etc.). The capacity, size, design, and other features of the electrochemical cells 930 may also differ from those shown according to other exemplary embodiments.

According to an exemplary embodiment, the electrochemical cells 930 include one positive terminal 932 and one negative terminal 934 at a first end of the cell 930 (e.g., as shown in FIG. 49). The electrochemical cells 930 also include a vent 936 at a second end of the cell 930 opposite of the first end. The vent 936 is configured to break away (i.e., deploy) from the cell 930 once the internal pressure of the cell 930 reaches a predetermined level. When the vent 936 is deployed (i.e., broken away from the cell) gases and/or effluent are allowed to be released from the cell 930. According to an exemplary embodiment, the vent 936 is a circular vent disk located at the bottom of the cell 930. According to other exemplary embodiments, the cell 930 may have different terminal and/or vent configurations (e.g., the positive terminal may be located on one end of the cell 930 and the negative terminal may be located on the opposite end of the cell 930).

According to an exemplary embodiment, the battery housing 950 is configured to receive two rows of six electrochemical cells 930 each for a total of twelve electrochemical cells 930. Although illustrated in FIG. 51 as having a particular number of electrochemical cells 930, it should be noted that according to other exemplary embodiments, a different number and/or arrangement of electrochemical cells 930 may be used depending on any of a variety of considerations (e.g., the desired power for the battery module 924, the available space within which the battery module 924 must fit, etc.).

Figure 52:
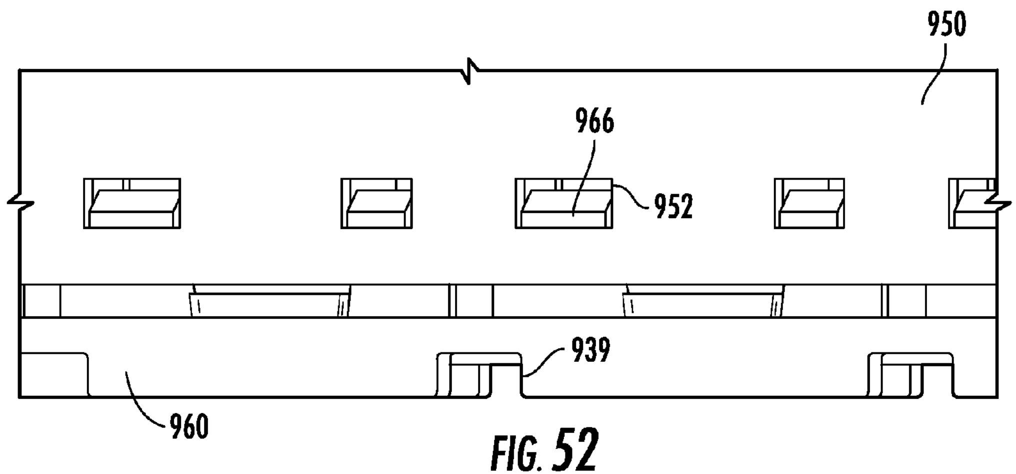
FIGS. 52-53 are perspective views of the tray shown coupled to the housing according to an exemplary embodiment.

According to an exemplary embodiment, the tray 960 is provided at a lower end of the housing 950. According to an exemplary embodiment, the tray 960 is coupled to the bottom portion of the housing 950 by a snap-fit configuration. According to other various exemplary embodiments, the tray 960 may be otherwise coupled to the housing 950 (e.g., with fasteners, adhesives, welding, etc.). As shown in FIGS. 50-51, the tray 960 includes a member shown as a snap-hook 966 that is configured to be received within an aperture or opening 952 provided in the housing 950 (e.g., such as shown in FIGS. 52-53).

According to an exemplary embodiment, the tray 960 includes a feature or element shown as an alignment tab 967 configured to aid in the insertion of the tray into the bottom portion of the housing 950. As shown in the figures, the alignment tab 967 extends to a height greater than that of the snap-hook 966. According to an exemplary embodiment, the snap-hook 966 and alignment tab 967 may be provided together as a single component with the tray 960. According to other exemplary embodiments, the snap-hooks 966 and the alignment tabs 967 may be provided separately from one another.

According to an exemplary embodiment, the tray 960 includes a plurality of openings or sockets that are configured to receive a lower end of the cells 930. The sockets may include an aperture or opening 961 that is configured to coincide with the vent 936 of the cells 930. The tray 960 further includes a member or wall 964 configured to aid in the positioning and/or retention of the lower end of the cells 930. According to an exemplary embodiment, the tray 960 also includes a member or plurality of projections 968. The plurality of projections 968 may aid in the positioning and/or retention of the cells 930. According to another exemplary embodiment, the plurality of projections 968 may also aid in positioning of a heat exchanger 940 within the housing 950.

According to an exemplary embodiment, the tray 960 is configured to receive a member shown as an inlay 962. The inlay 962 comprises a plurality of conjoined rings. Each ring is connected to another ring by a connecting member 963 (e.g., as shown in FIG. 50). Additionally, each ring may have an internal diameter 969 that generally corresponds with the opening 961 of the sockets of the tray 960. According to an exemplary embodiment, the tray 960 may have an opening or a cut-out 965 provided in the walls 964 of the tray to receive the connecting members 963 of the inlay 962.

According to an exemplary embodiment, the inlay 962 may be constructed of a flexible material such as EPDM foam (or any other suitable material). The inlays 962 are configured to take up any dimensional tolerance variation of the battery module 924 during assembly. Additionally, the inlay 962 may aid in isolating the electrochemical cells 930 from vibrations (e.g., during operation of the vehicle).

According to an exemplary embodiment, the tray 960 includes a feature or element shown as a wall 937. As shown in FIG. 51, the wall 937 generally coincides with the inner diameter 961 of the sockets of the tray 960. The walls 937 of each of the sockets of the tray 960 provide a vent opening feature for the vent 936. An example and description of a vent opening feature may be found in International Application No. PCT/US2009/053697, filed Aug. 13, 2009, the entire disclosure of which is incorporated herein by reference.

Figures 54A, 54B, 54C:
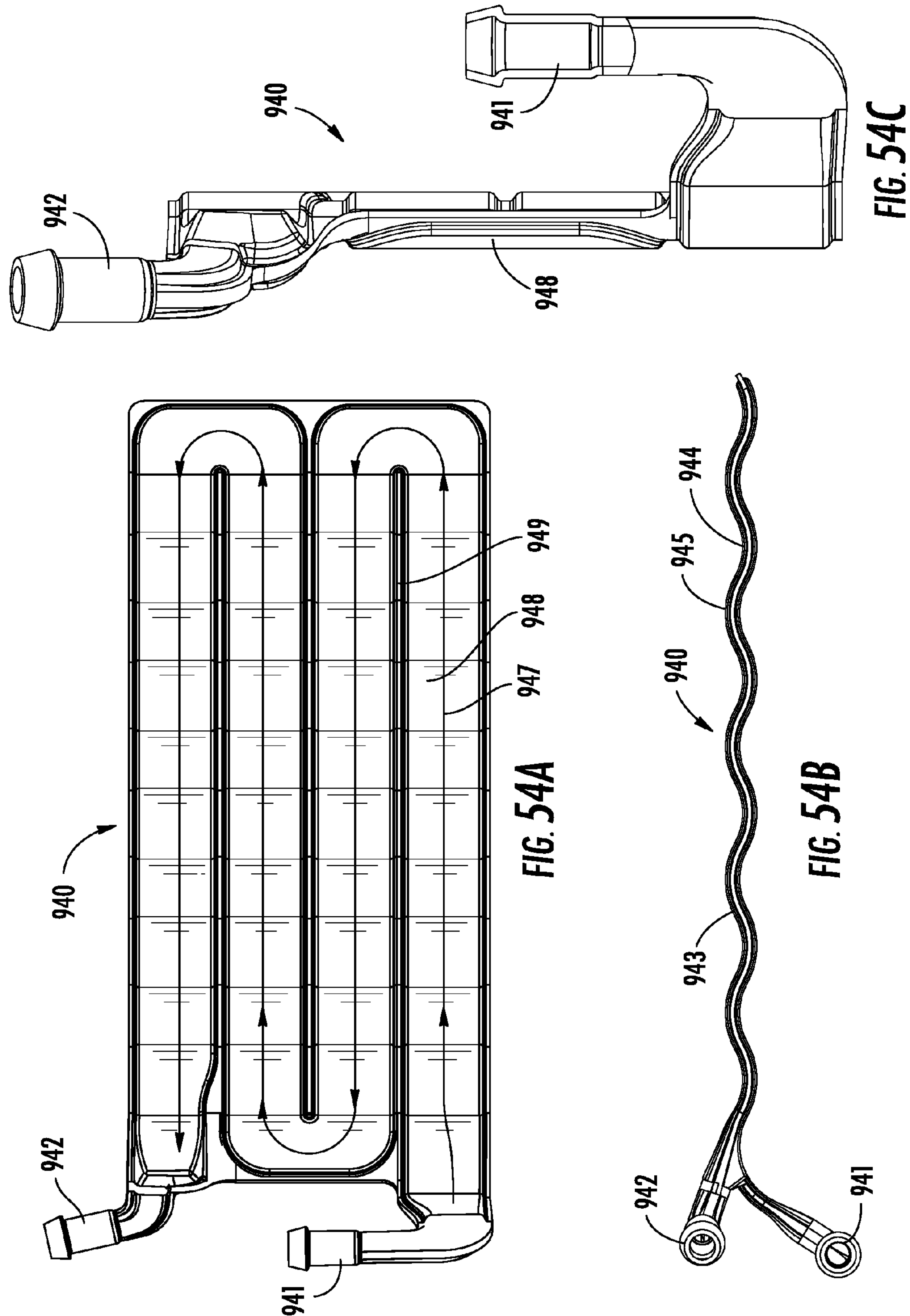
FIG. 54A is a side view of a heat exchanger for use in the battery module shown in FIG. 48 according to an exemplary embodiment.
FIG. 54B is a top view of the heat exchanger shown in FIG. 54A.
FIG. 54C is an end view of the heat exchanger shown in FIG. 54A.

According to an exemplary embodiment, the battery module 924 also includes a heat exchanger 940 that is configured to be provided in between the rows of electrochemical cells 930 as shown in FIG. 51. As shown in FIGS. 54A-54C, the heat exchanger 940 includes a first opening 941 and a second opening 942. According to one exemplary embodiment, the first opening 941 is configured to be an inlet while the second opening 942 is configured to be an outlet. According to another exemplary embodiment, the opening 942 may be configured to be an inlet while the opening 941 may be configured to be an outlet.

According to an exemplary embodiment, a fluid (a heating or cooling fluid, such as, e.g., a refrigerant, water, water/glycol mixture, etc.) flows through the heat exchanger 940 through passages 948 that are separated by a gap 949. As shown in FIG. 54A, the fluid follows the path illustrated by arrows 947 when the opening 941 is an inlet and the opening 942 is an outlet. When the opening 942 is an inlet and the opening 941 is an outlet, the flow of the fluid through the heat exchanger 940 would be in the opposite direction.

According to an exemplary embodiment, the flow of the fluid inside the heat exchanger 940 may be in a zig-zag motion (e.g., as shown by arrow 947 in FIG. 54A), but may vary according to other exemplary embodiments. According to one exemplary embodiment, the discrete path 548 may be separated by a gap 549 (or, alternatively, there may be solid material between the paths rather than a gap to separate the various parts of the winding path from each other) to form multiple segments of the path 548.

In this manner, the fluid may be routed through the heat exchanger 940 such that it passes past each of the cells multiple times as it zig-zags through the heat exchanger 940. Similar to the fluid flow within the heat exchanger described with respect to FIG. 20, the fluid flow through the heat exchanger is divided into multiple segments that are separated from each other, although instead of flowing in a single direction between an inlet or an outlet, the fluid in the heat exchanger 940 reverses its flow direction as it transitions between one segment of the fluid flow path and the adjacent segment of the fluid flow path.

As shown in FIGS. 54A-54C, both the opening 941 and opening 942 are located on the same end of the heat exchanger 940. This allows for the connections (e.g., from manifolds such as shown in FIGS. 46 and 47) to the openings 941, 942 to be made on the same side of the battery module. Additionally, having openings 941, 942 on the same side of the heat exchanger 940 allows for an even number of segments to be provided in the heat exchanger 940. For example, the heat exchanger 940 is provided with four segments, with the fluid flowing past each of the cells 930 an even number of times. Having an even number of segments (and having an even number of times the fluid flows past a specific cell 930) allows for more even cooling and/or heating of the cells.

For example, during cooling of the cells 930, the fluid enters the heat exchanger 940 at a cool temperature. The temperature of the fluid will warm as it passes the cells 930 and flows along the flow path 947. As the fluid warms, there is less heat transfer out from the cells 930. However, by having an even number of segments as shown in FIG. 54A, cooling is evened out among the cells 930 by having the now warm fluid flow past the cells near the inlet as the fluid exits the opening 942.

As shown in FIG. 54B, the heat exchanger 940 includes an external surface 943 that is shaped to coincide with an external surface 938 of the electrochemical cells 930. As such, the external surface 943 of the heat exchanger 940 includes curved sections represented by reference numbers 944 (a valley, trough, etc.) and 945 (a peak, high point, etc.). According to one exemplary embodiment, the design of the heat exchanger 940 is configured to provide an angled contact along each of the electrochemical cells 930. According to an exemplary embodiment, the angled contact for each electrochemical cell 930 is substantially the same as that of the rest of the electrochemical cells 930. However, according to other exemplary embodiments, the angle of contacts may vary among the electrochemical cells 930 (e.g., to more evenly provide heat transfer to/from the cells).

According to an exemplary embodiment, the heat exchanger 940 may be made from a blow molding process, an injection molding process, or other suitable process. According to an exemplary embodiment, the wall thickness of the heat exchanger 940 is between approximately 0.6 millimeters and 1.0 millimeters, but may have a greater or lesser wall thickness according to other exemplary embodiments.

According to one exemplary embodiment, the heat exchanger 940 is semi-flexible and configured to conform to the outside of the electrochemical cells 930. For example, the heat exchanger 940 may expand under a slight (e.g., between approximately 5-10 psi) fluid pressure such that the heat exchanger 940 expands so that the external surface 943 makes contact with and/or conforms to the external surface 938 of the electrochemical cells 930.

According to an exemplary embodiment, the heat exchanger 940 may be made of a polymeric material (e.g., polypropylene) or other suitable material that allows for heat conduction to/from the cells 930 (e.g., an electrically insulative and thermally conductive material). According to another exemplary embodiment, the heat exchanger 940 may be made of a metallic material (e.g., aluminum or aluminum alloy) or other suitable material (e.g., when the external surface of the cells 930 are not electrically charged (e.g., can neutral) or a separate electrically insulative and thermally conductive material is provided between the cells and the heat exchanger). According to another exemplary embodiment, the heat exchanger 940 may be made of a ceramic material or other suitable material.

Referring now to FIGS. 55-58D, a member shown as a bracket 9000 is provided on an end of the battery module 924. According to one exemplary embodiment, two brackets 9000 are provided with each battery module 924; however, the battery module 924 may include a greater or lesser number of brackets 9000 according to other exemplary embodiments. Each bracket 9000 is configured to retain (e.g., hold, clasp, clinch, clutch, grasp, keep, etc.) a temperature sensor 9020 in contact with an electrochemical cell 930. According to an exemplary embodiment, the placement of the temperature sensor 9020 is approximately at a midpoint of the electrochemical cell 930. According to other exemplary embodiments, the placement of the temperature sensor 9020 may be higher or lower than the midpoint of the electrochemical cell 930.

Bracket 9000 includes a main body 9001 having a first end 9002 and a second end forming a plurality of hooks 9003. According to one exemplary embodiment, the first end 9002 is configured to be placed within a hole or opening 957 (see, e.g., FIG. 55) located in a flange of the housing 950 of the battery module 924, while the hooks 9003 are configured to engage a slot or opening 956 located in the housing 950 of the battery module 924. As shown in FIGS. 55-58D, the bracket 9000 includes two hooks 9003; however, according to other exemplary embodiments, the bracket 9000 may include a greater or lesser number of hooks 9003.

Figure 57:
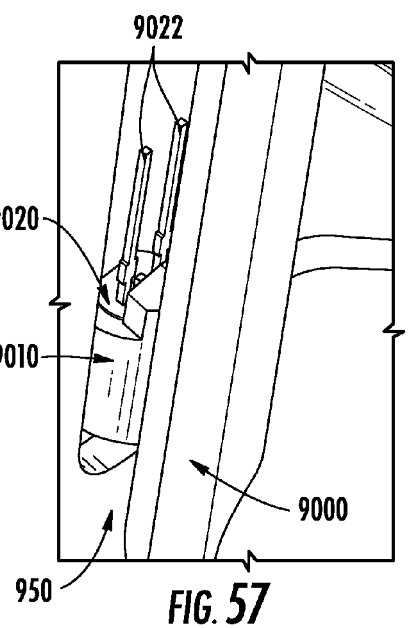
Figure 58D:
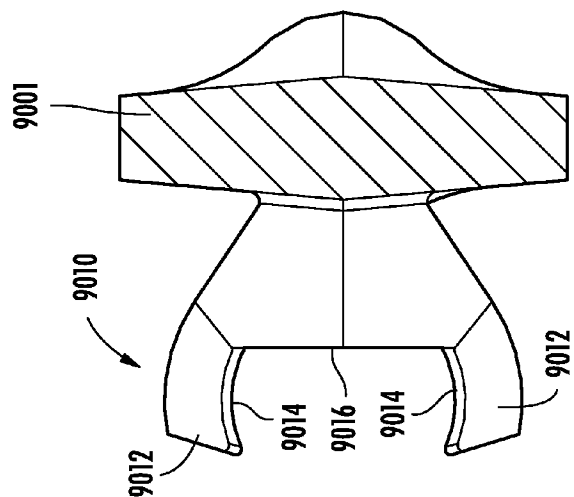
FIG. 58D is a cross-sectional view of the bracket shown in FIG. 58A taken alone line 58D-58D in FIG. 58C.
Figure 58C:
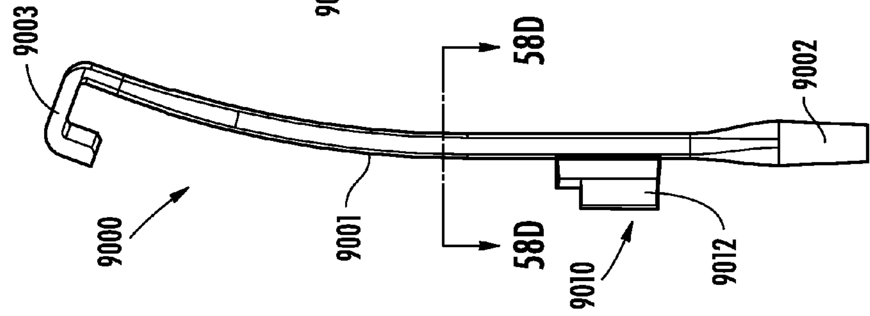
FIG. 58C is a side view of the bracket shown in FIG. 58A.
Figure 58B:
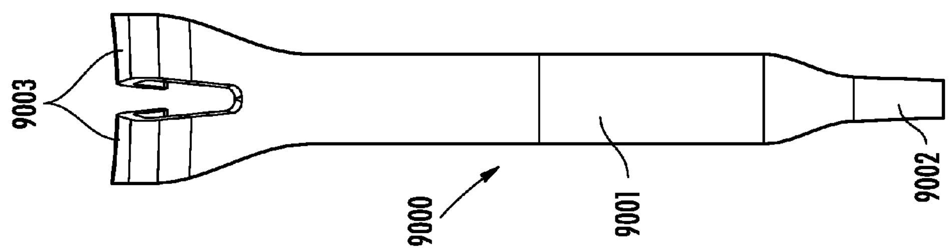
FIG. 58B is an end view of the bracket shown in FIG. 58A.
Figure 58A:
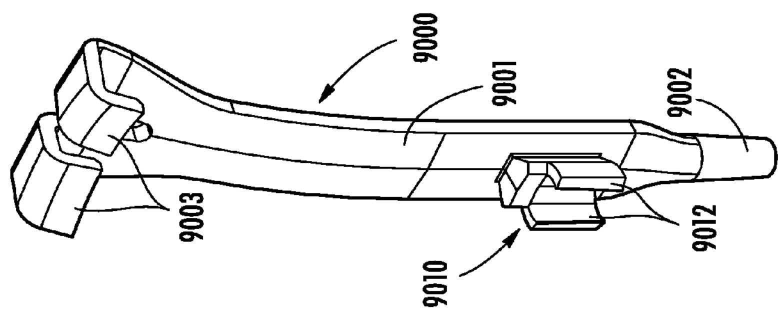
FIG. 58A is a perspective view of a bracket configured to hold a temperature sensor according to an exemplary embodiment.

The bracket 9000 further includes a feature or element shown as a retention device 9010. The retention device 9010 includes a pair of members or arms 9012 coupled to a body portion 9016. As shown in FIG. 58D, the arms 9012 oppose one another. Each arm 9012 includes an inner surface 9014. As shown in FIG. 58D, the inner surface 9014 is curved such as to correspond to the shape of the temperature sensor 9020 (e.g., as shown in FIG. 57). According to other exemplary embodiments, the retention device 9010 (including the arms 9012 and the body portion 9016) may have other configurations.

According to an exemplary embodiment, the bracket 9000 is formed from a semi-flexible material such as a plastic material (e.g., Nylon, etc.) or other suitable material. As seen best in FIG. 58C, the bracket 9000 has a curvature in regards to the first end 9002 and the hooks 9003. However, once the bracket 9000 is installed on the battery module 924, the bracket 9000 is in a substantially straight or uncurved position, creating a force to hold or maintain the temperature sensor 9020 in contact with the electrochemical cell 930.

As shown in FIG. 57, the temperature sensor 9020 includes electrical contacts 9022. The contacts 9022 are configured to be connected (e.g., by wires) to another part of the battery module 924 (e.g., the CSC) in order to read and monitor the temperature of the electrochemical cell 930.

Referring now to FIG. 59, a portion of the battery module 924 is shown according to an exemplary embodiment. The battery module 924 is shown to include a feature shown as a projection 955 that extends out from the housing 950. As shown in FIG. 59, the battery module 924 includes two such projections 955. Each projection 955 is configured to receive a conductive member 975 that at one end is conductively connected to a terminal (such as shown in FIG. 51) of an electrochemical cell 930.

Each conductive member 975 includes an aperture or opening 976 at each end of the conductive member 975. One of the openings 976 is configured to receive a fastener (such as fastener 989) in order to couple the conductive member 975 to the terminal of an electrochemical cell 930. The other opening 976 of the conductive member 975 is configured to connect the battery module 924 to another battery module 924 (e.g., such as shown in FIG. 46) or to another component of the battery system 922. The projections 955 offer rigid support to the conductive member 975 such that loads or forces imposed on the conductive member 975 are transferred to the projections 955 and not to the electrochemical cell 930 (or to the terminals of the electrochemical cell 930) that the conductive member 975 is connected to.

According to an exemplary embodiment, the projections 955 are constructed from a material similar to or the same as the housing 950 (e.g., such as a polyethylene, polypropylene, etc.). According to another exemplary embodiment, the projections 955 may have a shape or form substantially similar to that of the end of the conductive members 975.

Referring now to FIGS. 60-64D, a battery system 1022 is shown according to an exemplary embodiment. The battery system 1022 includes a plurality of battery modules 1024. Although not specifically shown, each battery module 1024 includes a plurality of electrochemical cells or batteries (e.g., lithium-ion cells, nickel-metal-hydride cells, lithium polymer cells, etc., or other types of electrochemical cells now known or hereafter developed). According to an exemplary embodiment, the electrochemical cells are generally cylindrical lithium-ion cells configured to store an electrical charge. According to other exemplary embodiments, cells could have other physical configurations (e.g., oval, prismatic, polygonal, etc.). The capacity, size, design, and other features of the cells may also differ from those shown according to other exemplary embodiments.

Although illustrated in FIGS. 60-64D as having a particular number of battery modules 1024 (i.e., two rows of four modules for a total of eight modules), which in turn include a particular number of electrochemical cells (i.e., two rows of five cells per module for a total of 10 electrochemical cells per module and 80 electrochemical cells per battery system), it should be noted that according to other exemplary embodiments, a different number and/or arrangement of modules and/or electrochemical cells may be used depending on any of a variety of considerations (e.g., the desired power for the battery system, the available space within which the battery module and/or battery system must fit, etc.).

According to the exemplary embodiment shown in FIGS. 60-64D, the battery system 1022 includes a thermal management system 1110. According to an exemplary embodiment, the thermal management system 1110 is configured as a stand-alone modular system. The thermal management system 1110 may be sized specifically for the application that the battery system 1022 is being used in and scalable to the specific requirements of the application. For example, the various components of the thermal management system 1110 may be swapped out to meet the specific requirements of the application.

The thermal management system 1110 is a complete stand-alone system to provide cooling and/or heating to the battery system 1022. The thermal management system 1110 does not need to be connected to any heating/cooling system of the vehicle it is placed in. Additionally, the modular thermal management system 1110 may be removed and/or reattached to the battery system 1022 as needed (e.g., to swap out components, to reattach a smaller or larger rated thermal management system, etc.). According to an exemplary embodiment, the thermal management system 1110 is coupled to the battery system 1022 with a plurality of snap-fit connections or fasteners (not shown).

Figure 63:
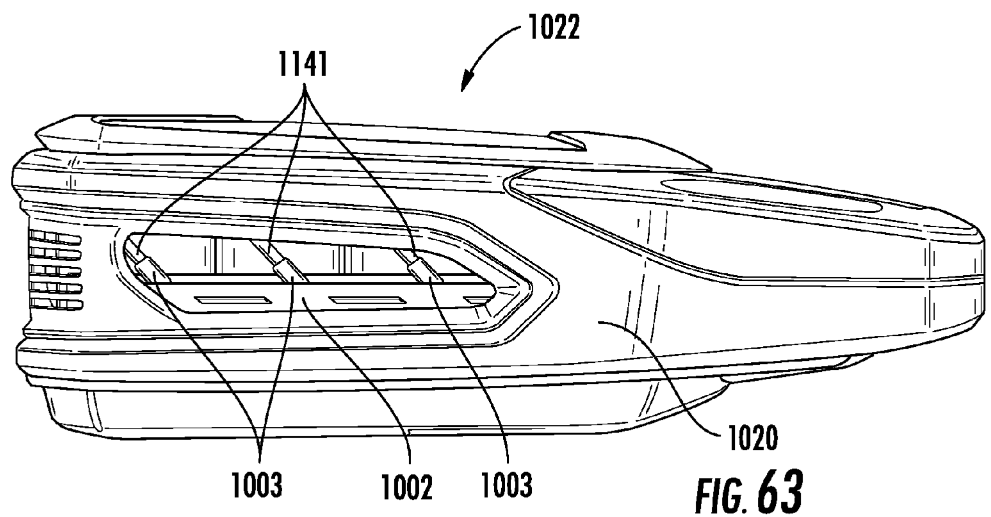
FIG. 63 is a side view of the battery system shown in FIGS. 60-62 according to an exemplary embodiment.
Figure 64D:
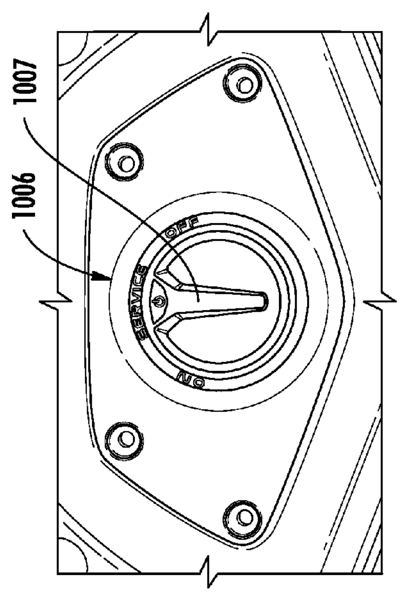
FIG. 64D is a front view of a service disconnect switch for the battery system shown in FIGS. 64A and 64B according to an exemplary embodiment.
Figure 64C:
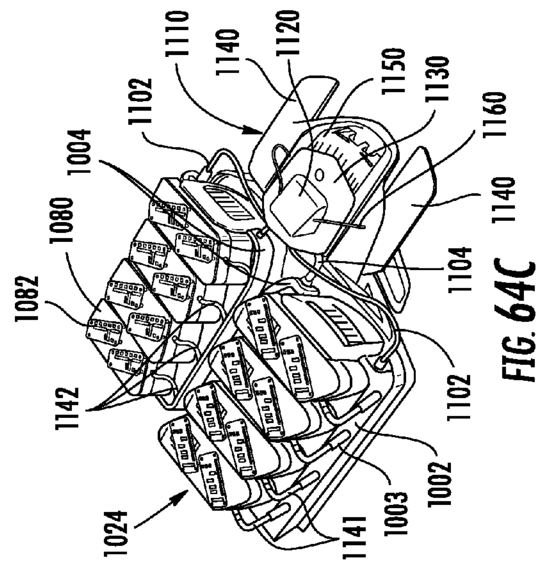
FIG. 64C is a perspective view of the battery system shown in FIG. 64B having the external covers and housing removed according to an exemplary embodiment.
Figure 64A:
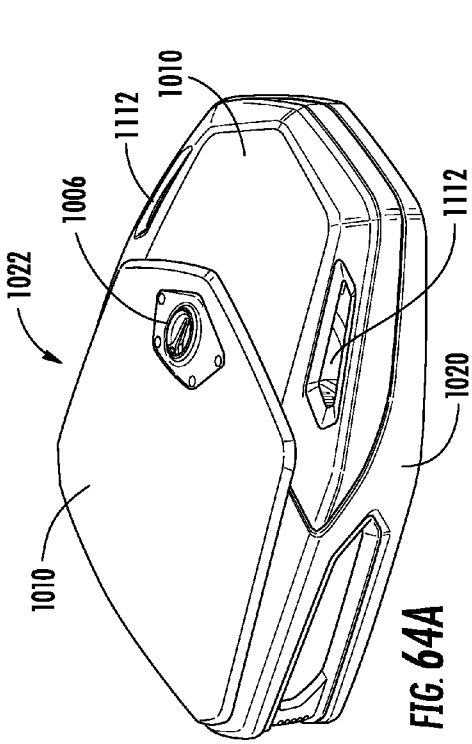
FIG. 64A is a perspective view of the battery system shown in FIGS. 60-62 having opaque covers according to an exemplary embodiment.
Figure 64B:
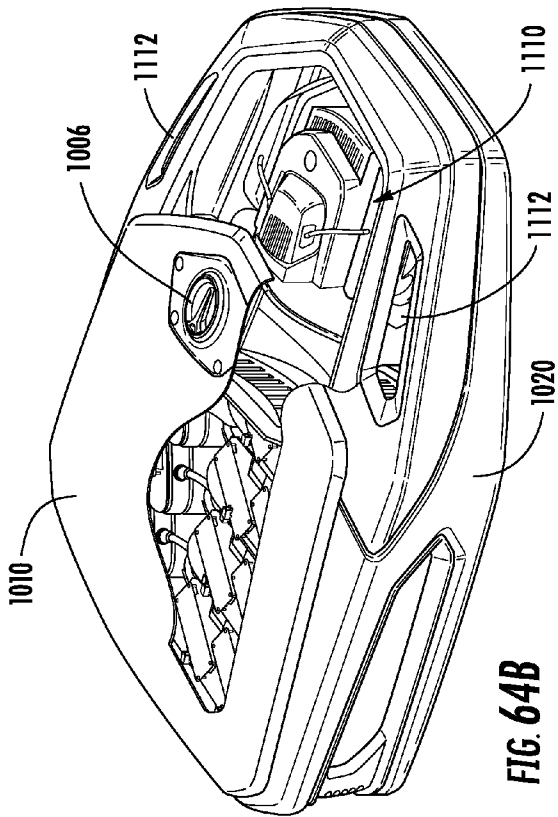
FIG. 64B is a partial cut-away perspective view of the battery system shown in FIG. 64A according to an exemplary embodiment.

As shown in FIG. 64C, the thermal management system 1110 provides two closed loop cooling circuits to the battery system 1022 (i.e., a single closed loop cooling system for each row of battery modules 1024). It should be noted that FIGS. 60-64C show a cooling system; however, the thermal management system 1110 may also provide heating to the battery system 1022 if needed.

According to an exemplary embodiment, as shown in FIG. 64C, the thermal management system 1110 includes a compressor 1120, a pump 1130, a radiator/condenser 1140 for each row of battery modules 1024, and a fan (not shown) located in a fan housing 1150. Refrigerant used in the thermal management system 1110 may be Freon (e.g., R134a), water, $CO_2$, or other suitable fluid. The thermal management fluid (i.e., cooling fluid) that is routed to the battery modules 1024 (e.g., via manifolds) is preferably a water-glycol mixture (e.g., 50/50 mixture) but may vary according to various other embodiments.

The thermal management system 1110 further includes a cooling line 1102 (supply line) coming from the pump 1130 and supplies cooled cooling fluid to a supply manifold 1002 located external to the row of battery modules 1024. As seen in FIG. 63, cooling lines 1141 connect to manifold connections 1003 of the supply manifold 1002 and the battery module 1024 (e.g., to a heat exchanger located inside the battery module 1024). The cooling fluid is routed through the individual battery modules 1024 to cool the electrochemical cells 330.

According to an exemplary embodiment, the cooling fluid is routed around the outside of the battery module 1024 to cool the cells located inside the battery module 1024. According to another exemplary embodiment, the cooling fluid is routed through (in between) the two rows of cells. According to other various embodiments, the cooling fluid may be routed through the battery module 1024 in any configuration that is necessary to cool the electrochemical cells inside the battery module 1024.

Referring again to FIG. 64C, cooling lines 1142 route the cooling fluid exiting the battery modules 1024 to a return manifold 1004. The return manifold 1004 is connected to the radiator/condenser 1140 by a return line 1104 to remove heat from the now warmed cooling fluid. According to another exemplary embodiment, the flow of the cooling fluid may be reversed (e.g., the return manifold and return lines would become supply manifold and supply lines, while the supply manifold and supply lines would become return manifold and return lines) such that the cooling fluid flows inside to outside the battery system 1022.

As shown in FIG. 64C, the thermal management system 1110 provides separate cooling to the individual rows of battery modules 1024. This is intended to aid in balancing the temperatures of the electrochemical cells so that the temperatures throughout the entire battery system 1022 are as even as possible. According to other various exemplary embodiments, there may be only a single cooling loop for the entire battery system 1022.

Referring to FIG. 64C, each battery module 1024 includes its own cell supervisory controller (CSC) 1082 to monitor cell voltage and or temperature. The CSC 1082 may balance the cells if necessary (e.g., even out the individual cell voltages and/or temperatures), as well as provide redundant protection for overvoltage, undervoltage, and overtemperature conditions. According to an exemplary embodiment, the CSC 1082 is mounted on and electrically connected to a traceboard 1080 (e.g., printed circuit board). The traceboard is configured to electrically connect the electrochemical cells to the CSC 1082. The battery system 1022 may also include a battery management system (not shown) that monitors and/or regulates the battery modules 1024 and electrochemical cells.

The battery system 1022 may also include a number of openings or windows 1011 in a cover 1010 or housing 1020 to allow a user to view the internal components of the battery system 1022 (e.g., as shown in FIGS. 60-63). Alternatively, the openings may be replaced with a single opaque or solid cover.

Figure 61:
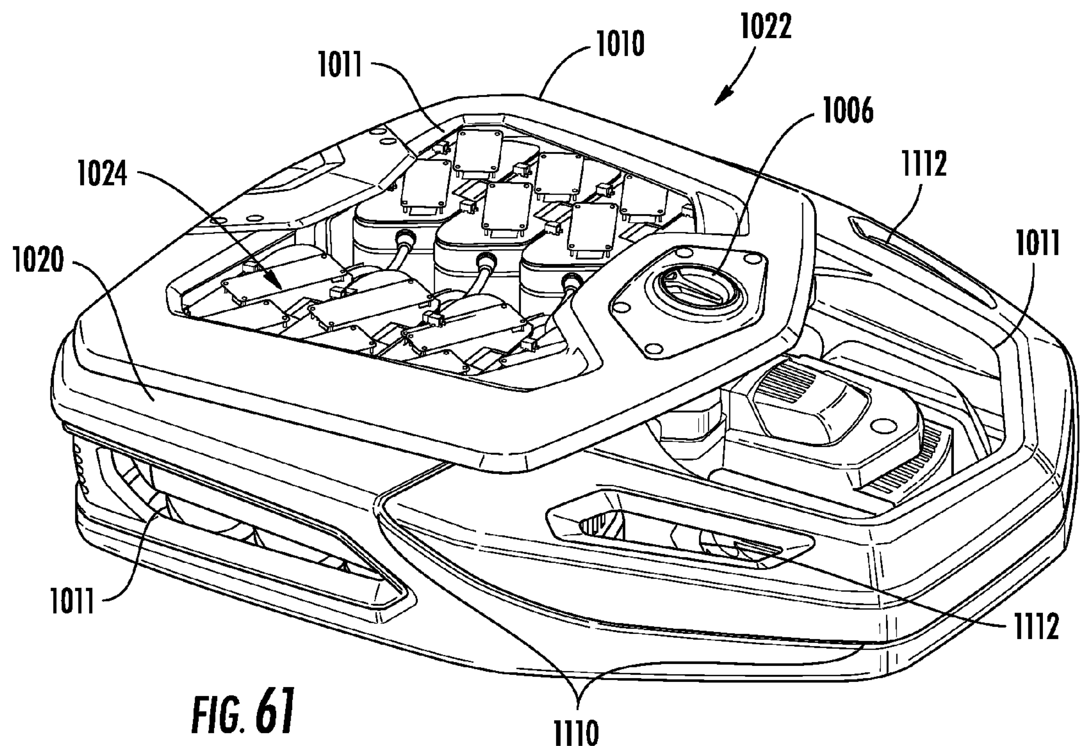
Figure 62:
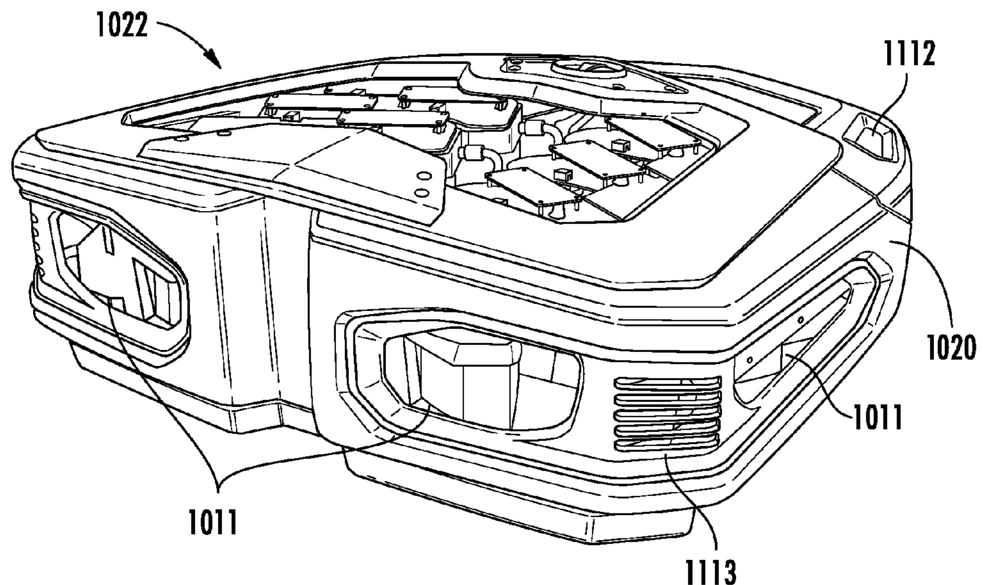

The battery module 1024 also includes a plurality of openings or air vents 1112, 1113 to allow air to enter or exit the battery system 1022 (e.g., as shown in FIGS. 61-62) to be used by the thermal management system 1110 (e.g., air may be blown across the radiator 1140). Air may enter the air openings 1112 of the battery system 1022 from the environment surrounding the battery system 1022 (e.g., air contained in the rear of the vehicle or a trunk of the vehicle may enter the battery system through the air openings when the battery system is placed in the rear of a vehicle or the trunk of a vehicle). Alternatively, air may be routed to the battery system 1022 via ductwork connecting the air openings 1112 and the source of the air (e.g., ducts connecting the air openings to the cabin of the vehicle, to outside of the vehicle, etc.). Air may then exit the battery system 1022 through the openings 1113. According to another exemplary embodiment, air may enter the openings 1113 and exit the openings 1112.

Referring now to FIG. 64D, the battery system 1022 also includes a three-position switch shown as an on/off/service disconnect switch 1006. The switch 1006 includes a member or handle 1007 and is configured to allow a user to choose between different modes of operation of the battery system 1022. For example, when the switch 1006 is set in the on position, the battery is capable of supplying electrical power to the vehicle. When the switch 1006 is set to the off position, the battery system 1022 is off (i.e., not supplying power). The off position may be used, for example, when shipping the battery system 1022 prior to installation in the vehicle.

The third position, the service position, is selected by a user when servicing the battery system 1022. Activating the switch 1006 to the service position disconnects the first row of battery modules 1024 from the second row of battery modules 1024, thus lowering the overall voltage potential of the battery system 1022 by half. The service position also allows the battery cover 1010 of the battery system to be taken off, allowing the user to service the battery system 1022. The cover 1010 may not be taken off when the switch 1006 is in either the on or the off position.

Referring now to FIGS. 65-68, a battery system 1222 is shown according to another exemplary embodiment. The battery system 1222 shown in FIGS. 65-68 is conceptually similar to the battery system 1022 shown in FIGS. 60-64D.

Referring to FIGS. 65-68, the battery system 1222 is shown to include a plurality of battery modules 1224. Although not specifically shown, each battery module 1224 includes a plurality of electrochemical cells or batteries (e.g., lithium-ion cells, nickel-metal-hydride cells, lithium polymer cells, etc., or other types of electrochemical cells now known or hereafter developed). According to an exemplary embodiment, the electrochemical cells are generally cylindrical lithium-ion cells configured to store an electrical charge. According to other exemplary embodiments, cells could have other physical configurations (e.g., oval, prismatic, polygonal, etc.). The capacity, size, design, and other features of the cells may also differ from those shown according to other exemplary embodiments.

Although illustrated in FIGS. 65-68 as having a particular number of battery modules 1224 (i.e., two rows of four modules for a total of eight modules), which in turn include a particular number of electrochemical cells (i.e., two rows of five cells per module for a total of 10 electrochemical cells per module and 80 electrochemical cells per battery system), it should be noted that according to other exemplary embodiments, a different number and/or arrangement of modules and/or electrochemical cells may be used depending on any of a variety of considerations (e.g., the desired power for the battery system, the available space within which the battery module and/or battery system must fit, etc.).

According to the exemplary embodiment as shown in FIGS. 65-68, the battery system 1222 includes a thermal management system 1310. According to an exemplary embodiment, the thermal management system 1310 is configured as a stand-alone modular system. The thermal management system 1310 may be sized specifically for the application the battery system 1222 is being used in and scalable to the specific requirements of the application. For example, the various components of the thermal management system 1310 may be swapped out to meet the specific requirements of the application.

The thermal management system 1310 is a complete stand-alone system to provide cooling and or heating to the battery system 1222. That is, the thermal management system 1310 does not need to be connected to any heating/cooling system of the vehicle it is placed in. Additionally, the modular thermal management system 1310 may be removed and/or reattached to the battery system 1222 as needed (e.g., to swap out components, to reattach a smaller or larger rated thermal management system, etc.). According to an exemplary embodiment, the thermal management system 1310 is coupled to the battery system 1222 with a plurality of snap-fit connections or fasteners (not shown).

As shown in FIGS. 65-68, the thermal management system 1310 provides two closed loop cooling circuits to the battery system 1222 (i.e., a single closed loop cooling system for each row of battery modules 1224). It should be noted that FIGS. 60-64C show a cooling system; however, the thermal management system 1310 may also provide heating to the battery system 1222 if needed. The thermal management system 1310 may include a compressor, a pump, a radiator/condenser for each row of battery modules, and a fan located in a fan housing. Refrigerant used in the thermal management system 1310 may be Freon (e.g., R134a), water, or $CO_2$. The thermal management fluid (i.e., cooling fluid) that is routed to the battery modules 1224 (e.g., via manifolds) is preferably a water-glycol mixture (e.g., 50/50 mixture), but may vary according to various other embodiments.

Figure 66:
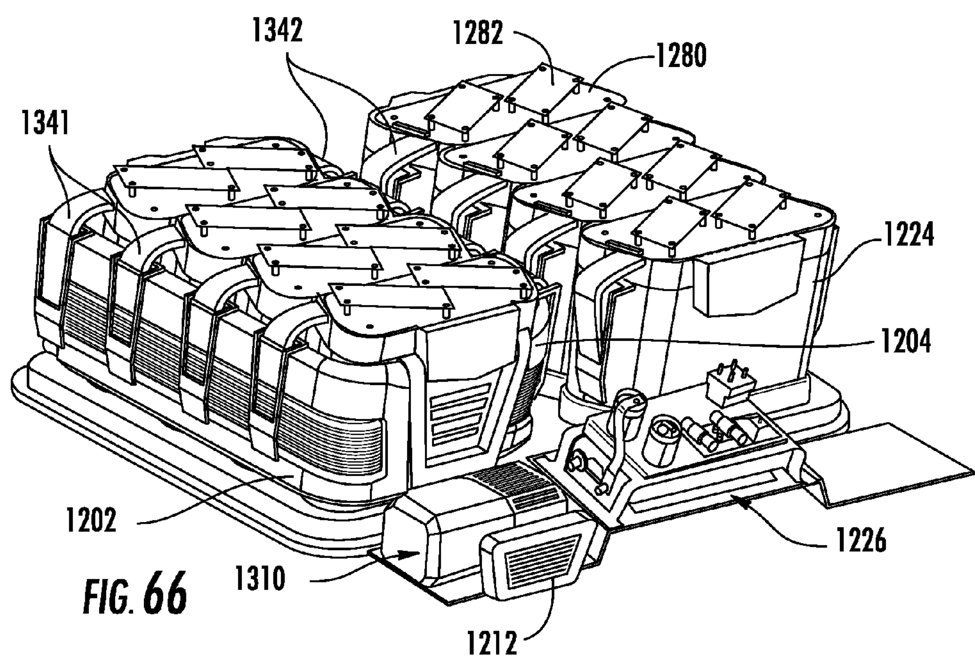
FIG. 66 is a partial perspective view of the battery system shown in FIG. 65 having the external cover or housing removed according to an exemplary embodiment.
Figure 67:
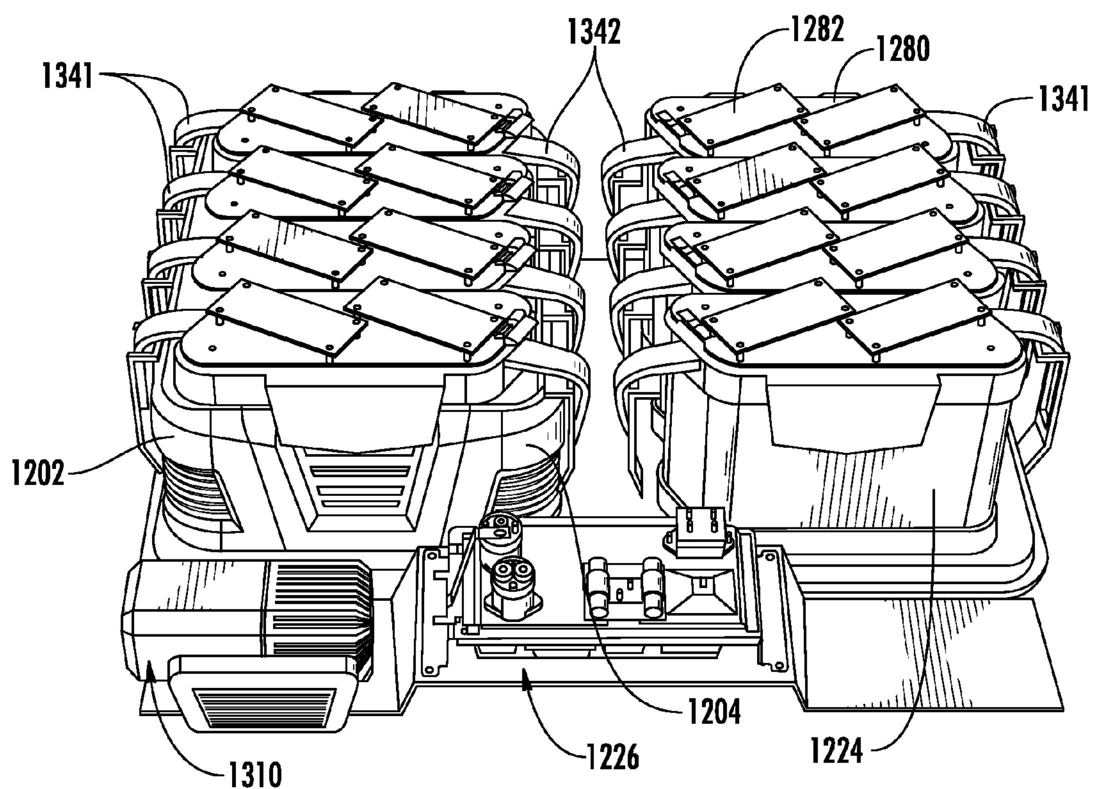
FIG. 67 is a front perspective view of the battery system shown in FIG. 66 according to an exemplary embodiment.

The thermal management system 1310 further includes a cooling line or supply line (not shown) coming from the pump and supplies cooled cooling fluid to a supply manifold 1202 located external the row of battery modules 1224. As seen in FIGS. 66 and 67, cooling lines 1341 connect to manifold connections of the supply manifold 1202 and the battery module 1224. The cooling fluid is routed through the individual battery modules 1224 to cool the electrochemical cells. According to an exemplary embodiment, the cooling fluid is routed around the outside of the battery module 1224 to cool the cells located inside the battery module 1224. According to another exemplary embodiment, the cooling fluid is routed through (in between) the two rows of cells. According to other various embodiments, the cooling fluid may be routed through the battery module 1224 in any configuration that is necessary to cool the electrochemical cells inside the battery module 1224.

Referring again to FIGS. 66 and 67, cooling lines 1342 route the cooling fluid exiting the battery module 1224 to a return manifold 1204. The return manifold 1204 is connected to the radiator/condenser (not shown) by a return line (not shown) to remove heat from the now warmed cooling fluid. According to another exemplary embodiment, the flow of the cooling fluid may be reversed (e.g., the return manifold and return lines would become supply manifold and supply lines, while the supply manifold and supply lines would become return manifold and return lines) such that the cooling fluid flows inside to outside the battery system 1222.

The thermal management system 1310 may provide separate cooling to the individual rows of battery modules 1224. This is intended to aid in balancing the temperatures of the electrochemical cells so that the temperatures throughout the entire battery system 1222 are as even as possible. According to other various exemplary embodiments, there may be only a single cooling loop for the entire battery system 1222.

Figure 68:
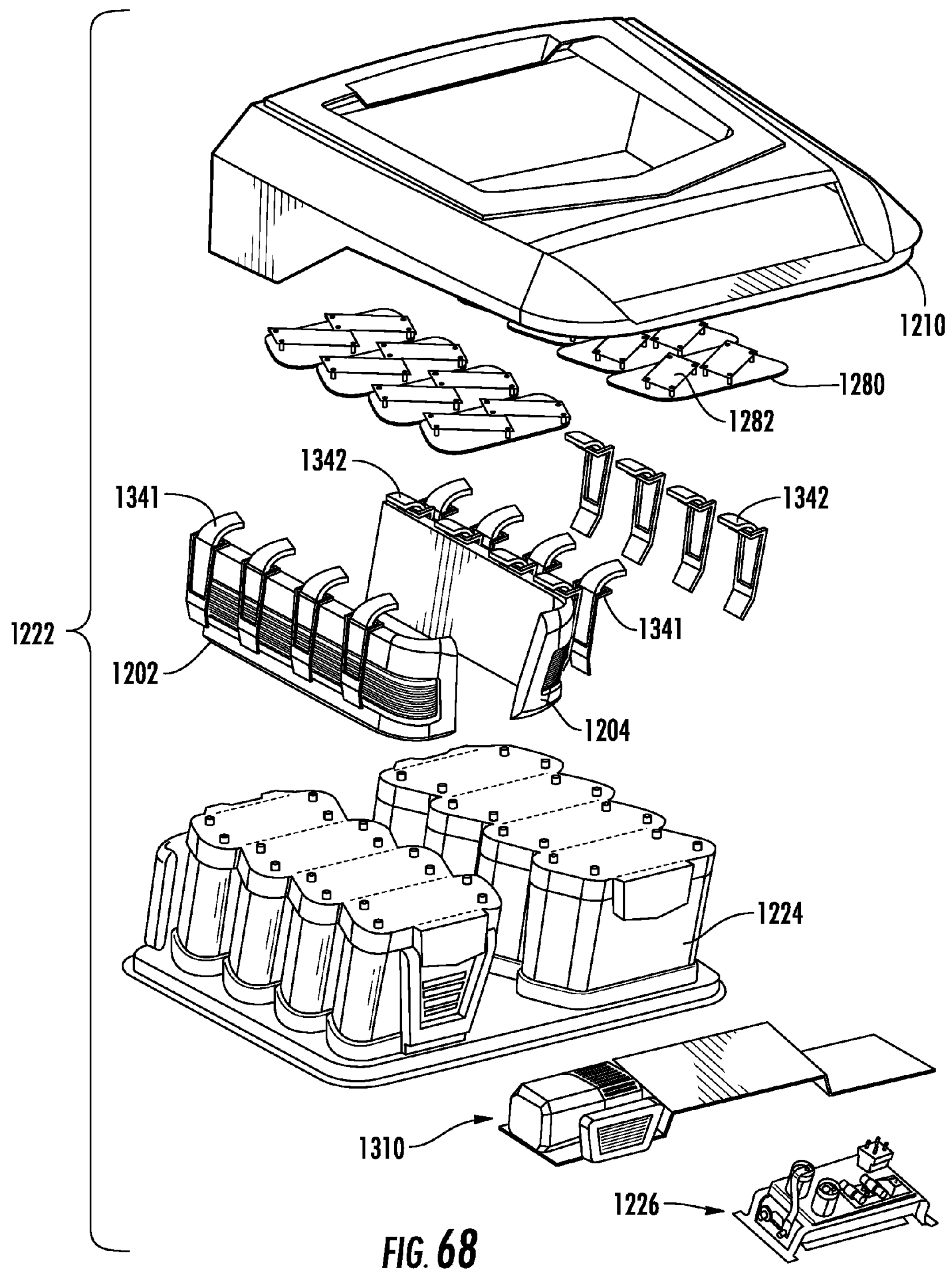
FIG. 68 is a partial exploded view of the battery system shown in FIG. 65 according to an exemplary embodiment.

Referring to FIGS. 66-68, each battery module 1224 includes its own cell supervisory controller (CSC) 1282 to monitor cell voltage and/or temperature. The CSC 1282 may balance the cells if necessary (e.g., even out the individual cell voltages and/or temperatures), as well as provide redundant protection for overvoltage, undervoltage, and overtemperature conditions. The battery system also includes a battery disconnect unit (BDU) 1226 that may include a battery management system (not shown) to monitor and/or regulate the battery modules 1224 and electrochemical cells.

Figure 65:
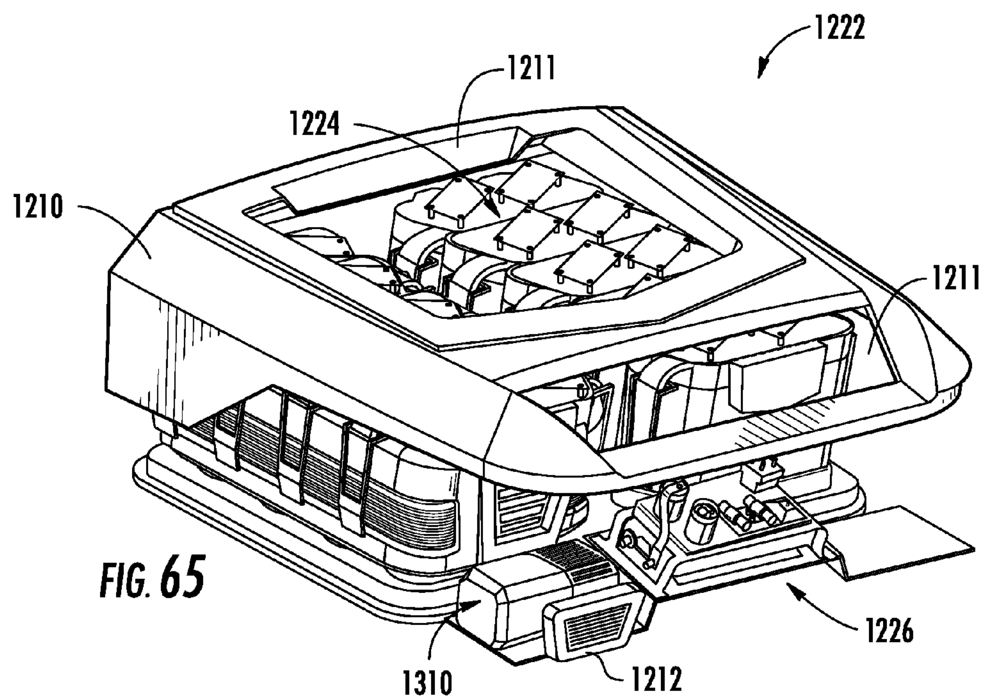
FIG. 65 is a partial perspective view of a battery system according to another exemplary embodiment.

The battery system 1222 may also include a number of openings or transparent windows 1211 located in a cover 1210 to allow a user to view the internal components of the battery system (e.g., as shown in FIG. 65). Alternatively, the openings may be replaced with an opaque or solid cover. The battery system 1222 also includes a plurality of openings or air vents 1212 to allow air to enter the battery system 1222 (e.g., as shown in FIGS. 61-62) to be used by the thermal management system 1310 (e.g., air may be blown across the radiator). Air may enter the air openings 1212 of the battery system 1222 from the environment surrounding the battery system 1222 (e.g., air contained in the rear of the vehicle or a trunk of the vehicle may enter the battery system 1222 through the air openings when the battery system is placed in the rear of a vehicle or the trunk of a vehicle). Alternatively, air may be routed to the battery system via ductwork connecting the air openings and the source of the air (e.g., ducts connecting the air openings to the cabin of the vehicle, to outside of the vehicle, etc.).

Figure 69A:
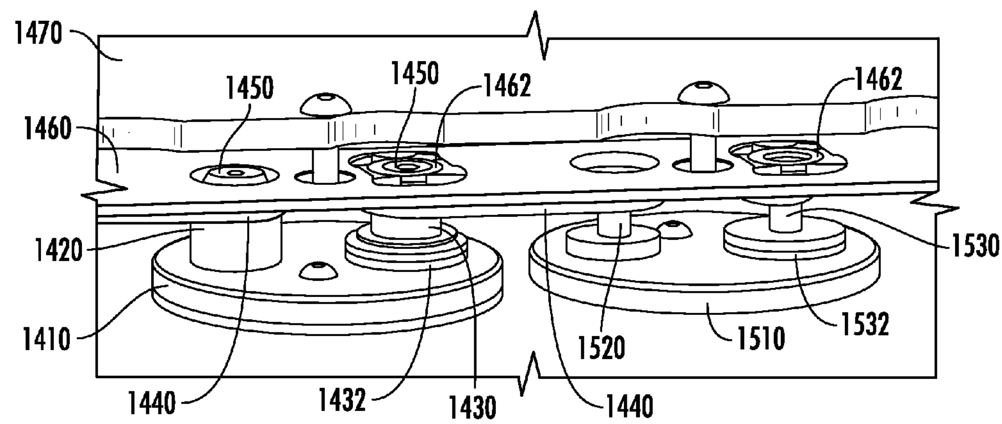
FIGS. 69A-69C are various side-by-side comparison views of a stamped cover/terminal assembly and a conventional lid/terminal assembly according to an exemplary embodiment.
Figure 69B:
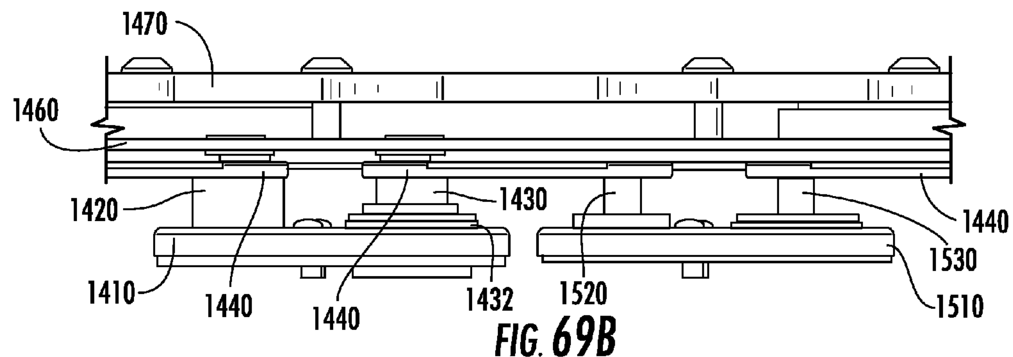
Figure 69C:
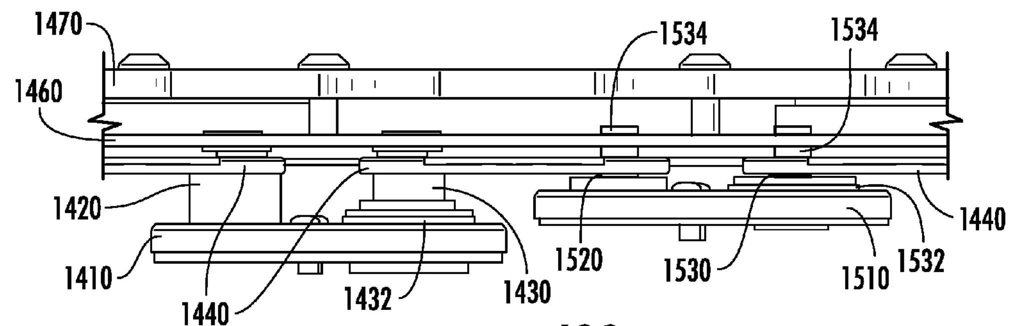

Referring now to FIGS. 69A-69C, various cover and terminal assembly designs are shown for a cell according to various exemplary embodiments. A first cover and terminal assembly design includes a cover 1410 having a first terminal 1420 and a second terminal 1430 attached thereto. According to an exemplary embodiment, the terminal 1430 is electrically insulated from the cover 1410 by a member shown as an insulator 1432. Coupled to the terminals are bus bars 1440 (e.g., by a fastener 1450).

Also shown in FIGS. 69A-69C is a traceboard 1460 having apertures therein that are configured to align with the terminals 1420, 1430. According to an exemplary embodiment, a flexible contact 1450 may be provided in the apertures. Also shown is a CSC 1470 configured to monitor and/or regulate the various cells.

A proposed design (having reference numbers in the 1500's) is shown according to an exemplary embodiment. According to an exemplary embodiment, the proposed design includes a cover 1510 having a first terminal 1520 and a second terminal 1530. According to an exemplary embodiment, the terminal 1530 may be electrically insulated from the cover 1510 by a member shown as insulator 1532.

As shown in FIG. 69C, the cover 1510 is shown coupled to the bus bar 1440. According to an exemplary embodiment, the terminals 1520, 1530 are threaded studs having nuts 1534 threaded onto them in order to couple the terminals 1520, 1530 to the bus bar 1440.

As can be seen in FIG. 69A-69C, the proposed design offers a number of advantageous features. For instance, in the proposed design, the cover and terminal assembly are formed substantially from a stamping process. Using a stamping process saves time and cost over a more traditional forming process (e.g., machining separate components and then assembling them together).

Additionally, the weight and material used in the proposed design is reduced. For instance, the diameter and the height of the terminals are reduced in the proposed design. Additionally, the terminals 1520, 1530 in the proposed design are threaded studs, allowing for more efficient packaging and assembly.

According to an exemplary embodiment, a battery module is provided having modular construction such that the battery module may be modularly assembled with other battery modules into a battery system. The battery module includes a plurality of electrochemical cells provided in two rows and a cooling element provided in between the two rows of cells. The cells and the cooling element are enclosed or surrounded by a housing, a bottom, and a cover. The battery module also includes a bus bar assembly to electrically couple the cells to one another and a cell supervisory controller configured to monitor and regulate the cells.

According to an exemplary embodiment, a battery system includes a plurality of battery modules and a thermal management system configured to provide heating and/or cooling to the battery modules. Other features of the battery system may include a battery on/off/service disconnect switch, air vents or openings, and a battery management system. The battery modules are arranged in two rows containing four battery modules in each row. The battery modules may each include a plurality of electrochemical cells electrically connected together with bus bars. Each battery module may also include a cell supervisory controller to monitor and regulate the electrochemical cells. The thermal management system is configured as a stand-alone thermal management system and is configured to provide closed loop cooling and/or heating to each individual row of battery modules. The thermal management system is modular in that it may be scaled up or down dependent upon the requirements of the application. The thermal management system may also include a compressor, a pump, a fan, a fan housing, and a separate radiator/condenser for each closed loop. The thermal management fluid is supplied to the battery modules through a manifold having individual supply lines to each individual battery module. The thermal management fluid returns to the radiator/condenser for that row of battery modules through a return manifold.

According to another exemplary embodiment the battery system includes a plurality of battery modules arranged side-by-side within the housing. The housing includes openings to provide a cooling or heating fluid to the individual battery modules. The openings are connected to the individual battery modules through a plurality of manifolds and supply and return lines. The battery modules are arranged side-by-side so that they are nested next to each other to provide an efficient use of space within the battery system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery modules and/or systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery module, comprising:

a heat exchanger configured to allow a fluid to flow therethrough, wherein the heat exchanger is configured to be disposed between a first row of cylindrical electrochemical cells and a second row of cylindrical electrochemical cells, the first and second rows of cylindrical electrochemical cells being offset from one another, wherein the heat exchanger comprises:

an external surface that is shaped complementary to the cylindrical electrochemical cells in the first and second rows so that the external surface of the heat exchanger contacts a portion of each of the cylindrical electrochemical cells in the first and second rows, wherein the heat exchanger is configured to allow heat conduction between the fluid and of cylindrical electrochemical cells in the first and second rows via the external surface;

an inlet through which the fluid enters the heat exchanger;

an outlet through which the fluid exits the heat exchanger; and a serpentine path comprising a fluid channel coupling the inlet to the outlet, the serpentine path having at least two adjacent fluid flow segments coupled together by a turn and configured to route the fluid through the fluid channel in a zig-zag path between the inlet and the outlet, wherein the turn in the serpentine path extends upwardly in a direction generally parallel to respective longitudinal axes of the cylindrical electrochemical cells in the first and second rows of cylindrical electrochemical cells such that the at least two adjacent fluid flow segments extend crosswise relative to the longitudinal axes and between the first and second rows of cylindrical electrochemical cells.

2. The battery module of claim 1, wherein the inlet is disposed on a first side of the heat exchanger and the outlet is disposed on a second side of the heat exchanger opposite the first, and wherein the serpentine path comprises an odd number of fluid flow segments continuously connected between the inlet and the outlet.

3. The battery module of claim 1, wherein the inlet and outlet are disposed on one side of the heat exchanger, and wherein the serpentine path comprises an even number of fluid flow segments continuously connected between the inlet and the outlet.

4. The battery module of claim 1, wherein each pair of adjacent fluid flow segments is connected via a 180 degree turn.

5. The battery module of claim 1, wherein the adjacent fluid flow segments are aligned such that the heat exchanger is configured to allow heat conduction between the fluid and each of the plurality of cylindrical electrochemical cells along every fluid flow segment.

6. The battery module of claim 1, wherein the inlet is disposed at a lower end of the heat exchanger and the outlet is disposed at an upper end of the heat exchanger.

7. The battery module of claim 1, wherein the external surface of the heat exchanger is shaped to provide an angled contact between the plurality of cylindrical electrochemical cells and the external surface.

8. The battery module of claim 1, wherein the external surface of the heat exchanger has a wall thickness between approximately 0.5 millimeters and 1.5 millimeters.

9. The battery module of claim 1, wherein an overall thickness of the heat exchanger is between approximately 4 millimeters and 6 millimeters.

10. A battery system, comprising:

a plurality of battery modules, each battery module comprising:

a plurality of cylindrical electrochemical cells arranged in a first row and a second row adjacent to and offset from the first row; and a heat exchanger disposed between the first and second rows of cylindrical electrochemical cells and configured to allow a fluid to flow therethrough, wherein the heat exchanger comprises:

an external surface that is shaped complementary to the cylindrical electrochemical cells in the first and second rows so that the external surface of the heat exchanger contacts a portion of each of the plurality of cylindrical electrochemical cells, wherein the heat exchanger is configured to allow heat conduction between the fluid and the plurality of cylindrical electrochemical cells via the external surface;

an inlet through which the fluid enters the heat exchanger;

an outlet through which the fluid exits the heat exchanger; and a serpentine path comprising a fluid channel coupling the inlet to the outlet, wherein the fluid channel extends through the serpentine path of the heat exchanger such that the fluid channel extends both parallel and crosswise relative to respective longitudinal axes of the cylindrical electrochemical cells in the first and second rows to cross the first and second rows of cylindrical electrochemical cells multiple times in alternating directions;

an inlet manifold configured to provide the fluid to the inlets corresponding to each of the plurality of battery modules; and an outlet manifold configured to route the fluid from the outlets corresponding to each of the plurality of battery modules.

11. The battery system of claim 10, wherein the plurality of battery modules comprise a first layer of battery modules arranged side-by-side and a second layer of battery modules arranged side-by-side, wherein the second layer of battery modules is disposed above the first layer of battery modules.

12. The battery system of claim 11, comprising a first inlet manifold and first outlet manifold configured to route fluid to and from the battery modules in the first layer, and a second inlet manifold and second outlet manifold configured to route fluid to and from the battery modules in the second layer.

13. The battery system of claim 10, wherein the inlet manifold is disposed at a lower end of the battery system and the outlet manifold is disposed at an upper end of the battery system.

14. The battery system of claim 10, wherein both the inlet manifold and the outlet manifold are disposed along a first side of the battery system.

15. The battery system of claim 14, wherein each of the plurality of battery modules comprises electrical connections, and wherein substantially all of the electrical connections are disposed along a second side of the battery system opposite the first side.

16. A method for routing a fluid through a heat exchanger in a battery module, comprising:

receiving the fluid into the heat exchanger via an inlet;

routing the fluid through a fluid channel of the heat exchanger in a zig-zag pattern such that the fluid flows in alternating directions within the heat exchanger;

conducting heat between the fluid and a plurality of cylindrical electrochemical cells via an external surface of the heat exchanger, wherein the heat exchanger is disposed between the first row of cylindrical electrochemical cells and the second row of cylindrical electrochemical cells, the first and second rows of cylindrical electrochemical cells being offset from one another, and wherein the external surface is shaped complementary to the cylindrical electrochemical cells in the first and second rows so that the external surface of the heat exchanger contacts a portion of each of the plurality of cylindrical electrochemical cells, and wherein the zig-zag pattern is such that the fluid channel routes the fluid both along and crosswise relative to respective longitudinal axes of the cylindrical electrochemical cells in the first and second rows to cross the first and second rows of cylindrical electrochemical cells multiple times in alternating directions; and routing the fluid out of the heat exchanger via the outlet.

17. The method of claim 16, comprising receiving the fluid into the heat exchanger via the inlet coupled to a lower fluid flow segment, and routing the fluid out of the heat exchanger via the outlet coupled to an upper fluid flow segment.

18. The method of claim 16, comprising routing the fluid through a first fluid flow segment, through a 180 degree turn, and through a second fluid flow segment adjacent the first.

19. The method of claim 16, comprising receiving the fluid from an inlet manifold into the inlet, and outputting the fluid from the outlet to an outlet manifold.

20. The method of claim 19, wherein the inlet manifold and the outlet manifold are configured to route the fluid into and out of a plurality of battery modules in a battery system.

21. The method of claim 16, comprising receiving the fluid via the inlet disposed on a first side of the heat exchanger and routing the fluid out of the heat exchanger via the outlet disposed on a second side of the heat exchanger opposite the first side.

22. The method of claim 16, where the inlet and the outlet are disposed on a same side of the heat exchanger.

23. The method of claim 16, comprising:

directing the fluid through a first fluid flow segment of the fluid channel in a first direction;

directing the fluid through a first turn;

directing the fluid through a second fluid flow segment of the fluid channel in a second direction substantially opposite of the first direction.

24. The method of claim 23, comprising directing the fluid in a third direction substantially perpendicular to the first and second directions via the first turn.

* * * * *